United States Patent
Reichter et al.

(10) Patent No.: US 12,070,711 B2
(45) Date of Patent: *Aug. 27, 2024

(54) AIR FILTER ARRANGEMENT; ASSEMBLY; AND, METHODS

(71) Applicant: Donaldson Company, Inc., Bloomington, MN (US)

(72) Inventors: Gregory Reichter, Bloomington, MN (US); Wayne Bishop, St. Louis Park, MN (US); Benny K. Nelson, Waconia, MN (US); Darrel Wegner, Burnsville, MN (US); Bruce Crenshaw, Frankfort, IN (US); Thomas Miller, Grand Rapids, MN (US); Donald Mork, Lime Springs, IA (US); Kevin Schrage, Spring Valley, MN (US); Vladimir Kladnitsky, Eagan, MN (US); Richard Osendorf, St. Paul, MN (US); Bradley Kuempel, Eden Prairie, MN (US); Thomas Lundgren, Bloomington, MN (US); Jordan Flagstad, East Bethel, MN (US)

(73) Assignee: Donaldson Company, Inc., Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/215,382

(22) Filed: Jun. 28, 2023

(65) Prior Publication Data

US 2023/0415082 A1 Dec. 28, 2023

Related U.S. Application Data

(63) Continuation of application No. 17/303,371, filed on May 27, 2021, which is a continuation of application
(Continued)

(51) Int. Cl.
*B01D 46/00* (2022.01)
*B01D 46/52* (2006.01)
(Continued)

(52) U.S. Cl.
CPC ..... *B01D 46/0005* (2013.01); *B01D 46/0002* (2013.01); *B01D 46/526* (2013.01);
(Continued)

(58) Field of Classification Search
CPC .......................... B01D 46/525; B01D 46/526; B01D 2271/02; B01D 2271/022; B01D 2279/60;
(Continued)

(56) References Cited

U.S. PATENT DOCUMENTS 2,093,877 A 9/1937 Pentz
2,270,969 A 1/1942 Robinson
(Continued)

FOREIGN PATENT DOCUMENTS

CN 2296402 Y 11/1998
DE 88 08 632 U1 10/1988
(Continued)

OTHER PUBLICATIONS

U.S. Appl. No. 60/579,754, filed Jun. 14, 2004.
(Continued)

*Primary Examiner* — Robert Clemente
(74) *Attorney, Agent, or Firm* — Merchant & Gould P.C.

(57) ABSTRACT

Air filter cartridges are disclosed. Also described are air cleaners including the filter cartridges. Methods of assembly and use are also provided. Also, systems of use are described.

26 Claims, 51 Drawing Sheets

Related U.S. Application Data

No. 16/573,112, filed on Sep. 17, 2019, now Pat. No. 11,020,699, which is a continuation of application No. 16/285,845, filed on Feb. 26, 2019, now Pat. No. 10,421,034, which is a continuation of application No. 15/387,820, filed on Dec. 22, 2016, now Pat. No. 10,315,144, which is a continuation of application No. 14/263,195, filed on Apr. 28, 2014, now Pat. No. 9,527,023, which is a continuation of application No. 13/616,087, filed on Sep. 14, 2012, now Pat. No. 8,709,119, which is a continuation of application No. 11/795,176, filed as application No. PCT/US2006/001061 on Jan. 12, 2006, now Pat. No. 8,292,983.

(60) Provisional application No. 60/651,838, filed on Feb. 8, 2005, provisional application No. 60/644,094, filed on Jan. 13, 2005.

(51) Int. Cl.
  *B01D 46/62* (2022.01)
  *F02C 7/05* (2006.01)
  *F02M 35/024* (2006.01)

(52) U.S. Cl.
  CPC ............... *B01D 46/62* (2022.01); *F02C 7/05* (2013.01); *F02M 35/0245* (2013.01); *F02M 35/02458* (2013.01); *B01D 2271/02* (2013.01); *B01D 2271/022* (2013.01); *B01D 2279/60* (2013.01)

(58) Field of Classification Search
  CPC ............ B01D 46/0002; B01D 46/0005; B01D 46/62; F02C 7/05
  See application file for complete search history.

(56) References Cited

U.S. PATENT DOCUMENTS

| | | |
|---|---|---|
| 2,306,325 A | 12/1942 | Allam |
| 2,915,188 A | 12/1959 | Buker |
| 2,955,028 A | 10/1960 | Bevans |
| 3,025,963 A | 3/1962 | Bauer |
| 3,224,592 A | 12/1965 | Burns et al. |
| 3,494,113 A | 2/1970 | Kinney |
| 3,598,738 A | 8/1971 | Biswell et al. |
| 3,645,402 A | 2/1972 | Alexander et al. |
| 3,687,849 A | 8/1972 | Abbott |
| 3,749,247 A | 7/1973 | Rohde |
| 4,014,794 A | 3/1977 | Lewis |
| 4,061,572 A | 12/1977 | Cohen et al. |
| 4,066,559 A | 1/1978 | Rohde |
| 4,075,097 A | 2/1978 | Paul |
| 4,075,098 A | 2/1978 | Paul et al. |
| 4,080,185 A | 3/1978 | Richter et al. |
| 4,144,166 A | 3/1979 | DeJovine |
| 4,144,169 A | 3/1979 | Grueschow |
| 4,324,213 A | 4/1982 | Kasting et al. |
| 4,364,751 A | 12/1982 | Copley |
| 4,373,635 A | 2/1983 | Mules |
| 4,402,912 A | 9/1983 | Krueger et al. |
| 4,410,427 A | 10/1983 | Wydeven |
| 4,452,616 A | 6/1984 | Gillingham et al. |
| 4,498,989 A | 2/1985 | Miyakawa et al. |
| 4,589,983 A | 5/1986 | Wydevan |
| 4,600,420 A | 7/1986 | Wydeven et al. |
| 4,685,944 A | 8/1987 | Allan et al. |
| 4,710,297 A | 12/1987 | Suzuki et al. |
| 4,738,776 A | 4/1988 | Brown |
| 4,755,289 A | 7/1988 | Villani |
| 4,782,891 A | 11/1988 | Cheadle et al. |
| 4,826,517 A | 5/1989 | Norman |
| 4,861,359 A | 8/1989 | Tettman |
| 4,925,561 A | 5/1990 | Ishii et al. |
| 4,979,969 A | 12/1990 | Herding |
| 5,024,268 A | 6/1991 | Cheadle et al. |
| 5,050,549 A | 9/1991 | Sturmon |
| 5,064,799 A | 11/1991 | Monte et al. |
| 5,069,799 A | 12/1991 | Brownawell et al. |
| 5,094,745 A | 3/1992 | Reynolds |
| 5,120,334 A | 6/1992 | Cooper |
| 5,213,596 A | 5/1993 | Kume et al. |
| 5,222,488 A | 6/1993 | Forsgren |
| 5,223,011 A | 6/1993 | Hanni |
| 5,225,081 A | 7/1993 | Brownawell |
| 5,258,118 A | 11/1993 | Gouritin et al. |
| 5,292,432 A | 3/1994 | Jainek et al. |
| 5,298,160 A | 3/1994 | Ayers et al. |
| 5,342,511 A | 8/1994 | Brown et al. |
| 5,353,861 A | 10/1994 | Roder et al. |
| 5,382,355 A | 1/1995 | Arlozynski |
| 5,391,212 A | 2/1995 | Ernst et al. |
| 5,435,346 A | 7/1995 | Tregidgo et al. |
| 5,459,074 A | 10/1995 | Muoni |
| 5,472,379 A | 12/1995 | Andress et al. |
| 5,472,463 A | 12/1995 | Herman et al. |
| 5,494,497 A | 2/1996 | Lee |
| 5,498,332 A | 3/1996 | Handtmann |
| 5,512,074 A | 4/1996 | Hanni et al. |
| 5,531,848 A | 7/1996 | Brinda et al. |
| 5,541,330 A | 7/1996 | Wear et al. |
| 5,556,542 A | 9/1996 | Berman et al. |
| 5,562,825 A | 11/1996 | Yamada et al. |
| 5,575,826 A | 11/1996 | Gillingham et al. |
| 5,591,330 A | 1/1997 | Lefebvre |
| 5,605,554 A | 2/1997 | Kennedy |
| 5,643,541 A | 7/1997 | Peddicord et al. |
| 5,662,799 A | 9/1997 | Hudgens et al. |
| 5,718,258 A | 2/1998 | Lefebvre et al. |
| 5,738,785 A | 4/1998 | Brown et al. |
| 5,753,116 A | 5/1998 | Baumann et al. |
| 5,759,217 A | 6/1998 | Joy |
| 5,772,873 A | 6/1998 | Hudgens et al. |
| 5,772,883 A | 6/1998 | Rothman et al. |
| D396,098 S | 7/1998 | Gillingham et al. |
| 5,792,247 A | 8/1998 | Gillingham et al. |
| 5,795,361 A | 8/1998 | Lanier, Jr. et al. |
| 5,803,024 A | 9/1998 | Brown |
| D399,944 S | 10/1998 | Gillingham et al. |
| 5,820,646 A | 10/1998 | Gillingham et al. |
| 5,853,439 A | 12/1998 | Gieseke et al. |
| 5,891,402 A | 4/1999 | Sassa et al. |
| 5,895,574 A | 4/1999 | Friedmann et al. |
| 5,902,364 A | 5/1999 | Tokar et al. |
| 5,948,248 A | 9/1999 | Brown |
| 6,045,692 A | 4/2000 | Bilski et al. |
| D425,189 S | 5/2000 | Gillingham et al. |
| 6,086,763 A | 7/2000 | Baumaun |
| 6,096,208 A | 8/2000 | Connelly et al. |
| 6,098,575 A | 8/2000 | Mulshine et al. |
| 6,129,852 A | 10/2000 | Elliot et al. |
| 6,149,700 A | 11/2000 | Morgan et al. |
| 6,165,519 A | 12/2000 | Lehrer et al. |
| 6,171,355 B1 | 1/2001 | Gieseke et al. |
| 6,179,890 B1 | 1/2001 | Ramos |
| D437,402 S | 2/2001 | Gieseke et al. |
| 6,190,432 B1 | 2/2001 | Gieseke et al. |
| 6,196,019 B1 | 3/2001 | Higo et al. |
| 6,231,630 B1 | 5/2001 | Ernst et al. |
| 6,235,194 B1 | 5/2001 | Jousset |
| 6,235,195 B1 | 5/2001 | Tokar |
| 6,238,554 B1 | 5/2001 | Martin, Jr. et al. |
| 6,238,561 B1 | 5/2001 | Liu et al. |
| D444,219 S | 6/2001 | Gieseke et al. |
| 6,261,334 B1 | 7/2001 | Morgan et al. |
| 6,264,833 B1 | 7/2001 | Reamsnyder et al. |
| RE37,369 E | 9/2001 | Hudgens et al. |
| 6,293,984 B1 | 9/2001 | Oda et al. |
| 6,306,193 B1 | 10/2001 | Morgan et al. |
| D450,828 S | 11/2001 | Tokar |
| 6,348,084 B1 | 2/2002 | Gieseke et al. |
| 6,348,085 B1 | 2/2002 | Tokar et al. |
| 6,350,291 B1 | 2/2002 | Gieske et al. |

(56) References Cited

U.S. PATENT DOCUMENTS

| | | |
|---|---|---|
| D455,826 S | 4/2002 | Gillingham et al. |
| 6,368,374 B1 | 4/2002 | Tokar et al. |
| 6,375,700 B1 | 4/2002 | Jaroszczyk et al. |
| 6,379,564 B1 | 4/2002 | Rohrbach et al. |
| 6,391,076 B1 | 5/2002 | Jaroszczyk et al. |
| 6,398,832 B2 | 6/2002 | Morgan et al. |
| 6,416,561 B1 | 7/2002 | Kallsen et al. |
| D464,129 S | 10/2002 | Xu et al. |
| 6,475,379 B2 | 11/2002 | Jousset et al. |
| 6,478,958 B1 | 11/2002 | Beard et al. |
| 6,482,247 B2 | 11/2002 | Jaroszczyk et al. |
| 6,511,599 B2 | 1/2003 | Jaroszczyk et al. |
| 6,517,598 B2 | 2/2003 | Anderson et al. |
| 6,537,453 B2 | 3/2003 | Beard et al. |
| D473,637 S | 4/2003 | Golden |
| 6,547,857 B2 | 4/2003 | Gieseke et al. |
| 6,554,139 B1 | 4/2003 | Maxwell et al. |
| 6,596,165 B2 | 7/2003 | Koivula |
| 6,610,126 B2 | 8/2003 | Xu et al. |
| 6,623,636 B2 | 9/2003 | Rohrbach et al. |
| 6,641,637 B2 | 11/2003 | Kallsen et al. |
| D484,584 S | 12/2003 | Anderson et al. |
| 6,673,136 B2 | 1/2004 | Gillingham et al. |
| 6,676,721 B1 | 1/2004 | Gillingham et al. |
| 6,709,588 B2 | 3/2004 | Pavlin et al. |
| 6,743,317 B2 | 6/2004 | Wydeven |
| 6,746,518 B2 | 6/2004 | Gieseke et al. |
| 6,787,033 B2 | 9/2004 | Beard et al. |
| 6,827,750 B2 | 12/2004 | Drozd et al. |
| 6,835,304 B2 | 12/2004 | Jousset et al. |
| 6,843,916 B2 | 1/2005 | Burrington et al. |
| 6,860,241 B2 | 3/2005 | Martin et al. |
| 6,893,571 B2 | 5/2005 | Harenbrock et al. |
| 6,902,598 B2 | 6/2005 | Gunderson et al. |
| 6,919,023 B2 | 7/2005 | Merritt et al. |
| 6,953,124 B2 | 10/2005 | Winter et al. |
| 6,966,940 B2 | 11/2005 | Krisko et al. |
| 6,969,461 B2 | 11/2005 | Beard et al. |
| 6,984,319 B2 | 1/2006 | Merritt et al. |
| 7,001,450 B2 | 2/2006 | Gieseke et al. |
| 7,008,467 B2 | 3/2006 | Krisko et al. |
| 7,018,531 B2 | 3/2006 | Eilers et al. |
| 7,090,711 B2 | 8/2006 | Gillingham et al. |
| 7,153,422 B2 | 12/2006 | Herman et al. |
| 7,156,991 B2 | 1/2007 | Herman et al. |
| 7,160,451 B2 | 1/2007 | Hacker et al. |
| 7,182,863 B2 | 2/2007 | Eilers et al. |
| 7,182,864 B2 | 2/2007 | Brown et al. |
| 7,211,124 B2 | 5/2007 | Gieseke et al. |
| 7,247,183 B2 | 7/2007 | Connor et al. |
| 7,258,719 B2 | 8/2007 | Miller et al. |
| 7,282,075 B2 | 10/2007 | Sporre et al. |
| 7,338,544 B2 | 3/2008 | Sporre et al. |
| 7,351,270 B2 | 4/2008 | Engelland et al. |
| 7,396,375 B2 | 7/2008 | Nepsund et al. |
| 7,396,376 B2 | 7/2008 | Schrage et al. |
| 7,488,365 B2 | 2/2009 | Golden et al. |
| 7,491,254 B2 | 2/2009 | Krisko et al. |
| 7,494,017 B2 | 2/2009 | Miller |
| 7,540,895 B2 | 6/2009 | Furseth et al. |
| 7,569,090 B2 | 8/2009 | Nelson |
| D600,790 S | 9/2009 | Nelson et al. |
| 7,625,419 B2 | 12/2009 | Nelson et al. |
| 7,632,571 B2 | 12/2009 | Hartig et al. |
| 7,645,310 B2 | 1/2010 | Krisko et al. |
| 7,655,074 B2 | 2/2010 | Nepsund et al. |
| 7,674,308 B2 | 3/2010 | Krisko et al. |
| 7,682,416 B2 | 3/2010 | Engelland et al. |
| 7,799,108 B2 | 9/2010 | Connor et al. |
| 7,967,886 B2 | 6/2011 | Schrage et al. |
| 7,993,422 B2 | 8/2011 | Krisko et al. |
| 7,997,425 B2 | 8/2011 | Golden et al. |
| 8,016,903 B2 | 9/2011 | Nelson et al. |
| 8,034,145 B2 | 10/2011 | Boehrs et al. |
| 8,062,399 B2 | 11/2011 | Nelson et al. |
| 8,226,786 B2 | 7/2012 | Schrage et al. |
| 8,241,383 B2 | 8/2012 | Schrage et al. |
| 8,277,532 B2 | 10/2012 | Reichter et al. |
| 8,292,983 B2 | 10/2012 | Reichter et al. |
| 8,328,897 B2 | 12/2012 | Nelson et al. |
| 8,357,219 B2 | 1/2013 | Boehrs et al. |
| 8,480,779 B2 | 7/2013 | Boehrs et al. |
| 8,496,723 B2 | 7/2013 | Reichter et al. |
| 8,636,820 B2 | 1/2014 | Reichter et al. |
| 8,652,228 B2 | 2/2014 | Krisko et al. |
| 8,709,119 B2 | 4/2014 | Reichter et al. |
| 8,840,699 B2 | 9/2014 | Bruce et al. |
| 8,906,128 B2 | 12/2014 | Reichter et al. |
| 9,120,047 B2 | 9/2015 | Boehrs et al. |
| 9,180,399 B2 | 11/2015 | Reichter et al. |
| 9,295,936 B2 | 3/2016 | Krisko et al. |
| 9,320,997 B2 | 4/2016 | Campbell et al. |
| 9,399,972 B2 | 7/2016 | Boehrs et al. |
| 9,527,023 B2 | 12/2016 | Reichter et al. |
| 9,795,911 B2 | 10/2017 | Reichter et al. |
| 9,937,455 B2 | 4/2018 | Boehrs et al. |
| 10,046,260 B2 | 8/2018 | Campbell et al. |
| 10,065,145 B2 | 9/2018 | Reichter et al. |
| 10,315,144 B2 | 6/2019 | Reichter et al. |
| 10,421,034 B2 | 9/2019 | Reichter et al. |
| 10,427,083 B2 | 10/2019 | Boehrs et al. |
| 10,512,868 B2 | 12/2019 | Adamek et al. |
| 10,532,310 B2 | 1/2020 | Burton |
| 10,556,201 B2 | 2/2020 | Reichter et al. |
| 10,603,618 B2 | 3/2020 | Boehrs et al. |
| 10,610,816 B2 | 4/2020 | Campbell et al. |
| 10,864,475 B2 | 12/2020 | Reichter et al. |
| 11,020,699 B2 | 6/2021 | Reichter et al. |
| 11,110,382 B2 | 9/2021 | Burton et al. |
| 11,173,442 B2 | 11/2021 | Boehrs et al. |
| 11,198,083 B2 | 12/2021 | Adamek et al. |
| 11,207,632 B2 | 12/2021 | Reichter et al. |
| 11,291,943 B2 | 4/2022 | Boehrs et al. |
| 11,298,643 B2 | 4/2022 | Campbell et al. |
| 11,660,558 B2 | 5/2023 | Adamek et al. |
| 2001/0032545 A1 | 10/2001 | Goto et al. |
| 2002/0060178 A1 | 5/2002 | Tsabari |
| 2002/0070181 A1 | 6/2002 | Deanda et al. |
| 2002/0073850 A1 | 6/2002 | Tokar et al. |
| 2002/0096247 A1 | 7/2002 | Wydevan |
| 2002/0170280 A1 | 11/2002 | Soh |
| 2002/0185007 A1 | 12/2002 | Xu et al. |
| 2002/0185454 A1 | 12/2002 | Beard et al. |
| 2002/0195384 A1 | 12/2002 | Rohrbach et al. |
| 2003/0121845 A1 | 7/2003 | Wagner et al. |
| 2003/0146149 A1 | 8/2003 | Binder et al. |
| 2003/0154863 A1 | 8/2003 | Tokar et al. |
| 2003/0218150 A1 | 11/2003 | Blakemore et al. |
| 2004/0020177 A1 | 2/2004 | Ota et al. |
| 2004/0035097 A1 | 2/2004 | Schlensker et al. |
| 2004/0060861 A1 | 4/2004 | Winter et al. |
| 2004/0091652 A1 | 5/2004 | Kikuchi et al. |
| 2004/0091654 A1 | 5/2004 | Kelly et al. |
| 2004/0140255 A1 | 7/2004 | Merritt et al. |
| 2004/0173097 A1 | 9/2004 | Engelland et al. |
| 2004/0187689 A1 | 9/2004 | Sporre et al. |
| 2004/0221555 A1 | 11/2004 | Engelland et al. |
| 2004/0226443 A1 | 11/2004 | Gillingham et al. |
| 2005/0019236 A1 | 1/2005 | Martin et al. |
| 2005/0073325 A1 | 4/2005 | Rettig et al. |
| 2005/0166561 A1 | 8/2005 | Schrage et al. |
| 2005/0173325 A1 | 8/2005 | Klein et al. |
| 2005/0194312 A1 | 9/2005 | Niemeyer et al. |
| 2005/0224061 A1 | 10/2005 | Ulrich et al. |
| 2005/0252848 A1 | 11/2005 | Miller |
| 2006/0113233 A1 | 6/2006 | Merritt et al. |
| 2006/0180537 A1 | 8/2006 | Loftis et al. |
| 2007/0261374 A1 | 11/2007 | Nelson et al. |
| 2008/0016832 A1 | 1/2008 | Krisko et al. |
| 2008/0022641 A1 | 1/2008 | Engelland et al. |
| 2008/0110142 A1 | 5/2008 | Nelson et al. |
| 2008/0250763 A1 | 10/2008 | Widerski et al. |
| 2008/0250766 A1 | 10/2008 | Schrage et al. |
| 2008/0276582 A1 | 11/2008 | Boehrs et al. |

(56) References Cited

U.S. PATENT DOCUMENTS

| | | |
|---|---|---|
| 2008/0307759 A1 | 12/2008 | Reichter et al. |
| 2009/0057213 A1 | 3/2009 | Schiavon et al. |
| 2009/0064646 A1 | 3/2009 | Reichter et al. |
| 2009/0151311 A1 | 6/2009 | Reichter et al. |
| 2010/0043366 A1 | 2/2010 | Boehrs et al. |
| 2010/0170209 A1 | 7/2010 | Nelson et al. |
| 2017/0182443 A1 | 6/2017 | Reichter et al. |
| 2021/0394101 A1* | 12/2021 | Reichter .......... F02M 35/02458 |

FOREIGN PATENT DOCUMENTS

| | | |
|---|---|---|
| DE | 43 24 388 C1 | 9/1994 |
| DE | 296 13 098 U1 | 9/1996 |
| EP | 1 166 843 A1 | 1/2002 |
| EP | 1 233 173 A2 | 8/2002 |
| EP | 1 747 053 B1 | 10/2007 |
| FR | 2 214 505 A | 8/1974 |
| GB | 970826 A | 9/1964 |
| GB | 2 082 932 A | 3/1982 |
| JP | S60-155921 | 3/1984 |
| JP | 60-112320 | 7/1985 |
| JP | 1-171615 | 7/1989 |
| JP | 1-163408 | 11/1989 |
| JP | 2-25009 | 2/1990 |
| JP | 7-3012 | 1/1995 |
| JP | 10-263348 | 10/1998 |
| WO | WO 91/19898 A1 | 12/1991 |
| WO | WO 97/40908 A1 | 11/1997 |
| WO | WO 97/40918 A1 | 11/1997 |
| WO | WO 98/12430 A1 | 3/1998 |
| WO | WO 99/00587 A1 | 1/1999 |
| WO | WO 01/97946 A1 | 12/2001 |
| WO | WO 02/092193 A1 | 11/2002 |
| WO | WO 03/084641 A2 | 10/2003 |
| WO | WO 2003/095068 A1 | 11/2003 |
| WO | WO 2004/052504 A2 | 6/2004 |
| WO | WO 2004/054684 A1 | 7/2004 |
| WO | WO 2005/046841 A1 | 5/2005 |
| WO | WO 2005/058461 A1 | 6/2005 |
| WO | WO 2005/063358 A2 | 7/2005 |
| WO | WO 2005/077487 A1 | 8/2005 |
| WO | WO 2005/079954 A1 | 9/2005 |
| WO | WO 2005/115581 A1 | 12/2005 |
| WO | WO 2005/123214 A1 | 12/2005 |
| WO | WO 2005/123222 A1 | 12/2005 |
| WO | WO 2006/012386 A2 | 2/2006 |
| WO | WO 2006/017790 A1 | 2/2006 |
| WO | WO 2006/076456 A1 | 7/2006 |
| WO | WO 2007/009039 A1 | 1/2007 |
| WO | WO 2007/044677 A1 | 4/2007 |

OTHER PUBLICATIONS

PCT Search Report and Written Opinion for PCT/US2005/019777 corresponding to WO 2005/123214 dated Sep. 28, 2005.
PCT Search Report and Written Opinion for PCT/US2005/20593, corresponding to WO 2005/123222 dated Sep. 28, 2005.
PCT Search Report and Written Opinion for PCT/US2005/028002 corresponding to WO 2006/17790 dated Nov. 11, 2005.
PCT Search Report and Written Opinion for PCT/US2006/001021, corresponding to WO 2006/076456 dated May 29, 2006.
PCT Search Report and Written Opinion for PCT/US2006/001061, corresponding to WO 2006/076479 dated May 15, 2006.
Pending claims of U.S. Appl. No. 17/533,796.
Allowed claims of U.S. Appl. No. 17/303,371.
Pending claims of U.S. Appl. No. 17/101,996.
Allowed claims of U.S. Appl. No. 17/512,933.
Allowed claims of U.S. Appl. No. 17/693,985.
Pending claims of U.S. Appl. No. 17/443,229.
Pending claims of U.S. Appl. No. 18/138,384.

* cited by examiner

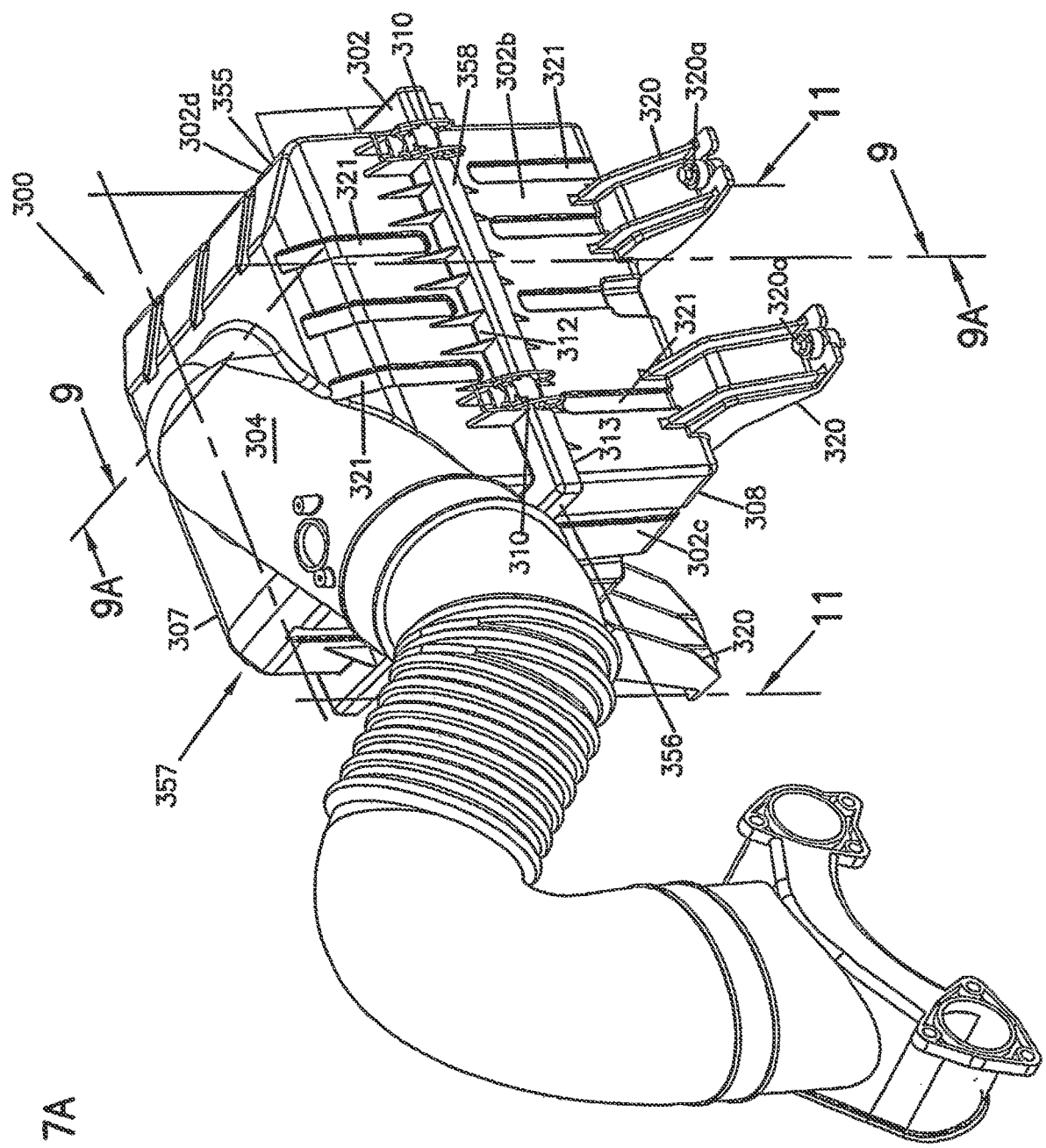

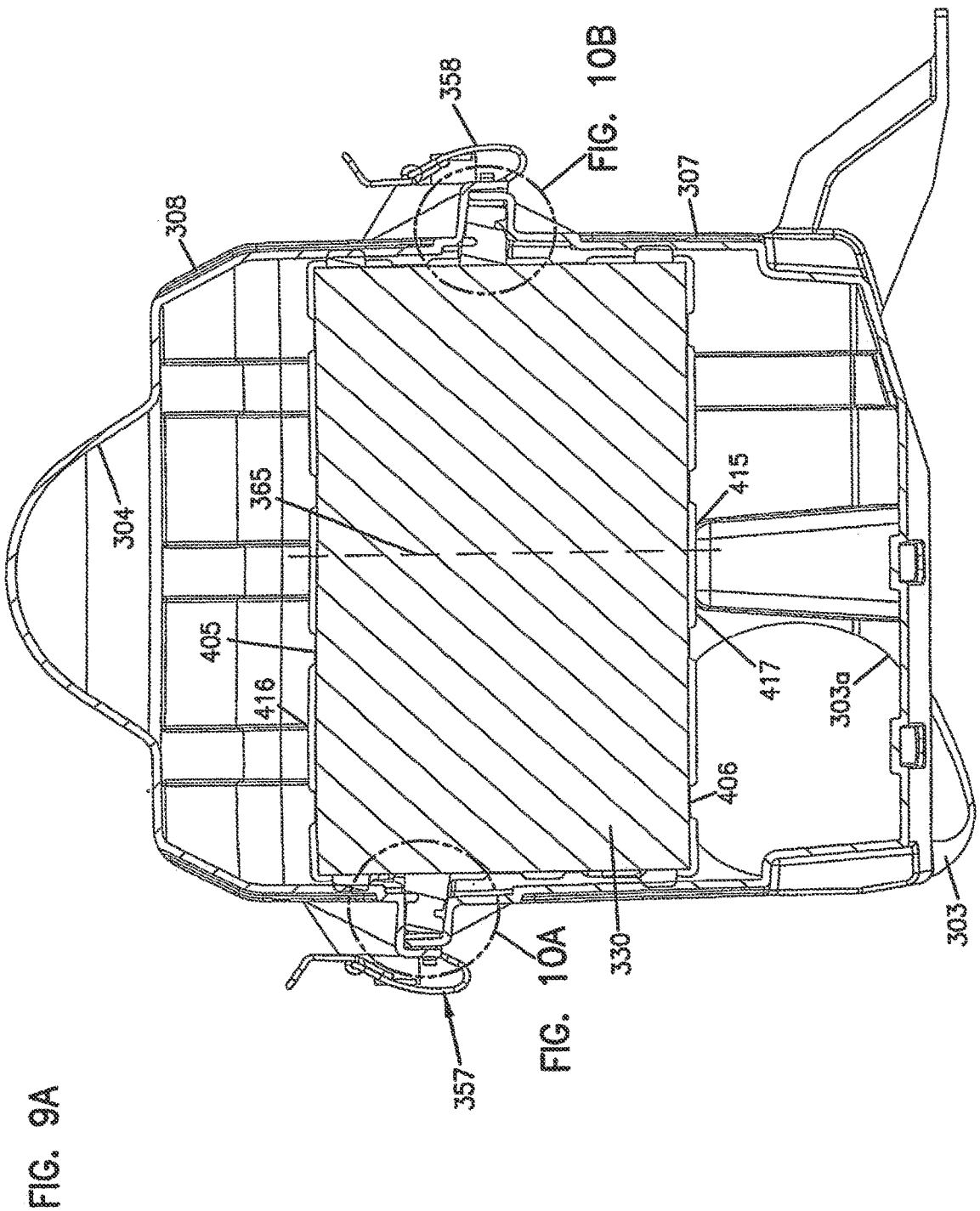

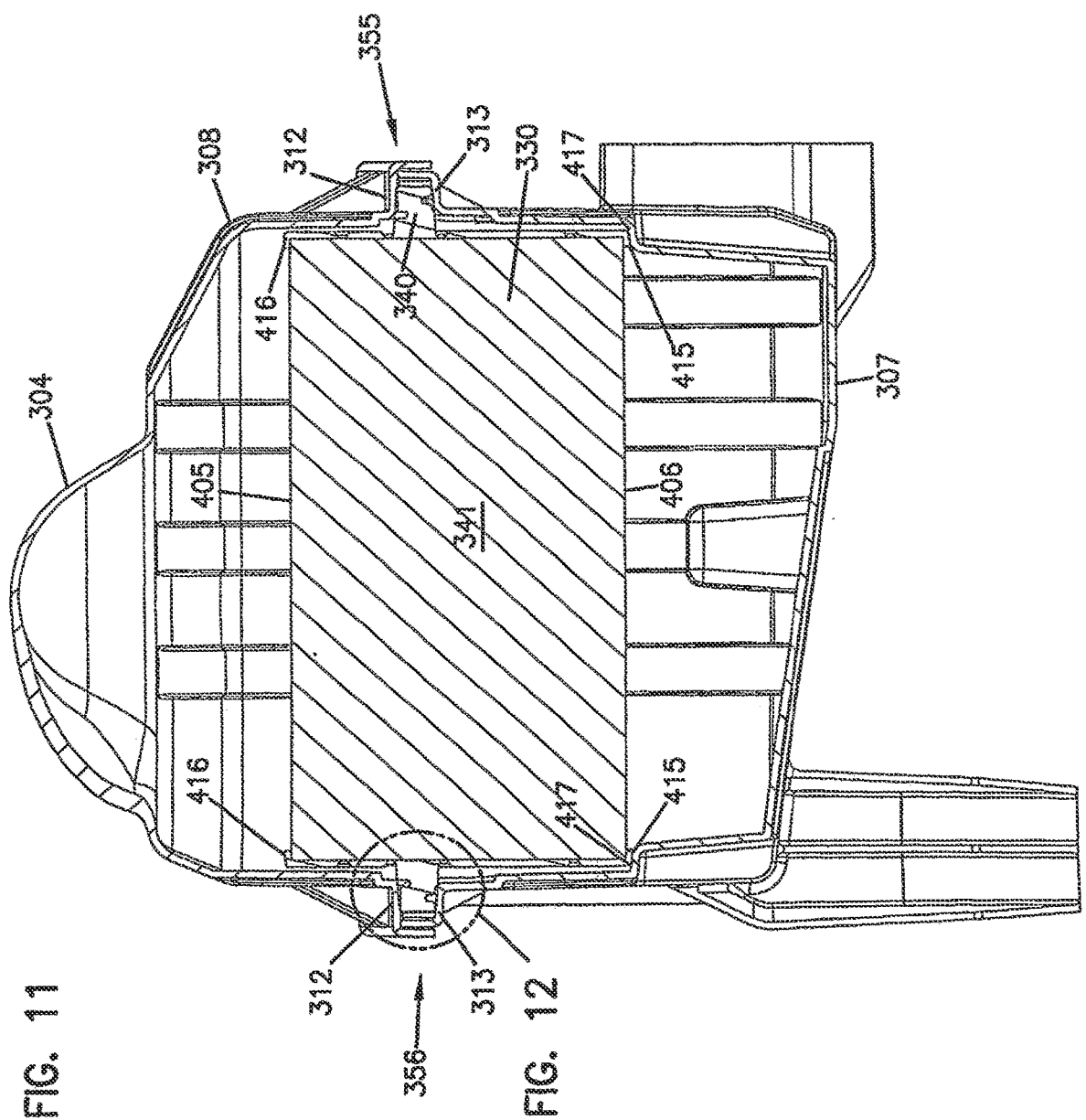

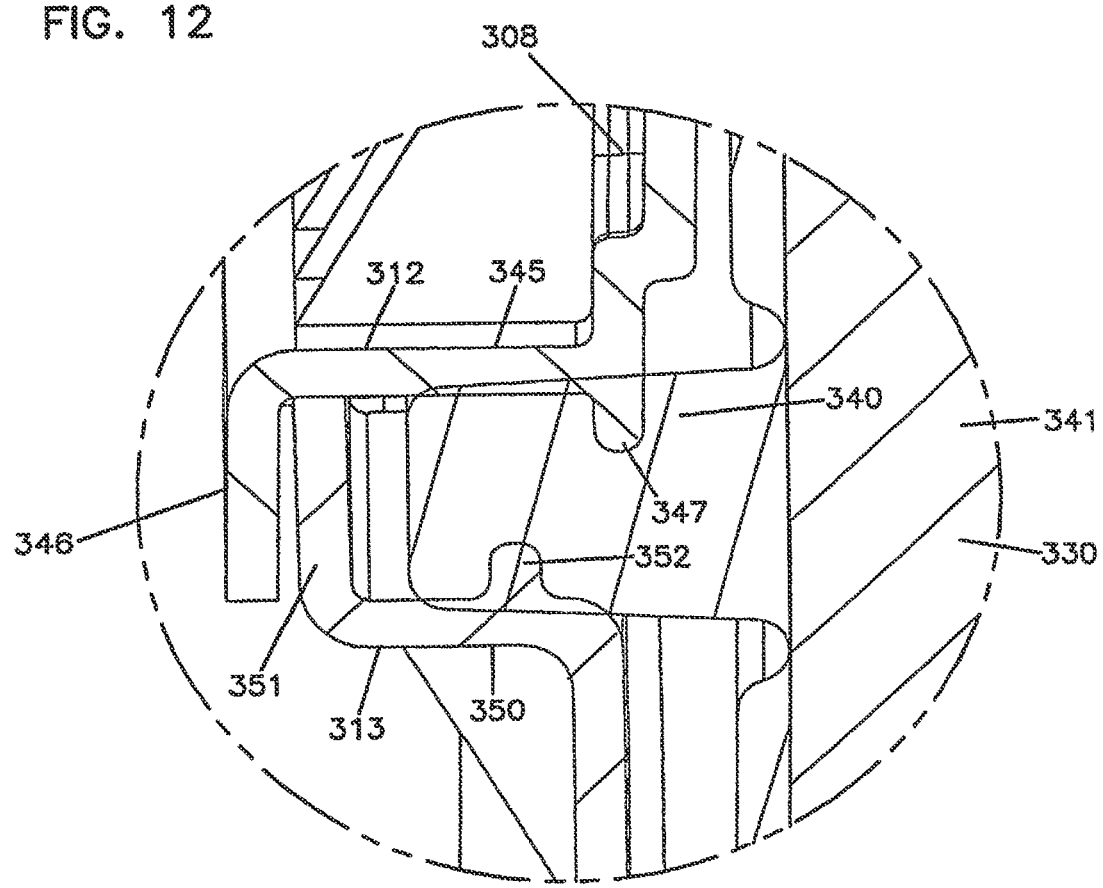

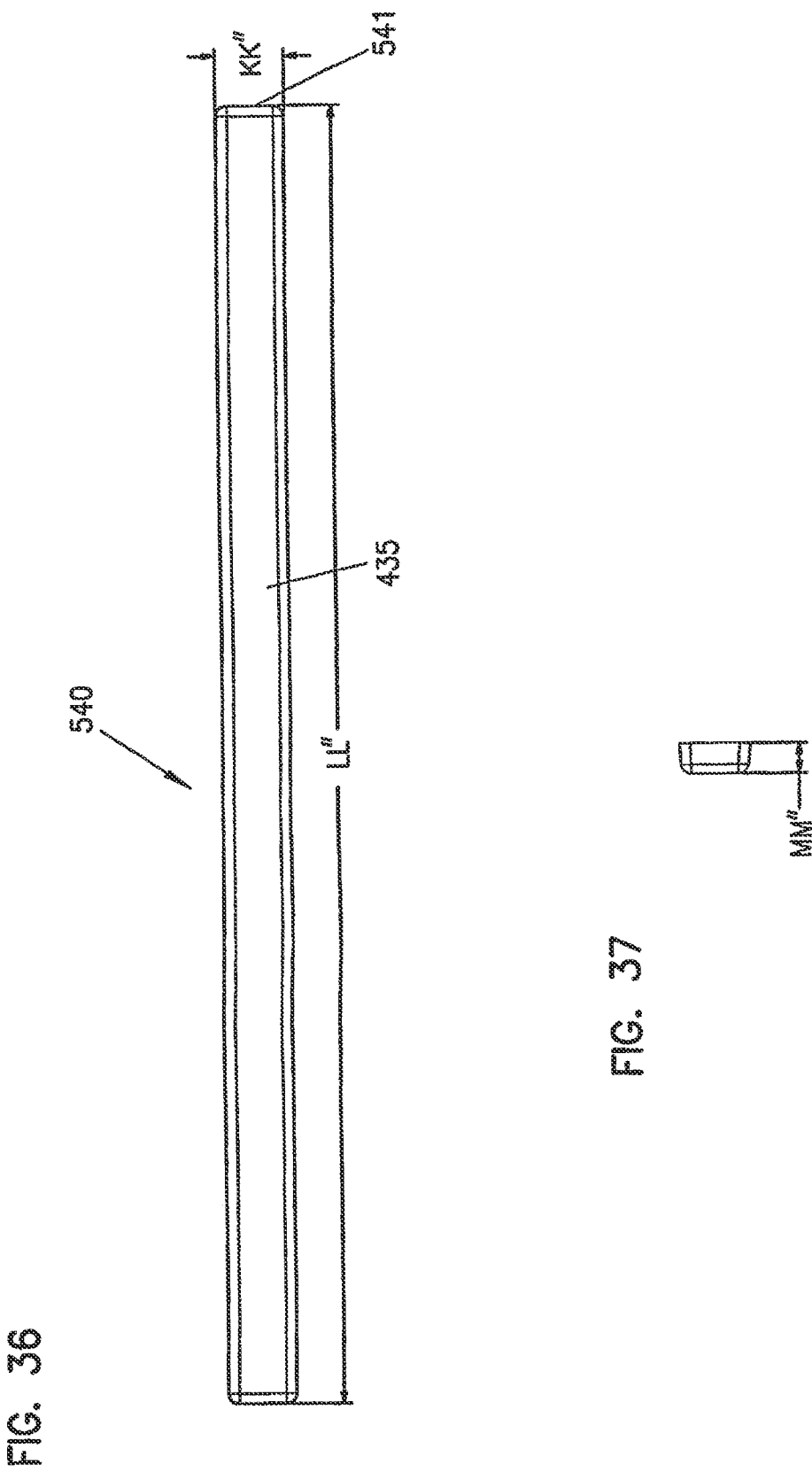

AIR FILTER ARRANGEMENT; ASSEMBLY; AND, METHODS

CROSS-REFERENCE TO RELATED APPLICATIONS

The present application is a continuation application of U.S. Ser. No. 17/303,371, filed May 27, 2021. U.S. Ser. No. 17/303,371 is a continuation application of U.S. Ser. No. 16/573,112, filed Sep. 17, 2019, now U.S. Pat. No. 11,020, 699. U.S. Ser. No. 16/573,112 is a continuation of U.S. Ser. No. 16/285,845, filed Feb. 26, 2019, now U.S. Pat. No. 10,421,034. U.S. Ser. No. 16/285,845 is a continuation of U.S. Ser. No. 15/387,820, filed Dec. 22, 2016, and which issued as U.S. Pat. No. 10,315,144 on Jun. 11, 2019. U.S. Ser. No. 15/387,820 is a continuation of U.S. Ser. No. 14/263,195, filed Apr. 28, 2014, and which issued as U.S. Pat. No. 9,527,023. U.S. Ser. No. 14/263,195 is a continuation of U.S. Ser. No. 13/616,087, filed Sep. 14, 2012, and which issued as U.S. Pat. No. 8,709,119. U.S. Ser. No. 13/616,087 is a continuation of U.S. Ser. No. 11/795,176, filed Dec. 22, 2008, and which issued as U.S. Pat. No. 8,292,983. U.S. Ser. No. 11/795,176 is filed from PCT application PCT/US2006/001061, filed Jan. 12, 2006; the PCT application claiming priority to U.S. Ser. No. 60/644, 094 filed Jan. 13, 2005; and, U.S. Ser. No. 60/651,838 filed Feb. 8, 2005. The complete disclosures of U.S. Ser. No. 17/303,371, U.S. Ser. No. 16/573,112; U.S. Ser. No. 16/285, 845, U.S. Ser. No. 15/387,820; U.S. Ser. No. 14/263,195; U.S. Ser. No. 13/616,087; U.S. Ser. No. 11/795,176; PCT/US2006/001061; U.S. Provisional 60/644,094; and, U.S. Provisional Application 60/651,838 are incorporated herein by reference. A claim of priority to each of U.S. Ser. No. 17/303,371, U.S. Ser. No. 16/573,112; U.S. Ser. No. 16/285, 845, U.S. Ser. No. 15/387,820; U.S. Ser. No. 14/263,195; U.S. Ser. No. 13/616,087; U.S. Ser. No. 11/795,176; PCT/US006/001061; U.S. provisional Application 60/644,094; and, U.S. Provisional Application 60/651,838 is made to the extent appropriate.

FIELD OF THE DISCLOSURE

The present disclosure relates to filter media for use in filtering gases. The disclosure particularly relates to media packs that use z-filter media which comprises a corrugated media sheet secured to facing sheet, formed into a media pack. More specifically, the disclosure relates to such media packs and their inclusion in serviceable filter cartridge arrangements, typically for use in air cleaners. Air cleaner arrangements, methods of assembly and use, and systems of use are also described.

BACKGROUND

Fluid streams, such as air, can carry contaminant material therein. In many instances, it is desired to filter some or all of the contaminant material from the fluid stream. For example, air flow streams to engines (for example combustion air) for motorized vehicles or for power generation equipment, gas streams to gas turbine systems and air streams to various combustion furnaces, carry particulate contaminant therein that should be filtered. It is preferred for such systems, that selected contaminant material be removed from (or have its level reduced in) the fluid. A variety of fluid filter (air or liquid filter) arrangements have been developed for contaminant rejection. However, continued improvements are sought.

Certain of the techniques described herein are related to those described in U.S. Provisional Application Ser. No. 60/599,686 filed Aug. 6, 2004; a complete disclosure of which is incorporated herein by reference. The present provisional application also includes some techniques described in U.S. Provisional Application Serial Number filed Aug. 9, 2004, the complete disclosure of which is incorporated herein by reference.

Further, the present provisional application includes certain the techniques in U.S. Provisional Application Ser. No. 60/602,721 filed Aug. 18, 2004; the complete disclosure of which is incorporated herein by reference.

Also, the present provisional application includes certain of the techniques described in U.S. Provisional Application Ser. No. 60/616,364 filed Oct. 5, 2004; the complete disclosure of which is incorporated herein by reference.

SUMMARY

According to a portion of the present disclosure, features useable in preferred filter cartridges, such as air filter cartridges are provided. The features can be used together to provide a preferred filter cartridge, however some advantageous cartridges can be constructed to use only selected ones of the features. In addition, methods of construction and use are provided.

In one aspect of the present disclosure, a preferred media pack is provided, for use in, or as, an air filter cartridge. The media pack comprises a stacked z-filter arrangement having opposite flow faces and opposite sides. At the opposite sides, ends of stacked strips are secured in, and sealed by, molded end (side) pieces. Typically the molded end (side) pieces are molded-in-place and comprise molded polyurethane. Also, a useful molded-in-place seal arrangement is also described.

Also air cleaner arrangements which use the filter cartridge as a service component are also described.

Various preferred features for a filter cartridge, for a described type of application, are shown. In addition, shown and described are variations in air cleaners and air cleaner systems. Also, methods of assembly and use are shown and described.

BRIEF DESCRIPTION OF THE DRAWINGS

FIG. 7A is a schematic top perspective view of the assembly depicted in FIG. 7, from a generally opposite direction.

FIG. 9A is a schematic enlarged cross-sectional view taken in the opposite direction of the line 9-9, FIG. 7A, from the direction for the viewing of FIG. 9.

FIG. 11 is a schematic enlarged cross-sectional view taken generally along line 11-11, FIG. 7A.

FIG. 12 is a schematic enlarged fragmentary cross-sectional view of a portion of FIG. 11.

FIG. 13 is taken generally toward a housing inlet and in FIG. 13 selected, example, dimension angle definitions are shown.

FIG. 15 being a perspective view taken generally toward an outlet flow surface.

FIG. 36 is a schematic side elevational view of a bumper component used a third and fourth bumper features in the cartridge of FIG. 15.

FIG. 37 is a schematic side elevational view of the bumper component depicted in FIG. 36.

Figure 1:
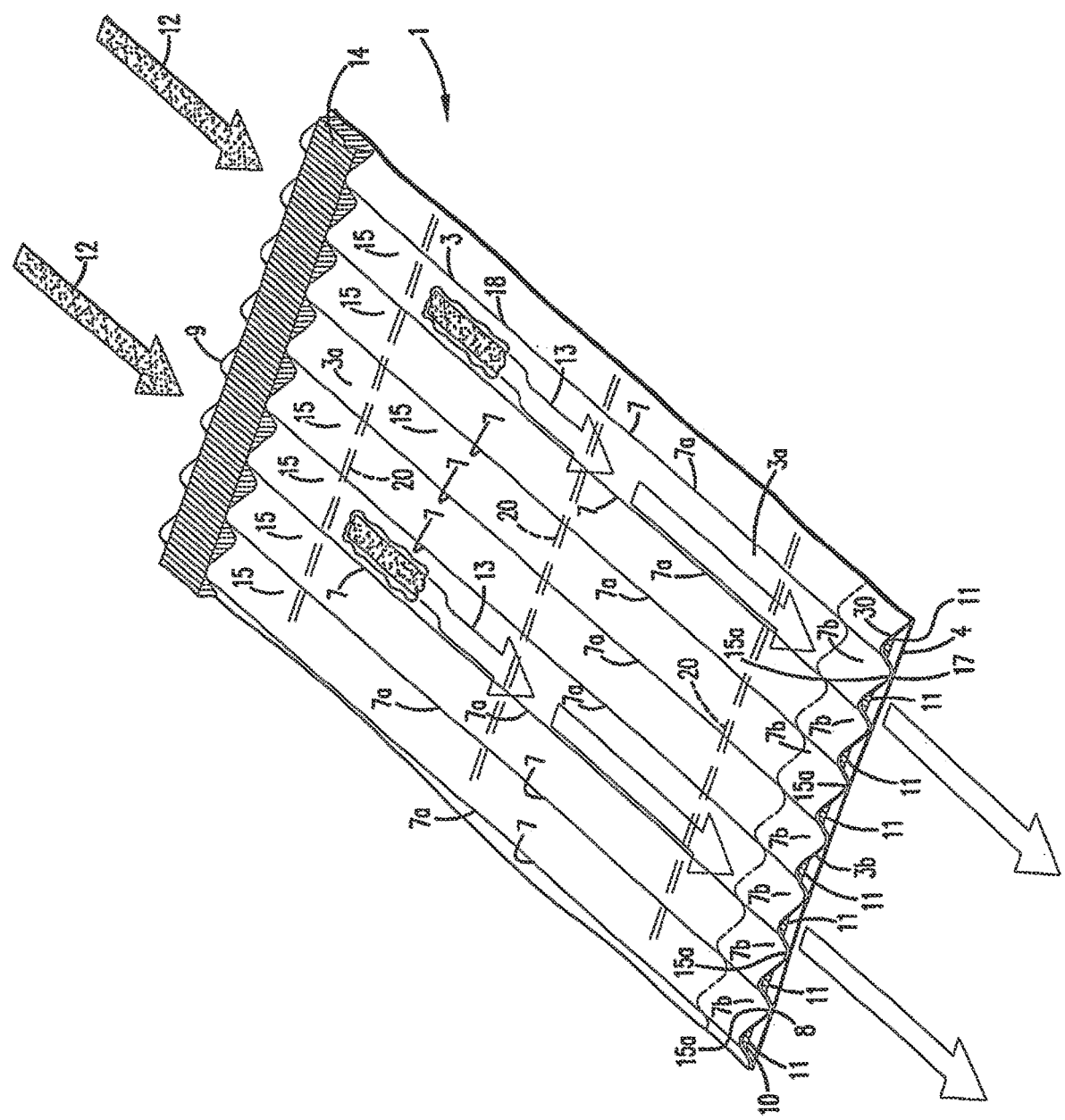
FIG. 1 is a fragmentary, schematic, perspective view of z-filter media useable in arrangements according to the present disclosure.

Some dimension and angle lines are provided in certain drawings, with corresponding example figures provided in the text as examples. Alternate sizes are possible.

DETAILED DESCRIPTION

I. Z-Filter Media Configurations, Generally

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428, 128; Des. 396,098; Des. 398,046; and, Des. 437,401; each of these fifteen cited references being incorporated herein by reference.

One type of z-filter media, utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference.

The fluted (typically corrugated) media sheet and the facing media sheet together, are used to define media having parallel inlet and outlet flutes. In some instances, the fluted sheet and facing sheet are secured together and are then coiled to form a z-filter media construction. Such arrangements are described, for example, in U.S. Pat. Nos. 6,235, 195 and 6,179,890, each of which is incorporated herein by reference. In certain other arrangements, some non-coiled sections of corrugated media secured to facing media are stacked on one another, to create a filter construction. An example of this is described in FIG. 11 of incorporated herein by reference.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner. In some instances, each of the inlet flow end and outlet flow end will be generally flat or planar, with the two parallel to one another. However, variations from this, for example non-planar faces, are possible.

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn inside of the cartridge and as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to allow for definition of inlet and outlet flutes; and/or, a media pack constructed or formed from such media into a three dimensional network of inlet and outlet flutes; and/or, a filter cartridge or construction including such a media pack.

In FIG. 1, an example of media 1 useable in z-filter media is shown. The media 1 is formed from a corrugated sheet 3 and a facing sheet 4.

In general, the corrugated sheet 3, FIG. 1 is of a type generally characterized herein as having a regular, curved, wave pattern of flutes or corrugations 7. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically in a regular configuration each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. A typical radius for such z-filter media would be at least 0.25 mm and typically would be not more than 3 mm.

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, curved, wave pattern corrugated sheet 3 shown in FIG. 1, is that the individual corrugations are generally straight. By "straight" in this context, it is meant that through at least 70%, typically at least 80% of the length between edges 8 and 9, the ridges 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is coiled and formed into a media pack, in general edge 9 will form an inlet end for the media pack and edge 8 an outlet end, although an opposite orientation is possible.

Adjacent edge 8 is provided a sealant bead 10, or other seal arrangement, sealing the corrugated sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom.

Adjacent edge 9, is provided seal bead 14, or seal arrangement. Seal bead 14 generally closes flutes 15 to passage of unfiltered fluid therein, adjacent edge 9. Bead 14 would typically be applied as strips of the media 1 are secured to one another during stacking. Thus, bead 14 will form a seal between a back side 17 of facing sheet 4, and side 18 of the next adjacent corrugated sheet 3. When the media 1 is cut in strips and stacked, instead of coiled, bead 14 is sometimes referenced as a "stacking bead." (When bead 14 is used in a coiled arrangement, not depicted herein, it is sometimes referenced as a "winding bead.")

Referring to FIG. 1, once the media 1 is incorporated into a media pack, for example by stacking, it can be operated as follows. First, air in the direction of arrows 12, would enter open flutes 11 adjacent end 9. Due to the closure at end 8, by bead 10, the air would pass through the media shown by arrows 13. It could then exit the media pack, by passage through open ends 15a of the flutes 15, adjacent end 8 of the media pack. Of course operation could be conducted with air flow in the opposite direction.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering at least a portion of the stretch and bending that has occurred. The facing sheet is sometimes tacked to the fluted sheet, to inhibit this spring back in the corrugated sheet.

Also, typically, the media contains a resin. During the corrugation process, the media can be heated to above the glass transition point of the resin. When the resin then cools, it will help to maintain the fluted shapes.

The media of the corrugated sheet 3 facing sheet 4 or both, can be provided with a fine fiber material on one or both sides thereof, for example in accord with U.S. Pat. No. 6,673,136, incorporated herein by reference.

An issue with respect to z-filter constructions relates to closing of the individual flute ends. Although alternatives are possible, typically a sealant or adhesive is provided, to accomplish the closure. As is apparent from the discussion above, in typical z-filter media, especially that which uses straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Figure 2:
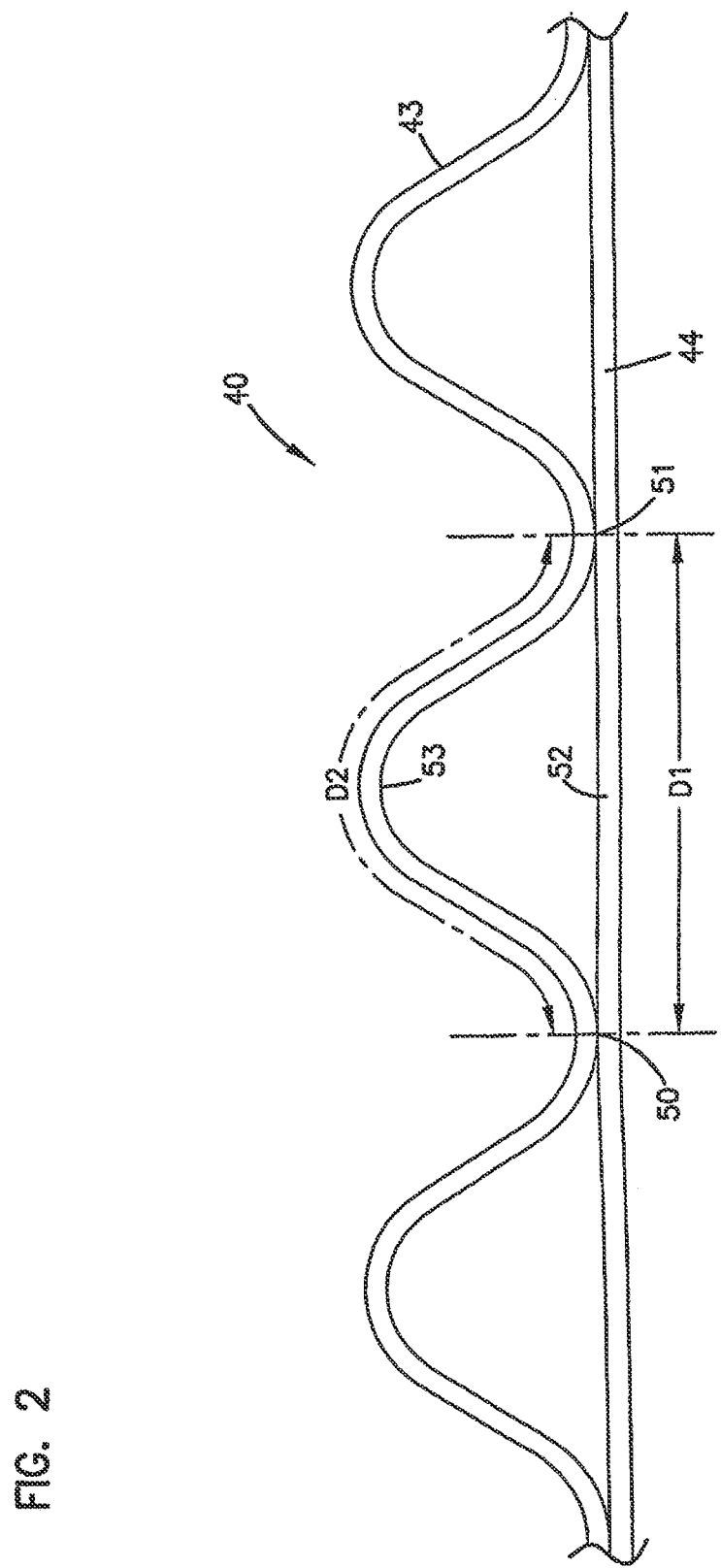
FIG. 2 is an enlarged schematic, cross-sectional view of a portion of the media depicted in FIG. 1.

Attention is now directed to FIG. 2, in which a z-filter media construction 40 utilizing a regular, curved, wave pattern corrugated sheet 43, and a non-corrugated (flat) flowing sheet 44, is depicted. The distance D1, between points 50 and 51, defines the extension of media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will often be at least 1.2 times D1. Typically, D2 would be within a range of 1.2-2.0, inclusive. One particularly convenient arrangement for air filters has a configuration in which D2 is about 1.25-1.35× D1. Such media has, for example, been used commercially in Donaldson Powercore™ Z-filter arrangements. Herein the ratio D2/D1 will sometimes be characterized as the flute/flat ratio or media draw for the corrugated media.

Figure 3:
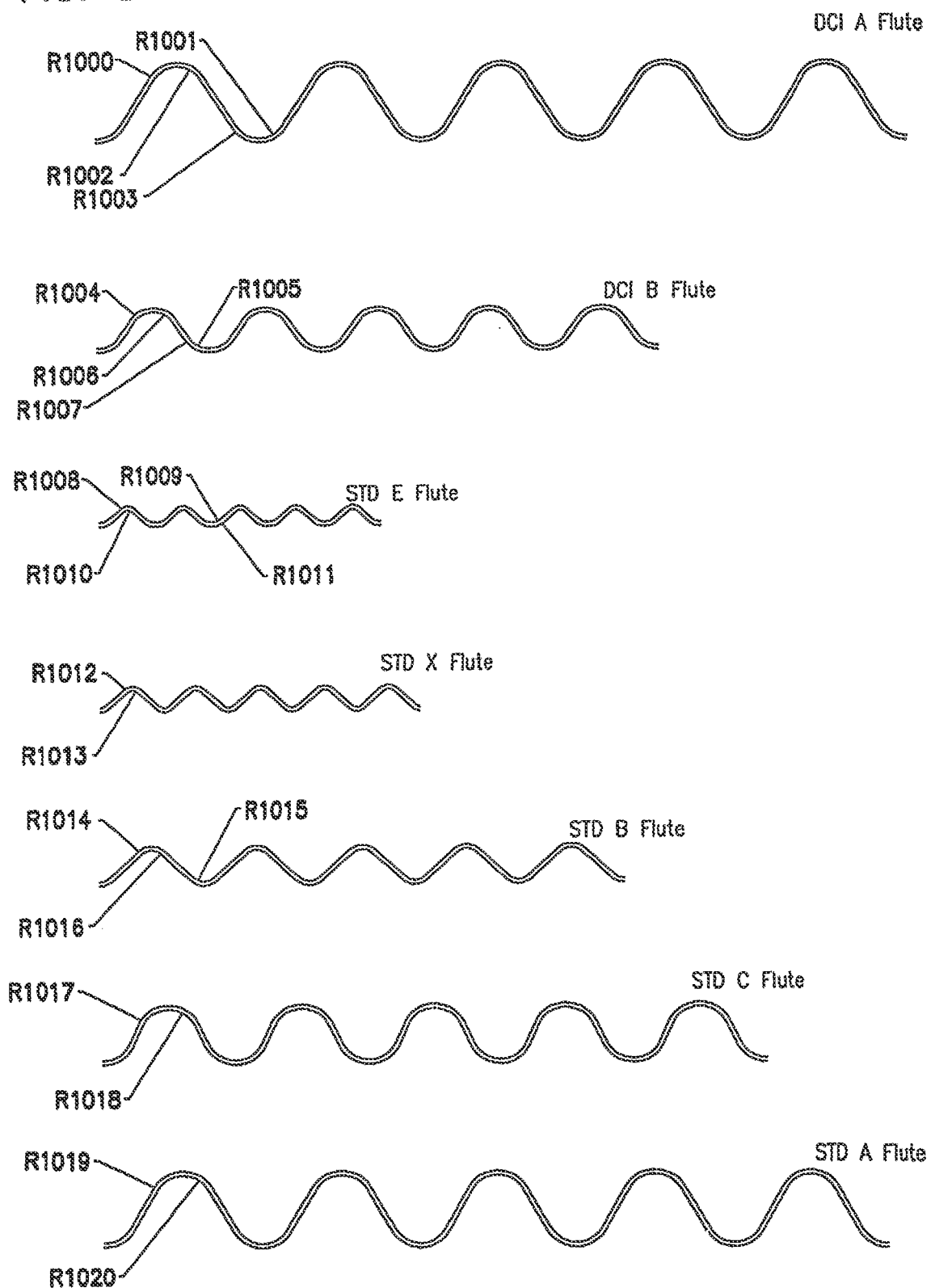
FIG. 3 is a schematic view of examples of various corrugated media definitions.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG.3)

| | |
|---|---|
| DCI A Flute: | Flute/flat = 1.52:1; The Radii (R) are as follows: R1000 = .0675 inch (1.715 mm); R1001 = .0581 inch (1.476 mm); R1002 = .0575 inch (1.461 mm); R1003 = .0681 inch (1.730 mm). |
| DCI B Flute: | Flute/flat = 1.32:1; The Radii (R) are as follows: R1004 = .0600 inch (1.524 mm); R1005 = .0520 inch (1.321 mm); R1006 = .0500 inch (1.270 mm); R1007 = .0620 inch (1.575 mm). |
| Std.E Flute: | Flute/flat = 1.24:1; The Radii (R) are as follows: R1008 = .0200 inch (.508 mm); R1009 = .0300 inch (.762 mm); R1010 = .0100 inch (.254 mm); R1011 = .0400 inch (1.016 mm). |
| Std. X Flute: | Flute/flat = 1.29:1; The Radii (R) are as follows: R1012 = .0250 inch (.635 mm); R1013 = .0150 inch (.381 mm). |
| Std. B Flute: | Flute/flat = 1.29:1; The Radii (R) are as follows: R1014 = .0410 inch (1.041 mm); R1015 = .0310 inch (.7874 mm); R1016 = .0310 inch (.7874 mm). |
| Std. C Flute: | Flute/flat = 1.46:1; The Radii (R) are as follows: R1017 = .0720 inch (1.829 mm); R1018 = .0620 inch (1.575 mm). |
| Std. A Flute: | Flute/flat = 1.53:1; The Radii (R) are as follows: R1019 = .0720 inch (1.829 mm); R1020 = .0620 inch (1.575 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

Referring again to FIG. 1, at 20 lines of tack beads are shown between fluted sheet 3 and the facing sheet 4. Adhesive is used at these locations, to facilitate securing the two sheets. The adhesive lines do not need to be continuous.

It should be understood that air can move between adjacent inlet flutes, without passing through media. Air can also move between adjacent outlet flutes, without passing through media. However, air cannot move from an inlet flute to an outlet flute, without passage through the media (with filtering flow).

II. Manufacture of Stacked Media Configurations Using Fluted Media, Generally.

Figure 4:
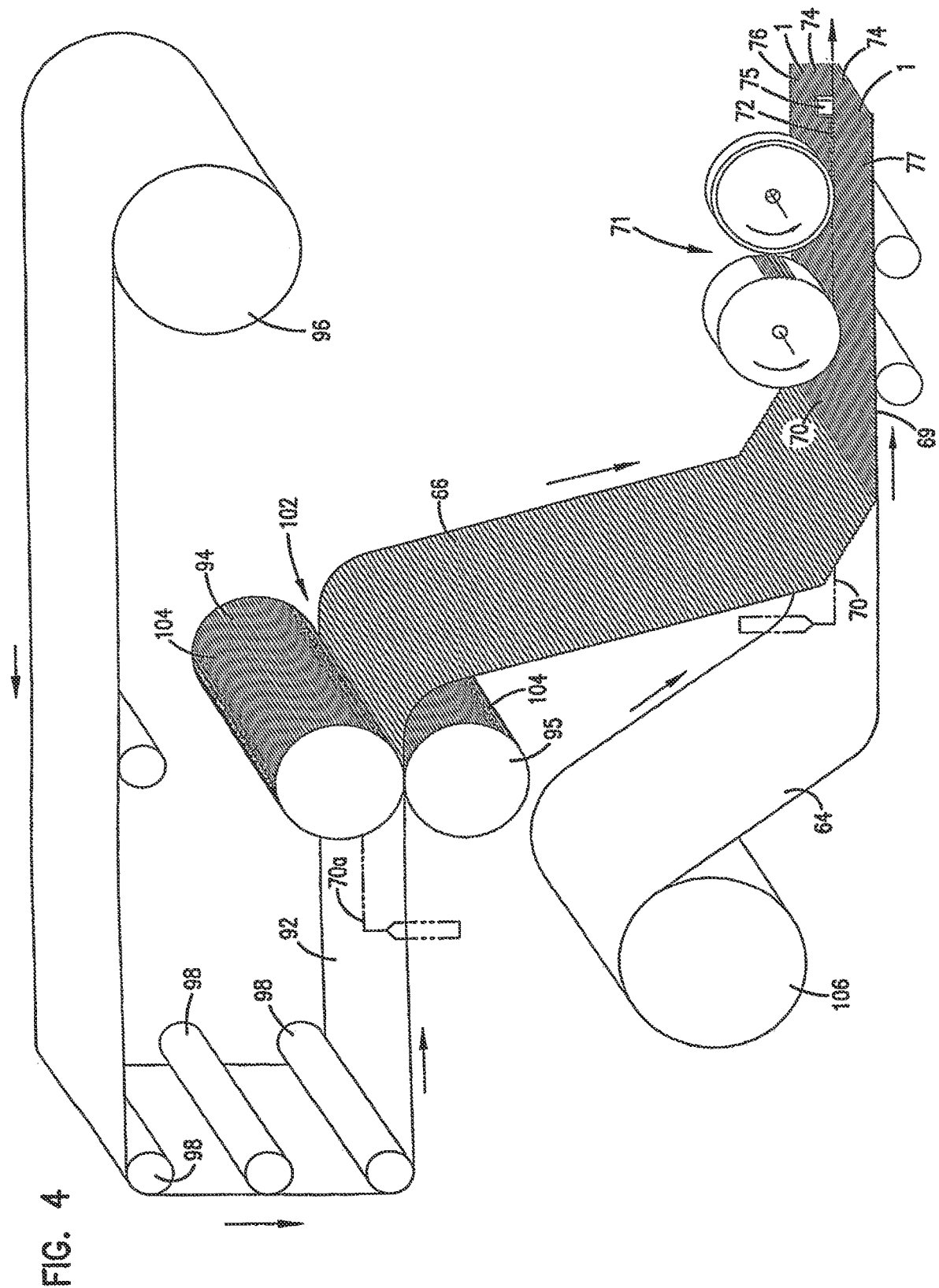
FIG. 4 is a schematic view of a process for manufacturing media according to the present disclosure.

In FIG. 4, one example of a manufacturing process for making a media strip corresponding to strip 1, FIG. 1 is shown. In general, facing sheet 64 and the fluted (in the example shown corrugated) sheet 66 having flutes 68 are brought together to form a media web 69, with an adhesive bead located therebetween at 70. The adhesive bead 70 will form a single facer bead 10, FIG. 1. An optional darting process occurs at station 71 to form center darted section 72 located mid-web. The z-filter media or Z-media strip 74 can be cut or slit at along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location. The strips or pieces 76, 77 can then be cut across, for stacking, as described below in connection with FIG. 6.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 the media 74 must be formed. In the schematic shown in FIG. 4, this is done by passing a flat sheet of media 92 through a pair of corrugation rollers 94, 95. In the schematic shown in FIG. 4, the flat sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the flat sheet 92 becomes corrugated and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 are secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70*a*. If the sealant is applied at 70*a*, it may be desirable to put a gap in the corrugation roller 95, and possibly in both corrugation rollers 94, 95, to accommodate the bead 70*a*.

Of course equipment can be added to the assembly line, to apply the tack beads 20, FIG. 1, if used.

The type of corrugation provided to the corrugated media is a matter of choice, and will be dictated by the corrugation or corrugation teeth of the corrugation rollers 94, 95. One preferred corrugation pattern will be a regular curved wave pattern corrugation, of straight flutes, as defined herein above. A typical regular curved wave pattern used, would be one in which the distance D2, as defined above, in a corrugated pattern is at least 1.2 times the distance D1 as defined above. In one preferred application, typically D2=1.25-1.35×D1. In some instances the techniques may be applied with curved wave patterns that are not "regular," including, for example, ones that do not use straight flutes.

Figure 5:
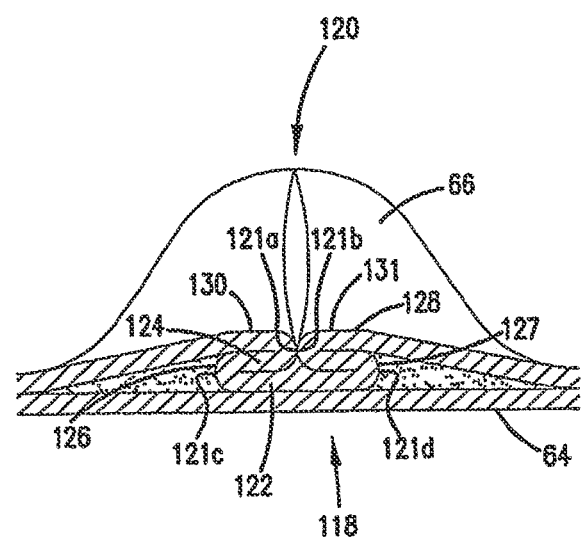
FIG. 5 is a schematic cross-sectional view of an optional end dart for media flutes useable in arrangements according to the present disclosure.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121*a*, 121*b*, 121*c*, 121*d*. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121*a*, 121*b* will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a preferred regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Other techniques for media management are described in PCT application US 04/07927, filed Mar. 17, 2004, incorporated herein by reference.

Techniques described herein are well adapted for use of media packs that result from arrangements that, instead of being formed by coiling, are formed from a plurality of strips of single facer.

Opposite flow ends or flow faces of the media pack can be provided with a variety of different definitions. In many arrangements, the ends are generally flat and perpendicular to one another.

The flute seals (single facer bead, winding bead or stacking bead) can be formed from a variety of materials. In various ones of the cited and incorporated references, hot melt or polyurethane seals are described as possible for various applications. These are useable for applications described herein.

Figure 6:
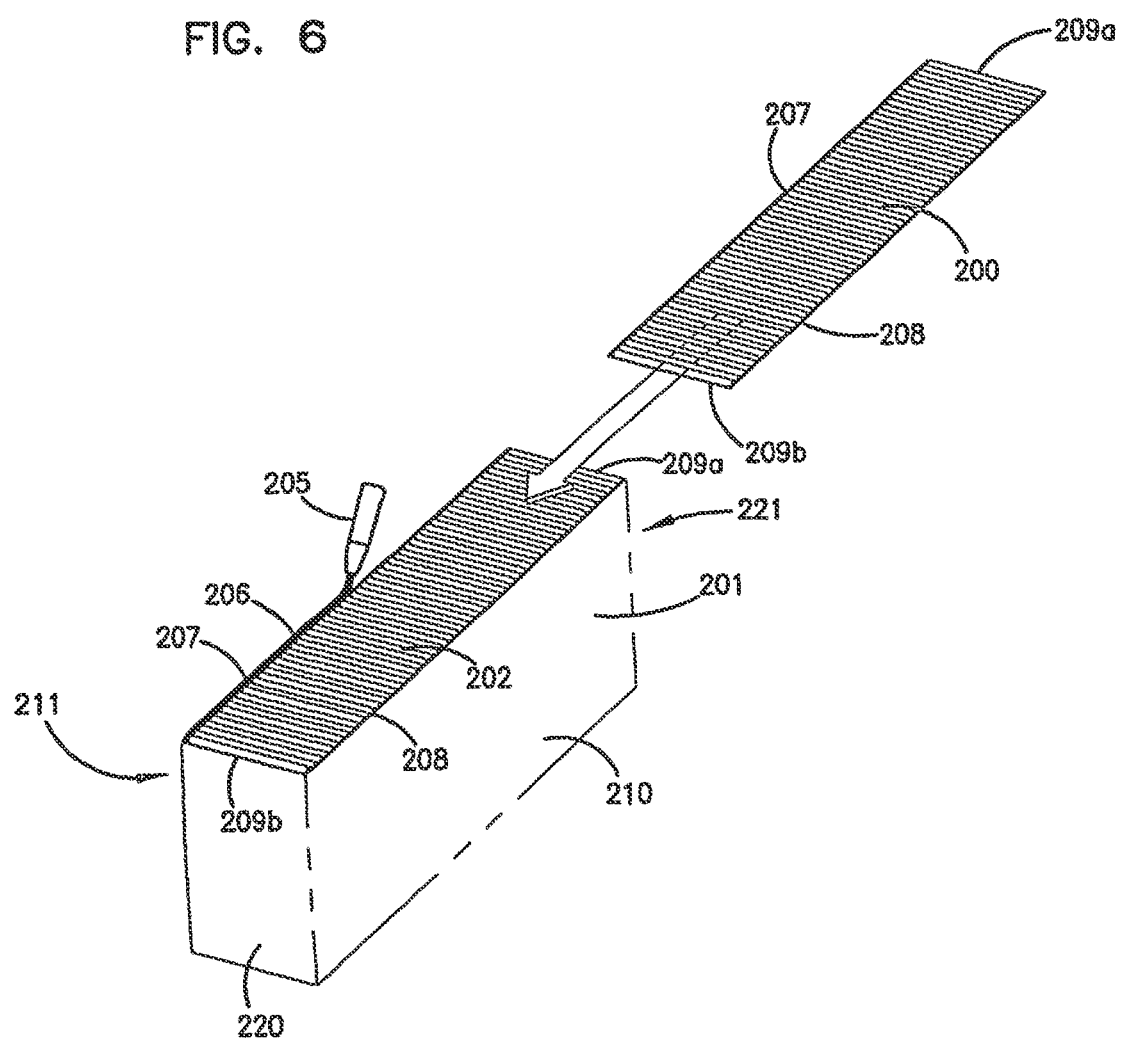
FIG. 6 is a schematic depiction of a step of creating a blocked, stacked z-filter media pack.

In FIG. 6, schematically there is shown a step of forming a stacked z-filter media pack from strips of z-filter media. Referring to FIG. 6, strip 200 is being shown added to a stack 201 of strips 202 analogous to strip 200. Strip 200 can be cut from either of strips 76, 77, FIG. 4. At 205, FIG. 6, application of a stacking bead 206 is shown, between each layer corresponding to a strip 200, 202 at an opposite edge from the single facer bead or seal. In FIG. 6, each layer is added to a top of the stack. Such layers could alternatively be added to the bottom.

Also, in some alternate processing approaches sealant bead 206 can be added to the underside (i.e., facing sheet side) of each strip, as opposed to the fluted sheet (corrugated) side of each single facer strip.

Referring to FIG. 6, each strip 200, 202 has front and rear edges 207, 208 and opposite side edges 209a, 209b. Inlet and outlet flutes of the corrugated sheet/facing sheet combination comprising each strip 200, 202 generally extend between the front and rear edges 207, 208, and parallel to side edges 209a, 209b. Sides 209a, 209b are sometimes referenced as tail and lead ends of the media strips 200.

Still referring to FIG. 6, in the media pack 201 being formed, opposite flow faces are indicated at 210, 211. The selection of which one of faces 210, 211 is the inlet end face and which is the outlet end face, during filtering, is a matter of choice. In some instances the stacking bead 206 is preferably positioned adjacent the upstream or inlet face 211. The flow faces 210, 211, extend between opposite side faces 220, 221.

The stacked media pack 201 being formed in FIG. 6, is sometimes referred to herein as a "blocked" stacked media pack. The term "blocked" in this context, is an indication that the arrangement is formed to a rectangular block in which all faces are at or nearly at 90° relative to all adjoining wall faces. Alternate configurations are possible, as discussed in U.S. Provisional application 60/579,754, filed Jun. 14, 2004, incorporated herein by reference. One example of an alternate configuration, would be one in which instead of each cross-section of the stacked media pack arrangement having rectangular (or right quadrilateral) cross-section, at least one of the cross-sections is a oblique parallelogram cross-section. In such a parallelogram, opposite sides are parallel to one another, but adjacent sides do not meet at a right angle, but rather meet at a defined angle other than 90°. Certain of the techniques described herein below can be used with either a blocked or a slanted stacked arrangement. In the figures, a blocked arrangement is shown.

Still other stacked shapes are possible, depending on how the individual sheets, in forming the stack, are positioned relative to adjacent sheets.

In some instances, the media pack 201 shown will be referenced as having a parallelogram shape in any cross-section, meaning that any two opposite side faces extend generally parallel to one another.

It is noted that a blocked, stacked arrangement corresponding to FIG. 6 is described in the prior art of U.S. Pat. No. 5,820,646, incorporated herein by reference. It is also noted that stacked arrangements are described in U.S. Pat. Nos. 5,772,883; 5,792,247; U.S. Provisional filed Mar. 25, 2003; and U.S. Ser. No. 10/731,564 filed Dec. 8, 2003. All four of these latter references are incorporated herein by reference. It is noted that the stacked arrangement at FIG. 6 of U.S. Ser. No. 10/731,504, is a slanted or oblique parallelogram stacked arrangement.

Of course the methods disclosed are merely examples. Useable z-filter media packs can be formed in alternate manners.

III. An Air Cleaner Assembly, FIGS. 7-14

In FIGS. 7-14, an air cleaner assembly is shown, which utilizes principles according to the present disclosure. The assembly depicted is meant to show an example embodiment for applications to the principles. The principles can be applied in a variety of alternate arrangements. In FIGS. 15-21, filter cartridge useable in the assembly of FIGS. 7-14 is depicted. The cartridge of FIGS. 15-21, is discussed in Section IV below.

In FIGS. 22-37 features of the cartridge depicted in FIGS. 15-21, are also shown. These are also discussed in Section IV below.

It is noted that for an assembly to be improved according to the principles of the present disclosure, it is not required that the assembly include all of the features illustrated in the depicted examples and described herein.

Air cleaner assemblies of the types depicted in FIGS. 7-14, are generally meant to be used within an enclosed engine compartment of a vehicle, such as a truck. Examples would be a pickup truck or a sports utility vehicle (SUV), or other vehicle. Of course the principles can be applied with air cleaners that are mounted elsewhere, however the principles described are particularly applied for assemblies which are configured to be positioned where there is limited space for equipment mounting, and service access.

Figure 7:
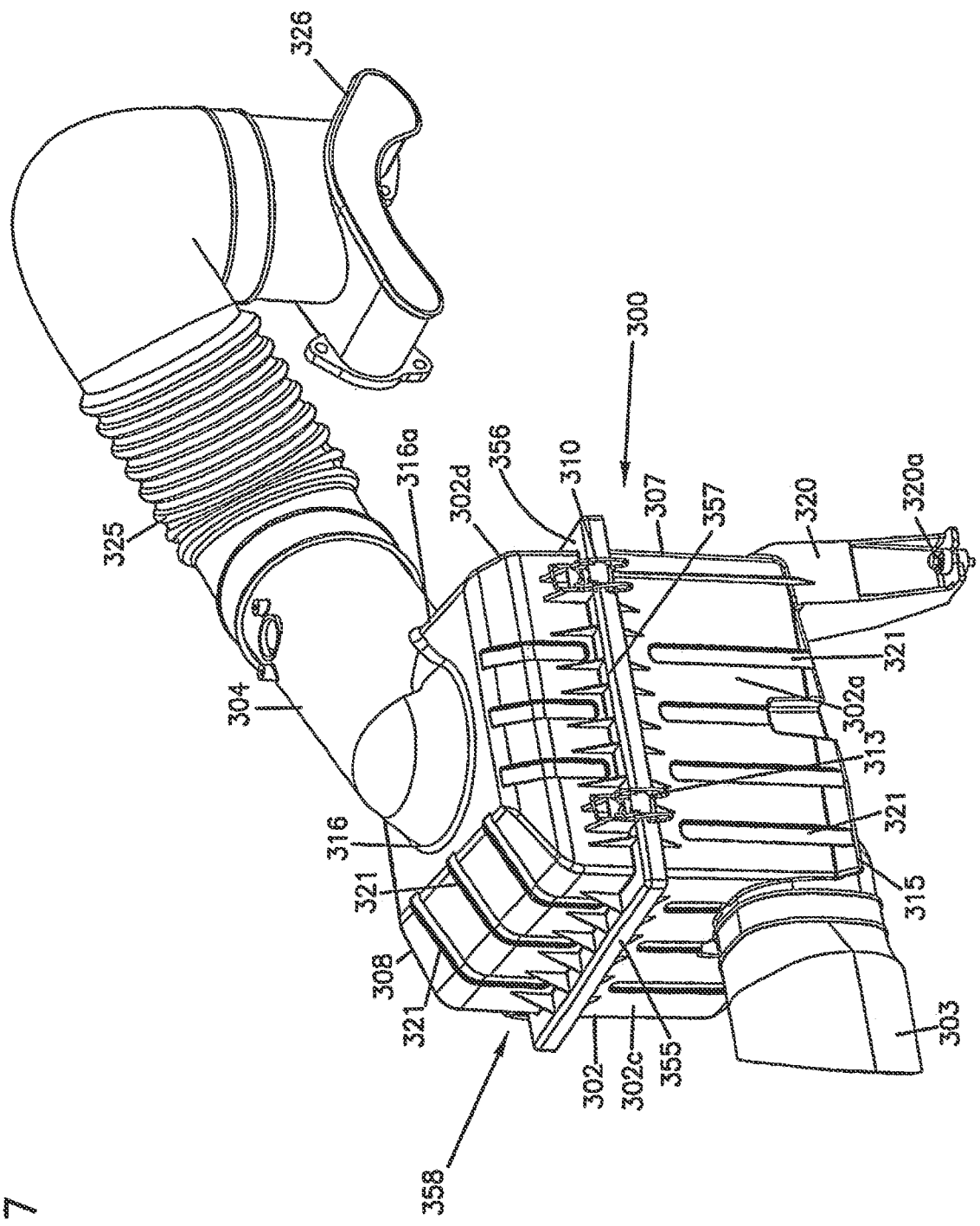
FIG. 7 is a schematic top perspective view of an air cleaner assembly including features according to the present disclosure.
Figure 8:
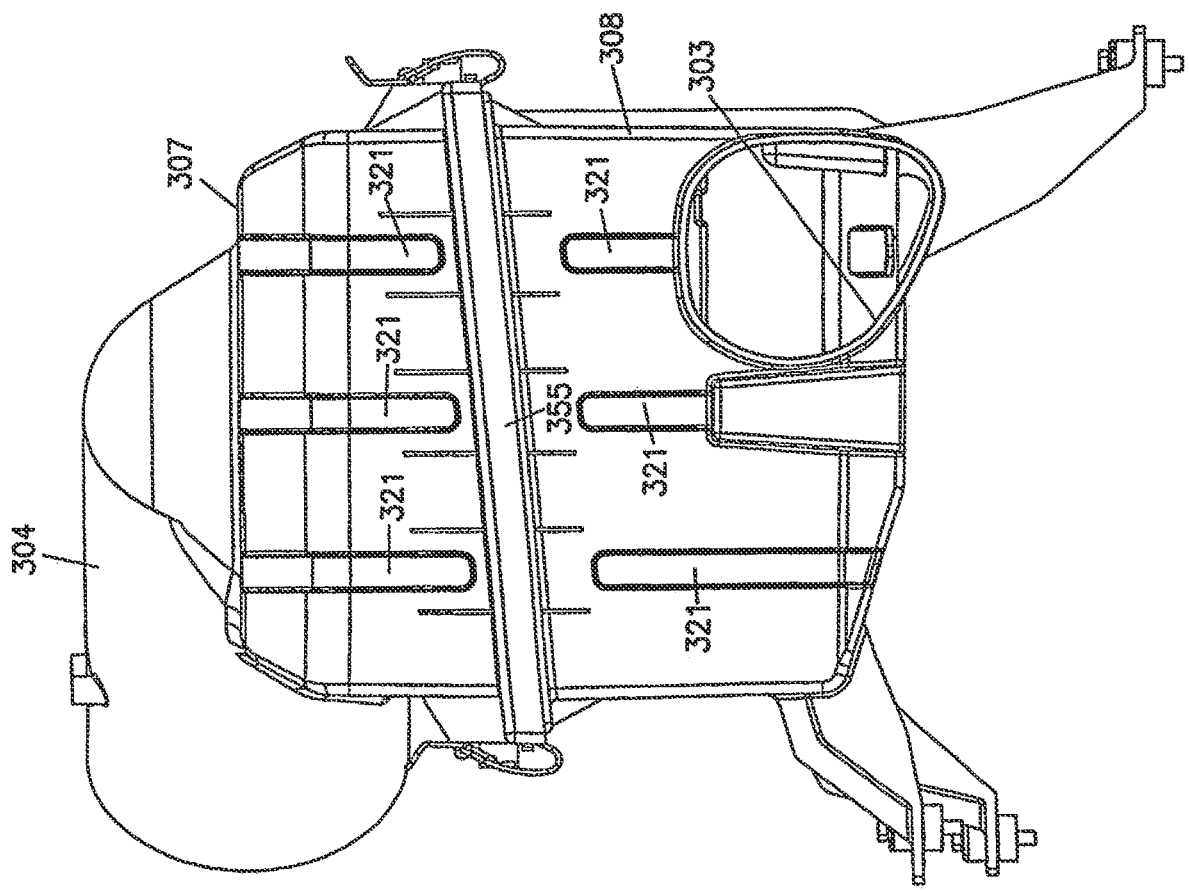
FIG. 8 is a side elevational view of the assembly of FIG. 7; the depiction of FIG. 8 being taken generally toward an inlet portion of the air cleaner assembly.

The reference numeral 300, FIG. 7, generally indicates an air cleaner assembly embodying principles according to the present disclosure. The air cleaner assembly 300 comprises a housing 302, a dirty air inlet duct arrangement 303 and a clean air outlet duct arrangement 304.

In general, housing 302 comprises housing base or bottom portion 307 and top or access cover 308. Cover 308 is removably secured to bottom 307, in this instance by latches 310. For the particular assembly 300 shown, there are four such latches 310 provided in two pairs, along selected opposite sides 302a, 302b of the housing 302. This can be seen by reference to FIG. 7A, in which an opposite side 302b from that (302a) viewable in FIG. 7 is shown.

It is noted that for the assembly 300 of FIG. 7 and FIG. 7A, a pair of opposite sides 302c, 302d are provided which have no latches thereon.

Air cleaner assembly 300 would typically be mounted in the general orientation shown in FIGS. 7 and 7A, with cover 308 positioned above base 307. Service access to an interior 309, of housing 302, FIG. 9, would generally be obtained from above, by removal of access cover 308. This facilitates servicing of interiorly received componentry, as described below.

Cover 308 includes a peripheral, perimeter, flange arrangement 312 oriented to engage a peripheral perimeter flange arrangement 313 on base 307, when housing 302 is assembled. As will be understood from further descriptions below, peripheral perimeter flange arrangement 312 is generally oriented in overlap with peripheral perimeter flange arrangement 313, with a housing seal arrangement of an interiorly received filter cartridge, positioned and sealed therebetween. This will be understood from further discussions below in connection with other figures.

In general operation, dirty air to be filtered will be directed into housing 302 through inlet duct arrangement 303, FIG. 7. It is noted that the inlet duct 303 for the assembly shown, is directed into a lower portion 315 of base 307. The air would then pass upwardly through an internally received filter cartridge 330, FIG. 9, by which it would be filtered. The air would then pass into clean air outlet duct arrangement 304. Referring to FIG. 7, it is noted that clean air outlet duct 304 engages cover 308, generally in both a central upper portion 316 and a corner portion 316a thereof.

It will be apparent then that when the assembly 300 is mounted in a vehicle or other equipment in the orientation shown in FIG. 7, the direction of filtering flow through an interior of housing 302, is generally upwardly.

Referring to FIGS. 7 and 7A, housing 302 includes mounting posts 320 secured to bottom portion 307. The assembly 300 can be operably (secured) mounted in a vehicle or onto other equipment, by posts 320, typically with bolts 320a providing attachment. The posts 320 would be sized, positioned and directed as appropriate, for a specific installation.

In a typical application, base 307 can be molded, integrally, from a structurally rigid plastic material. Cover or top 308 could also be molded, integrally, from a similar or identical plastic material. Rib structures 321, FIGS. 7 and 7A can be provided in the molded plastic components, to provide structural rigidity. It is noted that a variety of structural materials could be used; and, that many of the techniques described herein can be applied in arrangements that are not molded.

Still referring to FIG. 7, for assembly 300 depicted, the outlet duct arrangement 304 includes a conduit 325, secured to the housing 302. The conduit 325 can be used to direct the cleaned air into a manifold assembly 326 and into engine componentry, where the air is used. Typically the air would be directed to an engine combustion air intake or into a turbo charger or similar system.

Figure 9:
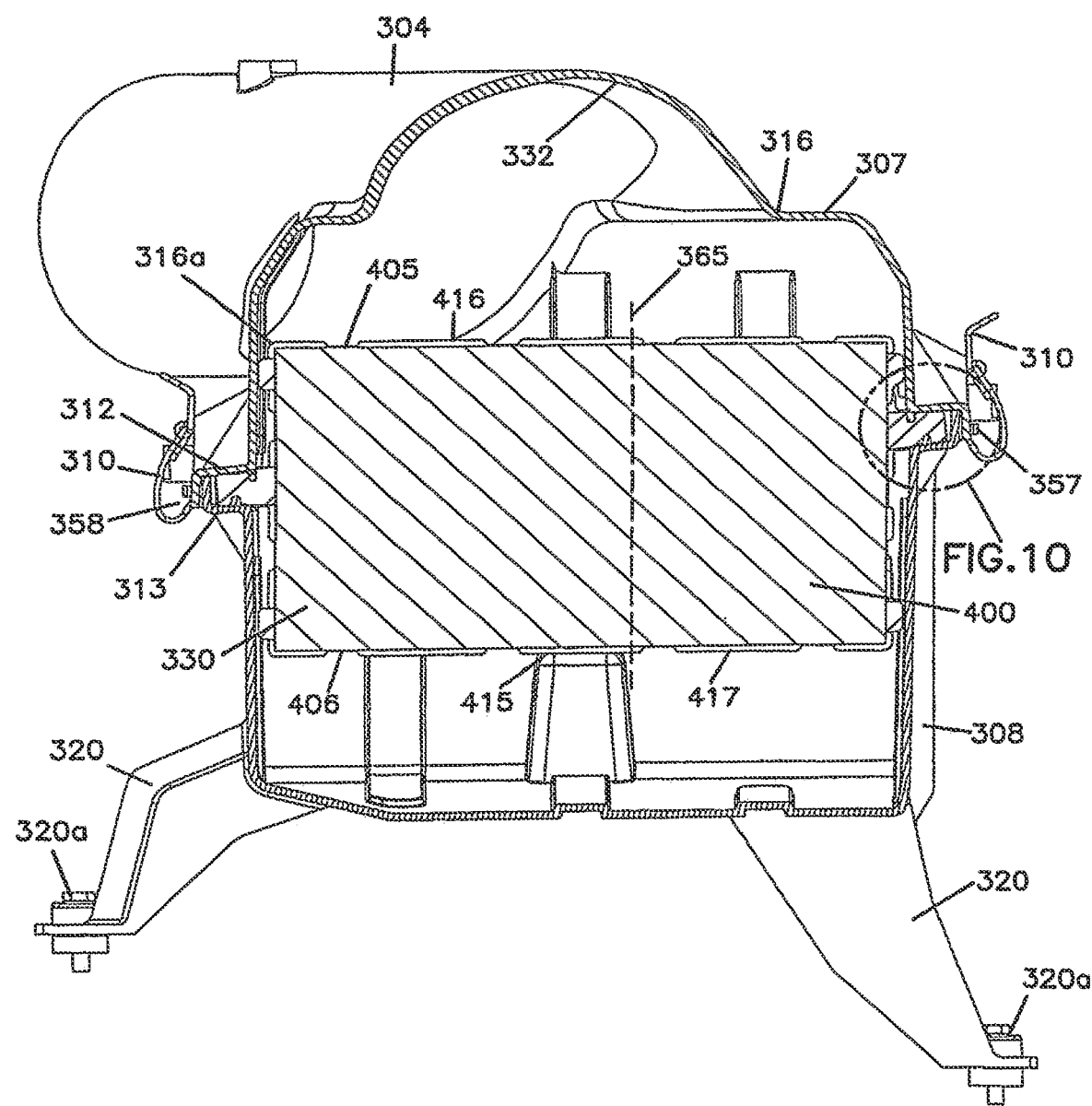
FIG. 9 is a schematic enlarged cross-sectional view taken generally along line 9-9, FIG. 7A.

Attention is now directed to FIG. 9, in which assembly 300 is depicted in cross-sectional view, taken generally along line 9-9, FIG. 7. In FIG. 9, housing interior 309 is viewable. Operably received within interior 302 is positioned filter cartridge 330. The filter cartridge 330 is a serviceable filter cartridge, meaning that the cartridge 330 is configured so that it can be removed and replaced, within interior 309. A typical service operation comprises removing cover 308 from base 307, by unlatching latches 310, and then removing cartridge 330 and replacing it with a refurbished or new cartridge. The cartridge 330 depicted, comprises cartridge 400 described below in connection with FIGS. 15-37.

Still referring to FIG. 9, outlet conduit section 332 is viewable. It can be seen that a portion of the conduit 332 is opened into interior 302, through a top central portion 316 of cover 308, and another portion enters interior 302 through corner section 316a. Attention is now directed to FIG. 9A, which is a cross-section analogous to FIG. 9, but taken facing the opposite direction. Here the entry juncture 303a between inlet conduit arrangement 303 and base 307 is viewable. It can be seen that the entry generally occurs underneath cartridge 330; or, more generally, along an opposite side of cartridge 330 from outlet arrangement 304.

Figure 10:
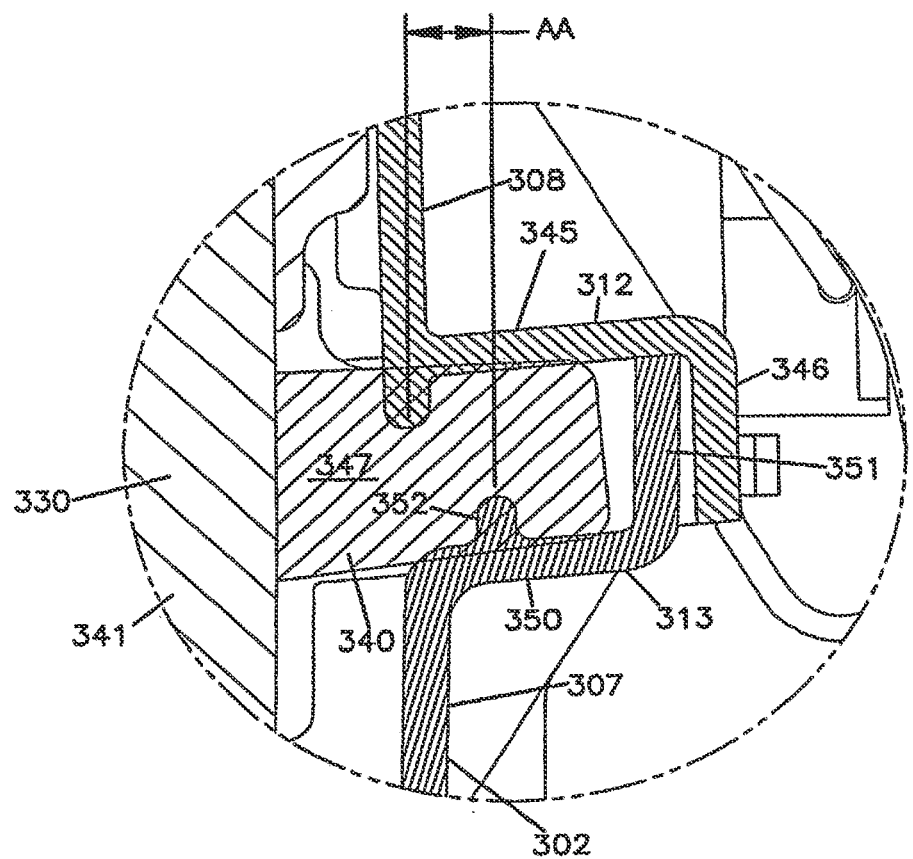
FIG. 10 is a schematic enlarged cross-sectional view of a portion of FIG. 9.

Attention is now directed to FIG. 10. In FIG. 10 a fragmentary cross-sectional view of a portion of FIG. 9 is depicted, the portion generally comprising a selected location where peripheral perimeter flange 312 on cover 308 overlaps peripheral perimeter flange arrangement 313 on base 307.

Referring to FIG. 10, cartridge 330 is shown having a peripheral, perimeter, housing seal member 340 thereon. Housing seal member 340 generally extends peripherally around media pack 341 of cartridge 330. Detail concerning the construction of cartridge 330 is provided herein below, in connection with FIGS. 15-37.

Housing seal member 340 is generally a compressible member, for example a compressible polymeric material. Examples are described below.

Referring to FIG. 10, peripheral flange arrangement 312 comprises: outwardly projecting flange 345; outer peripheral lip 346 and seal edge projection 347.

Similarly, peripheral perimeter flange assembly 313 comprises outwardly projecting flange 350; sealing projecting lip 351; and, seal edge projection 352.

For the arrangement shown, lip 346 is sized and positioned to extend around lip 351. Lip 351 is sized and configured to bottom out against outwardly projecting flange 345, when cover 308 is secured to base 307 by latches 310.

In more general terms: the flanges 312, 313 include an engagement arrangement, whereby one engages the other, during preferred securing of the cover 308 on the base 307. A specific example is shown, in which lip 351 on base 307 is sized and configured to engage flange 345 on cover 308. However alternate configurations are possible, for example in which a lip on cover 308 engages a flange on base 307.

Seal edge projection 347 is sized and positioned to press into peripheral, perimeter, housing seal member 340, when cover 308 is mounted on base 307. Similarly, seal edge projection 352 is sized and positioned to press into housing seal member 340, when cover 308 is positioned on base 307.

It is noted that seal edge projection 347 and seal edge projection 352 are radially offset from one another. That is, they are not positioned in direct overlap with one another. Referring to FIG. 10, the offset is indicated generally by dimension AA. A typical offset would be at least 3 mm and often at least 4.5 mm, for example 5 to 7 mm.

In typical preferred arrangements, in which the clean air side of the cartridge 330 is provided in the cover 307, the seal edge projection 347 will be positioned radially interiorly of the seal edge projection 352 to advantage. Alternately stated, typically the seal edge projection 352 of the air inlet portion (dirty air side) of the housing 302, in this instance base 307 will circumscribe a larger peripheral area of seal edge projection 347 of the air outlet portion (clean air side) of the housing 302, in this instance at the cover 308. An advantage of this is that the seal edge projection 347 on the clean air side of housing seal member 340, is positioned closer to the media pack 330. This helps ensure a good seal.

Referring to FIG. 10, it is noted that the figure is schematic. Actual compression of the peripheral, perimeter, housing seal member 340 is not shown. Rather what is shown, is the amount of interference between projections 347, 352, and the undistorted side shape of the peripheral perimeter housing seal member 340. In an actual installation, projections 347, 352, would project into member 340, and distort the shape of member 340.

Typically each one of the projections 347, 352 extends in a member 340 at least 0.5 mm, typically at least 1 mm, and usually within the range of 2-5 mm. The material of housing seal member 340 should be chosen, to allow for this projection. Typically projection 347 extends deeper into material 340, than does projection 352, as shown in the drawings. Typically the amount of greater extension is at least 0.25 mm, typically at least 0.5 mm.

It is noted that for a typical arrangement, projection 347 does not extend more than 50% through the thickness of housing seal member 340 at the location where it projects. Typically the amount of extension is no more than 40% of this thickness.

Similarly, projection 352 typically extends no more than 50% through the thickness of the housing seal arrangement 340 where located. Typically it extends no more than 40% of this distance.

Typically and preferably each of projections 347, 352 extends at least 10% of the way through the thickness of region 340, where located. Preferably in each case the extension is at least 15% of the thickness.

Preferably each projection 347, 352 comprises a knife end which compresses the media where at it is located at least 20%, typically 25%.

Still referring to FIG. 10, it is noted that for the assembly shown, flange 345 is positioned spaced from flange 350, when lip 351 is bottomed out against flange 345, a distance which is slightly less than a free-standing thickness of the housing seal member 340 at this location, as shown schematically by overlap between housing seal member 340, and flanges 345, 350. Thus, an additional sealing affect beyond the projections 347, 352, is accomplished through a general compressing of the housing seal member 340. For the example shown, this compression alone (in the absence of projections 347, 352) is generally at least 5%, typically about 10%.

Figure 10A:
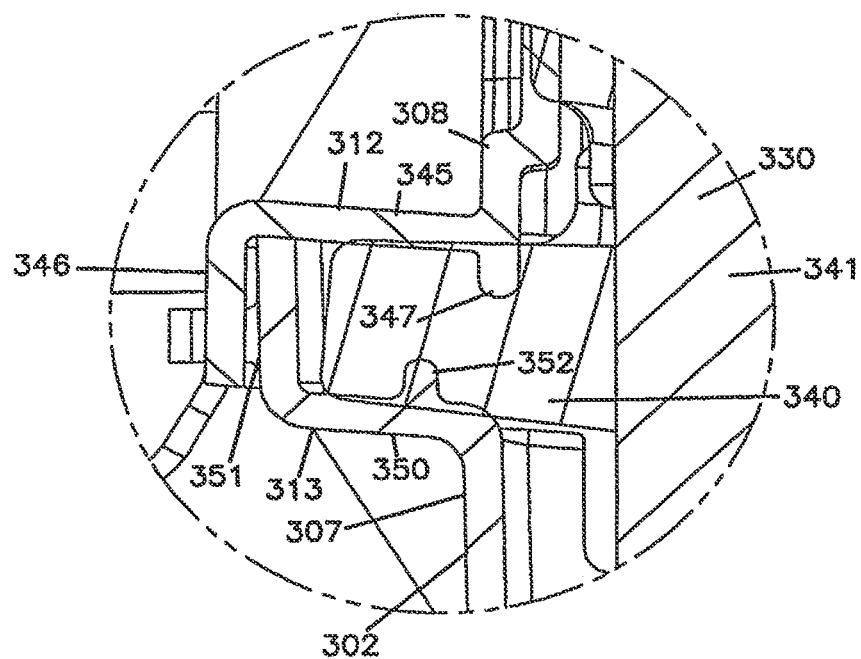
FIG. 10A is a schematic enlarged fragmentary cross-sectional view of a first portion of FIG. 9A.

In FIG. 10A, analogous features of the cartridge 330 and peripheral perimeter flange arrangements 312, 313, are shown, from an opposite direction.

Figure 10B:
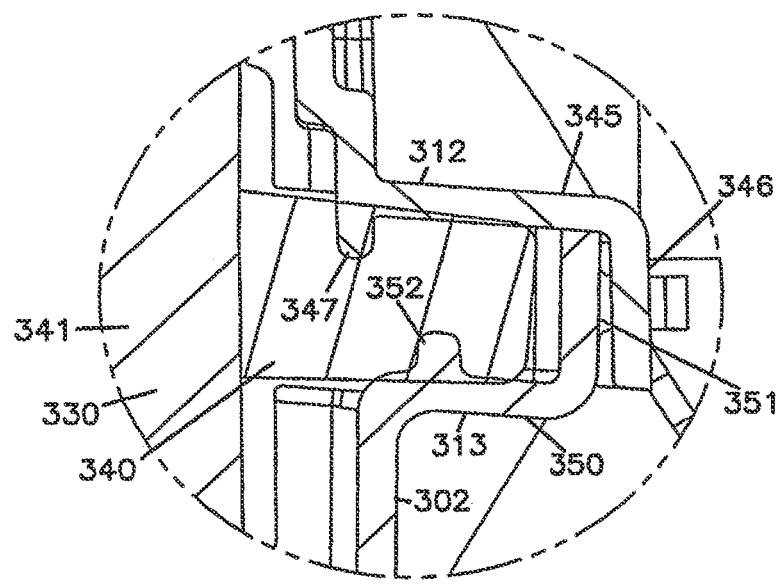
FIG. 10B is a schematic enlarged fragmentary cross-sectional view of a second portion of FIG. 9A.

In FIG. 10B, analogous features are shown on an opposite side of the housing 302. It will be understood that such features generally extend peripherally, completely around the cartridge 330 and housing 302.

This peripheral extension is confirmed by FIG. 11, which shows a cross-sectional view orthogonal to the views of FIGS. 9 and 9A, and similar features are depicted. In FIG. 12, an enlargement is shown further confirming this.

Figure 13:
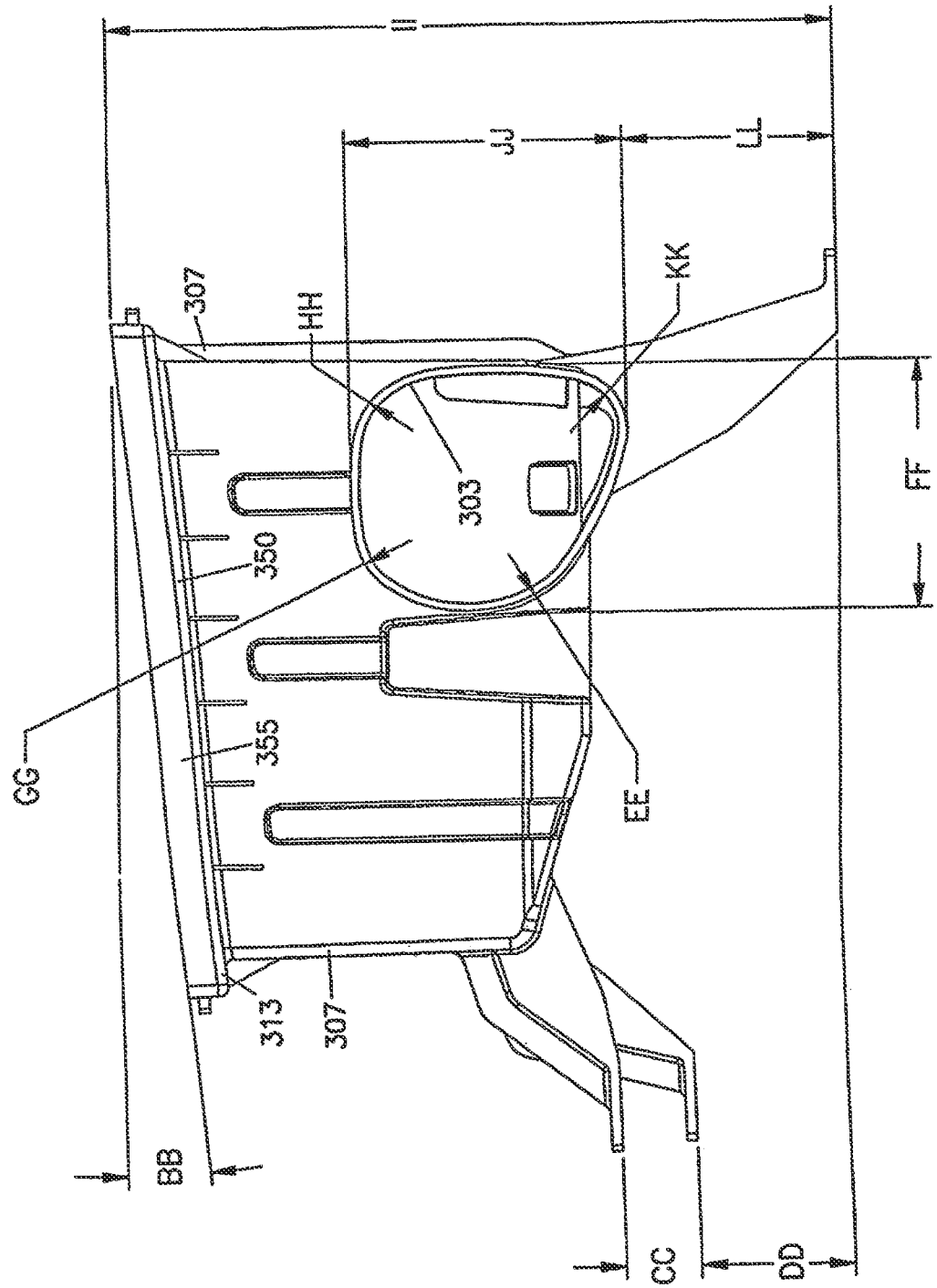
FIG. 13 is a schematic side elevational view of a bottom portion of a housing assembly useable in the air cleaner of FIG. 7.
Figure 14:
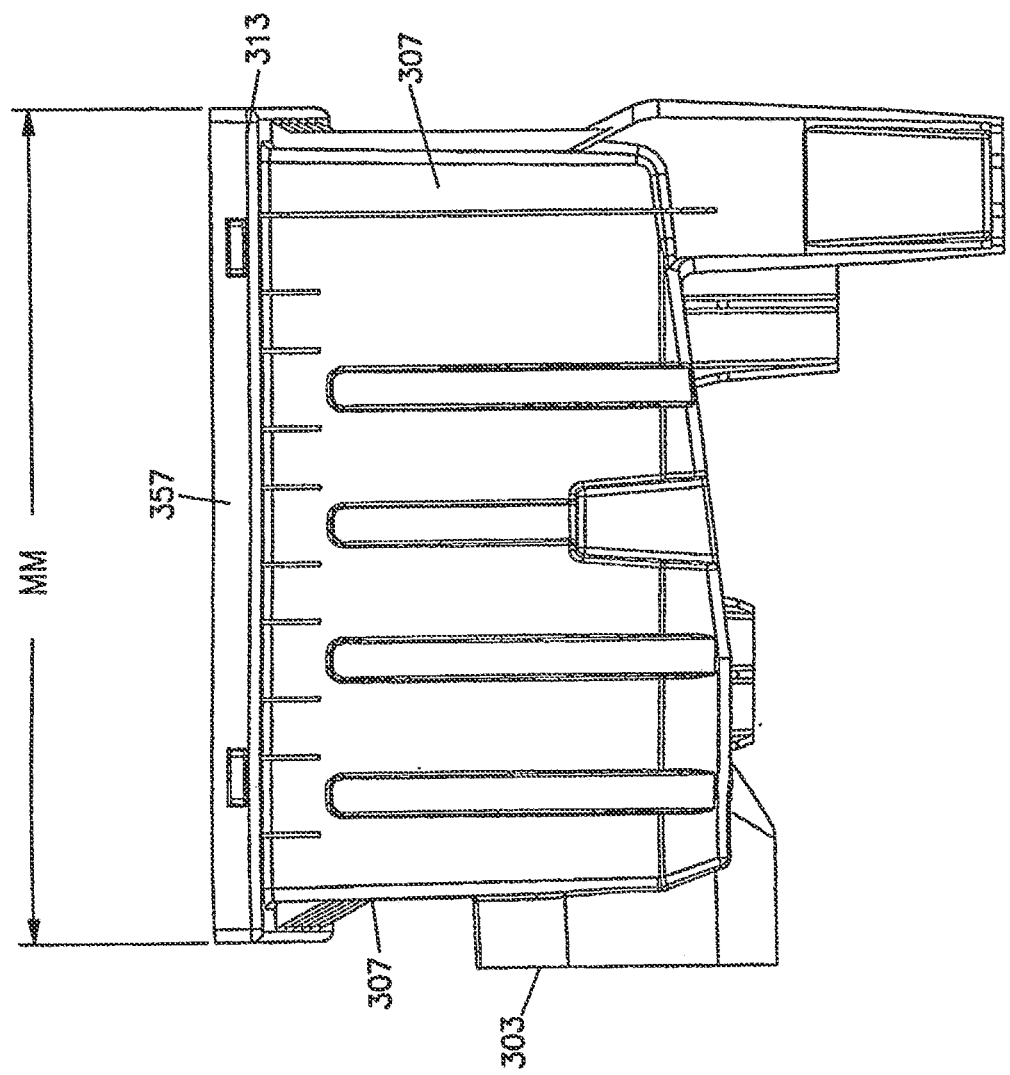
FIG. 14 is a second schematic side elevational view of the bottom portion depicted in FIG. 13.

In FIGS. 13 and 14, two side views of base portion 307 are shown. Example dimensions for an example assembly, are depicted for convenience. Example dimensions would be as follows:

BB=5° (typically at least 2°, usually at least 3° and often 3°-10°, typically not more than 45° although alternatives are possible); CC=28.9 mm; DD=57.9 mm; EE=49.9 mm R; FF=105.1 mm; GG=30.6 mm R; HH=35.5 mm R; II=274.7 mm; JJ=104.4 mm; KK=26.0 mm R; LL=79.6 mm; MM (FIG. 14)=322.3 mm.

Of course other example dimensions can be determined as appropriate. Further, alternate dimensions could be used in alternate applications of the present techniques.

Attention is now directed to a comparison of FIGS. 7-14, with respect to the definition of the housing features defined where compression of the housing seal gasket on the cartridge will occur. In particular, it can be seen that the locations in the housing 302 in which the sealing between cover 308 and base 307 occur, extend along four sides or sections 355, 356, 357 and 358, FIGS. 7 and 7A. Sections 355 and 356 can be viewed as a first pair of oppositely positioned extension sections. Sections 357, 358 can be viewed as a second pair of opposite sections or extensions.

It is noted the seal plane defined by sections 355-358, does not extend parallel to a plane orthogonal to a central flow axis 365, FIGS. 9 and 9A, extending through the air cleaner housing 302. Rather sections 355-358 define a plane extending at a non-orthogonal angle to flow axis 365.

Herein, the term "central flow axis" is merely meant to refer to a direction of air flow generally between the opposite media pack surfaces, during normal use. Such a central flow axis is axis 365, would typically extend perpendicularly to the opposite flow surfaces, described below, of an internally received filter cartridge 330.

This non-orthogonal angle, as defined herein, results in a declination angle BB, FIG. 13. Angle BB is defined by the first pair of extensions or sections 355, 356, relative to a plane perpendicular to axis 365, FIG. 9. It is noted that the second pair of extensions or sections 357, 358, do not extend in extension across the housing 302, for the example shown, at a declination angle with respect to such a plane, see for example FIG. 14.

IV. A Filter Cartridge Useable in the Previously Described Assembly; FIGS. 15-21

Figure 15:
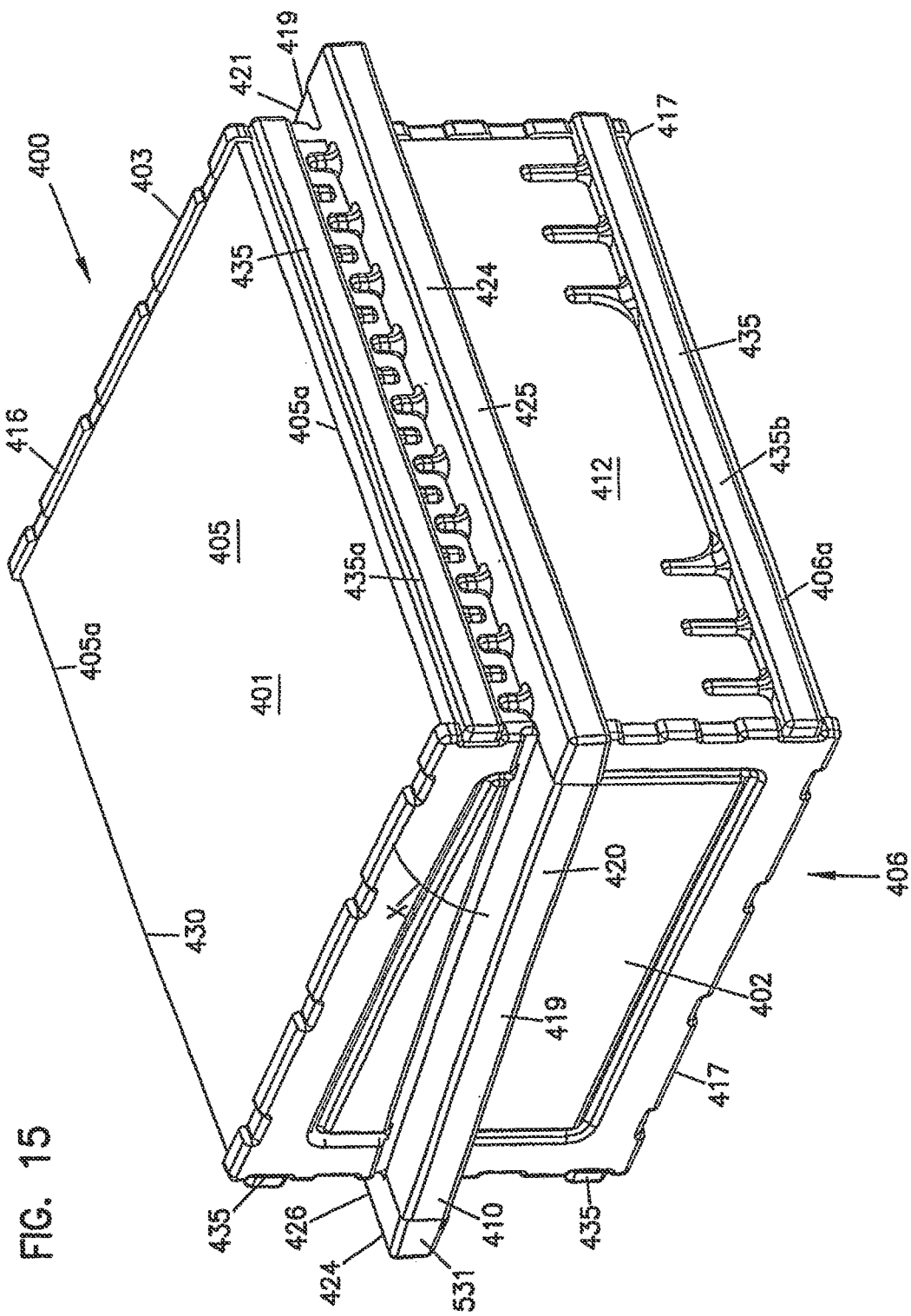
FIG. 15 is a schematic perspective view of a filter cartridge useable in the assembly of FIGS. 7-14.

Attention is directed to FIG. 15 which discloses, schematically, a filter cartridge 400 utilizing a stacked, blocked, media pack 401 according to the above general description. Cartridge 400 can be utilized as cartridge 330, FIG. 9.

Referring to FIG. 15, at 400 the filter cartridge is depicted comprising a blocked stacked (rectangular or right (normal) parallelogram) media pack 401. To seal opposite ends of the media pack 401 are positioned side panels 402, 403. These panels can be made using the general techniques described in U.S. provisional application 60/579,754, filed Jun. 14, 2004 and U.S. provisional application 60/616,364, filed Oct. 5, 2004, modified to accomplish specific detail as described.

Referring to FIG. 6, each single facer strip 200 (comprising a section of corrugated sheet and facing sheet secured together) has a lead edge 209b and a tail edge 209a. These edges result from cutting a continuous strip of single facer into the individual sheets used to form the media pack stack. The lead end and tail ends need to be sealed closed. For the arrangement of FIG. 15, this sealing is conducted by side panels 402, 403.

Although alternatives are possible, in typical arrangements, as described below, panels 402, 403 will be molded directly to the media pack, to seal the lead and tail ends of the strips of single facer, within the media pack. By "molded directly to" in this context, it is meant that there is no preform in the side panel, rather the side panel is formed in place on and joined to the media pack. This would distinguish, for example, a preform molded side piece which is attached to the media pack by a potting material.

The media pack 401 has opposite flow faces 405, 406. In use, air flows through the media pack 401 into one of the flow faces 405, 406 and outwardly from the other one of flow faces 406, 405. The direction of flow is a matter of choice for the system of use. For the air cleaner assembly 300, the media pack 401 would typically be positioned with flow face 405 as the outlet flow face and flow face 406 as the inlet flow face.

It is noted that no flow path between faces 405, 406 in the media pack 401 is provided that does not also require the air to pass through media of the media pack 401 and thus to be filtered.

A peripheral, perimeter, housing seal ring 410 is positioned in the cartridge 400. The particular seal ring 410 depicted, is an axial pinch seal ring. Herein, seal ring 410 is typically referred to as a housing seal arrangement, since it is a seal member positioned on the filter cartridge 400 at a location desirable for forming a seal between the cartridge 400 and housing components, when the filter cartridge 400 is positioned in the air cleaner assembly 300 for use. The particular peripheral perimeter seal ring 410 depicted, extends around the panels 402, 403.

Herein the term "peripheral" in reference to the housing seal ring or seal arrangement, is meant to refer to an extension 410 that circumscribes the media pack 401. The term "perimeter" in this context is meant to refer to a housing seal arrangement 410 that also defines the outer perimeter of the cartridge 400.

The filter cartridge 400 of FIG. 15 can be made by: (a) providing the media pack 401; and, (b) molding panels 402, 403 thereto with segments 410a, 410b of seal ring 410 thereon in separate molding operations, and then molding segments 410a, 410d in two separate molding apertures. Thus, a four shot molding operation could be used. Alternate methods of assembly are possible.

When the cartridge has the construction shown in FIGS. 15-21, opposite media pack sides or side surfaces 412 and 413 are exposed. For the particular arrangement shown, media pack surface 412 would be a single facer surface, resulting from an exposed facing surface of a facing sheet for example at the bottom of a stack; and, surface 413 would be a corrugated surface (or fluted surface), for example at the top of a media pack stack. The single facer sheet 412 could be a non-corrugated sheet, or a sheet corrugated perpendicularly to the direction of the corrugation flutes, as referenced above.

If desired, a protective sheet or panel could be provided over the media pack surfaces 412, 413. Such protective sheets or panels could be formed from a variety of materials such as cardboard, plastic sheets, etc. Such panels can be secured in place by being placed against the media pack 401 when the panels 402, 403 are molded.

In a typical cartridge 400 as shown, surface 412 and an opposite surface 413 of the media pack 401, are each at least 30%, typically at least 40% exposed, i.e., uncovered of molded material. Some molded material is positioned there over, in association with the housing seal 410 and other structure discussed below. In addition, portions of the opposite molded panels 402, 403 may extend partially over the sides 412, 413. However, in general and in preferred arrangements, one pair of surfaces corresponding to surface 412 and an opposite surface 413, in the media pack 401, will be at least 30%, typically at least 40% uncovered by molded material directly molded to the media pack 401. By "directly molded to" in this context and other context herein, it is meant that the portion defined is formed in a molding operation having the identified portion of the media pack in the mold and with the resin at least partially bonded directly to the media pack. Thus, again, a preformed end piece to which the media pack is secured by potting, is not an end piece directly molded to the media pack.

As explained, in some instances surfaces 412 (and the corresponding opposite surface 413) can be covered by a preformed piece such as a cardboard or plastic section embedded within end pieces 402, 403 and if desired partially within housing seal arrangement 410, securing the protective cover in place. Such a cover would not correspond to material "molded directly to" the media pack, in accord with the above definitions. Referring to FIG. 15, cartridge 400 is particularly configured with molded panels 402, 403 having opposite end edges 416, 417; and adjacent flow surfaces 405, 406 respectively. Portions of one or more of these end edges 416, 417 can be configured to engage housing pieces, when pinch seal 410 is sealed between housing pieces 308, 307. In the assembly cross-section of FIGS. 9 and 9A, engagement between a portion 415 of the housing base 307 and portions of edges 417 is shown in 416. In the cross-section of FIG. 11, such engagement is shown for each of panels 402, 403.

It is noted that for the particular assembly 300 depicted, no engagement between the housing 302 and edges 416 is shown, although such an engagement could be provided.

As a result of the support by abutment between edges 417 and the housing base 307, the media pack 401 is not merely suspended within the housing 302 by the seal 410, rather it is also supported in place by the described abutment. Surfaces 416, 417 can be irregular, i.e., have bumps and indents, due to mold stand-offs. This is shown in the figures.

Herein, surfaces such as surfaces 417 which form abutment (non-sealing) surfaces for support with a housing, in use, will sometimes be referred to as "axial abutment surfaces," the term axial in this context referring to abutment with engagement being in a direction parallel to a direction of air flow through the media pack 401, between surfaces 406, 405.

As indicated above, a "axial abutment surface" may sometimes be formed with a plurality of bumps and also a plurality of recesses (or alternatively stated projections and recesses) thereon.

A variety of materials can be utilized for the molded panels 402, 403 and seal arrangement 410. Materials such as those described in U.S. Provisional application filed Jun. 14, 2004, incorporated herein by reference, can be used. Typical such materials are polyurethanes, typically foamed polyurethanes. Although alternatives are possible polyurethanes having an as-molded density of no greater than about 30 lbs./cu·ft. (0.48 g/cc), typically no greater than about 22 lbs/cu·ft. (0.35 g/cc), and usually within the range of about 10-22 lbs./cu·ft. (0.16-0.35 g/cc), are typical. Materials having a hardness, Shore A, of no greater than 30, and typically no greater than 20, often within the range of 12-sometimes 10-20 are typical. Harder materials can be used, in some applications. The same material can be used, in some instances, for all molded components on cartridge 400.

The cartridge 400 is generally depicted in FIGS. 15-21 as follows. FIG. 15, as explained above, is a top perspective view, with the general direction being toward outlet flow surface 405, and sides 402, 412.

Figure 16:
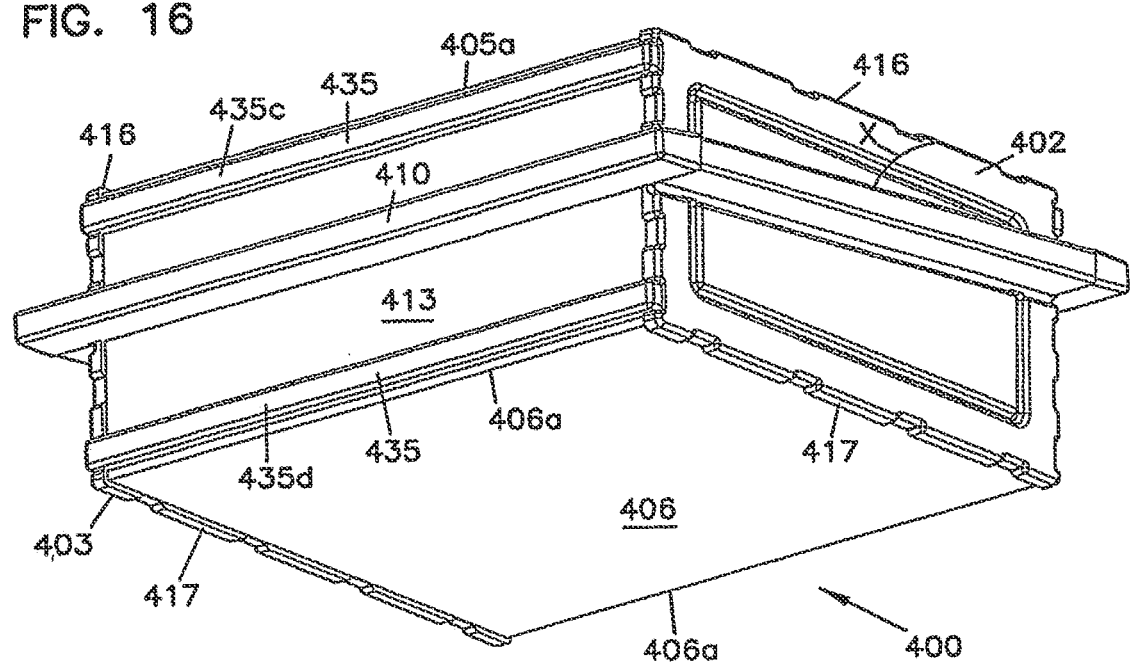
FIG. 16 is a schematic bottom perspective view of the cartridge depicted in FIG. 15.
Figure 17:
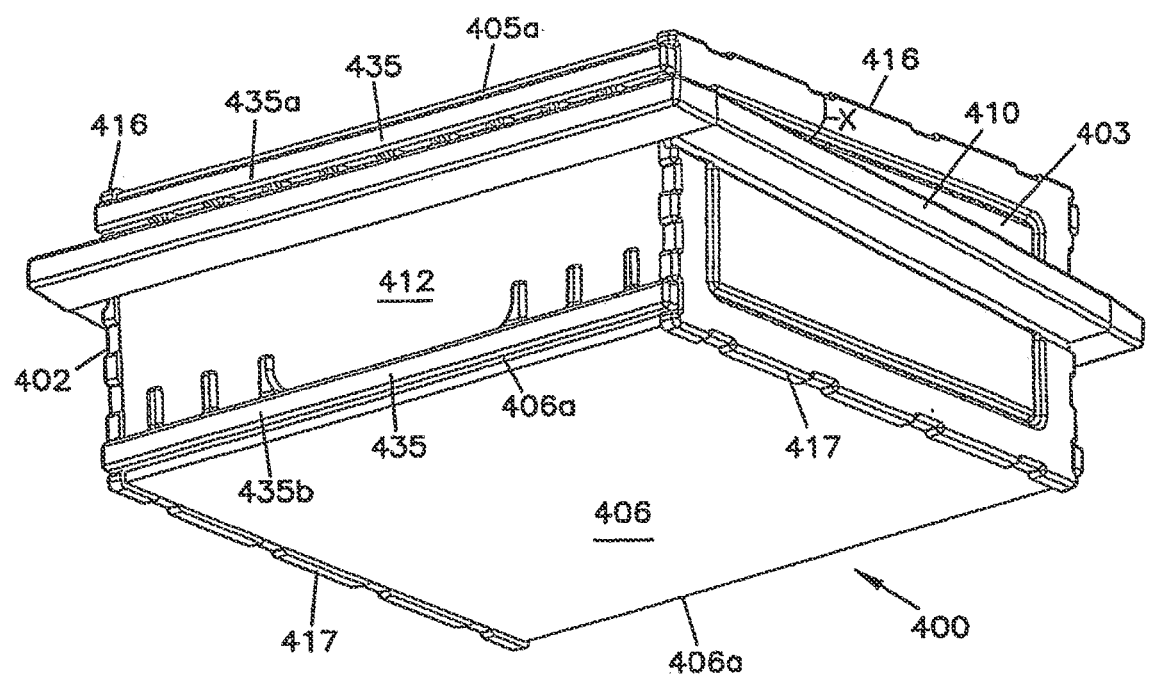
FIG. 17 is a second schematic bottom perspective view of the cartridge depicted in FIG. 15; the view of FIG. 17 being with the cartridge rotated 180° from the view of FIG. 16.

FIG. 16 is a bottom plan view toward sides 402, 413 and inlet flow face 406. FIG. 17 is similar to FIG. 16, but with the cartridge 400 rotated 180° around a central axially extending axis. Thus the view is toward inlet face 406 and sides 412, 403.

Figure 18:
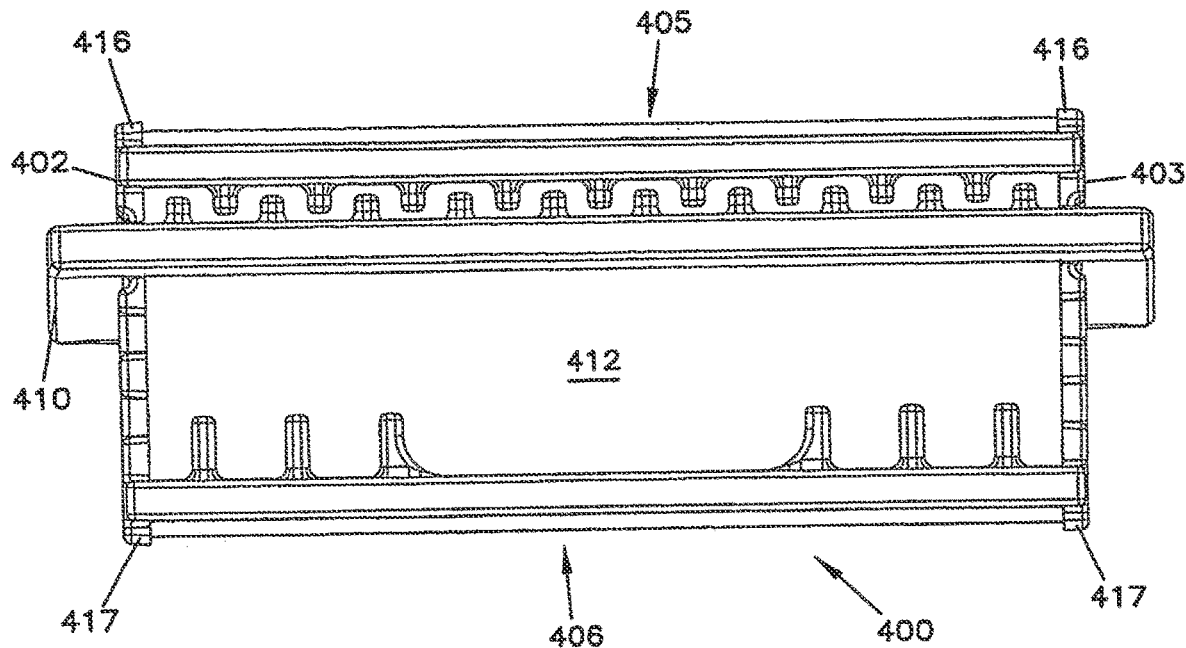
FIG. 18 is a schematic side elevational view of the cartridge depicted in FIG. 15.
Figure 19:
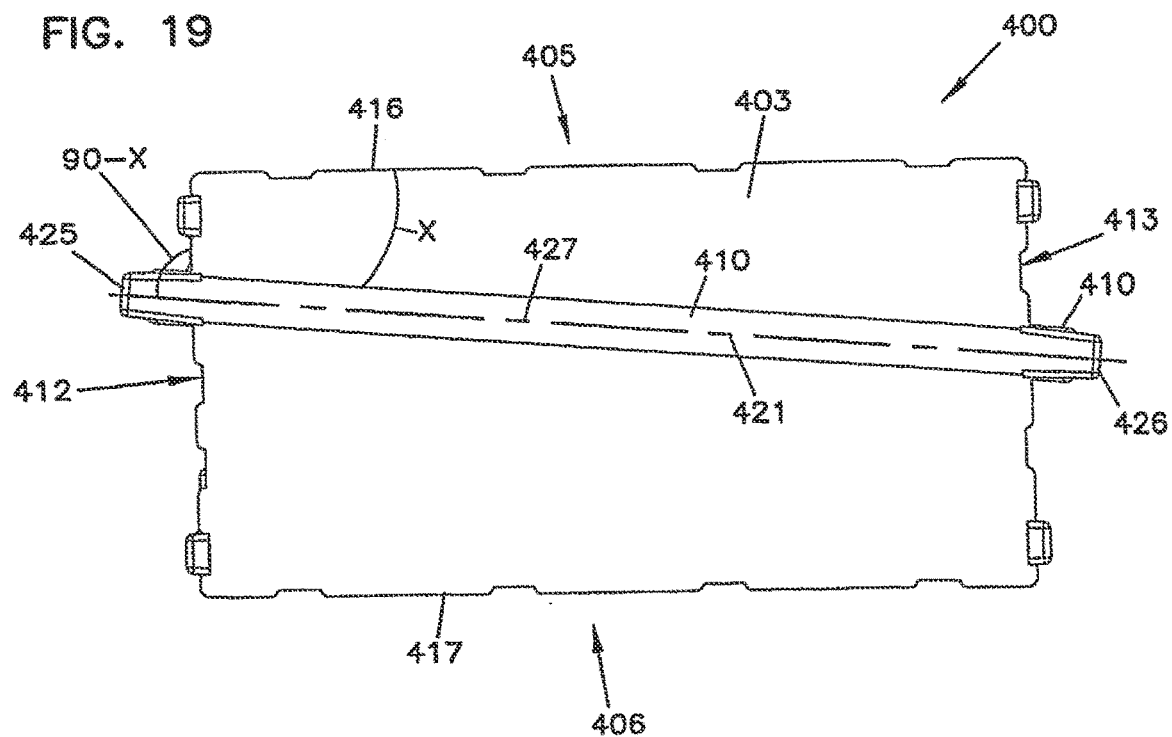
FIG. 19 is a schematic side elevational view of the cartridge depicted in FIG. 15.

FIG. 18 is a side elevational view taken generally toward side 412, FIG. 15. FIG. 19 is a side elevational view generally toward side 403, FIG. 15.

Figure 20:
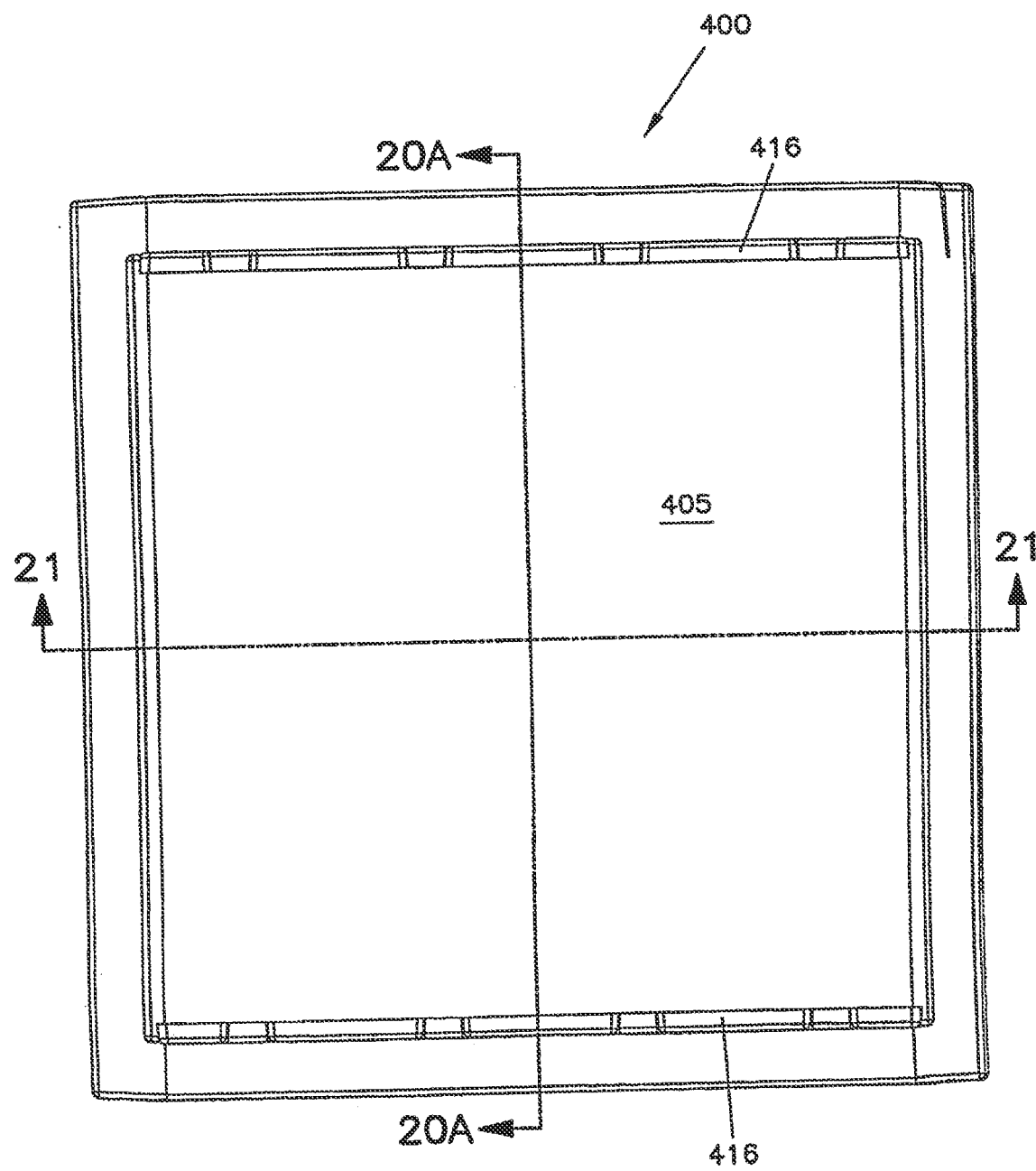
FIG. 20 is a schematic top plan view of the cartridge depicted in FIG. 15.

FIG. 20 is a top plan view taken toward side 5, FIG. 15.

Figure 20A:
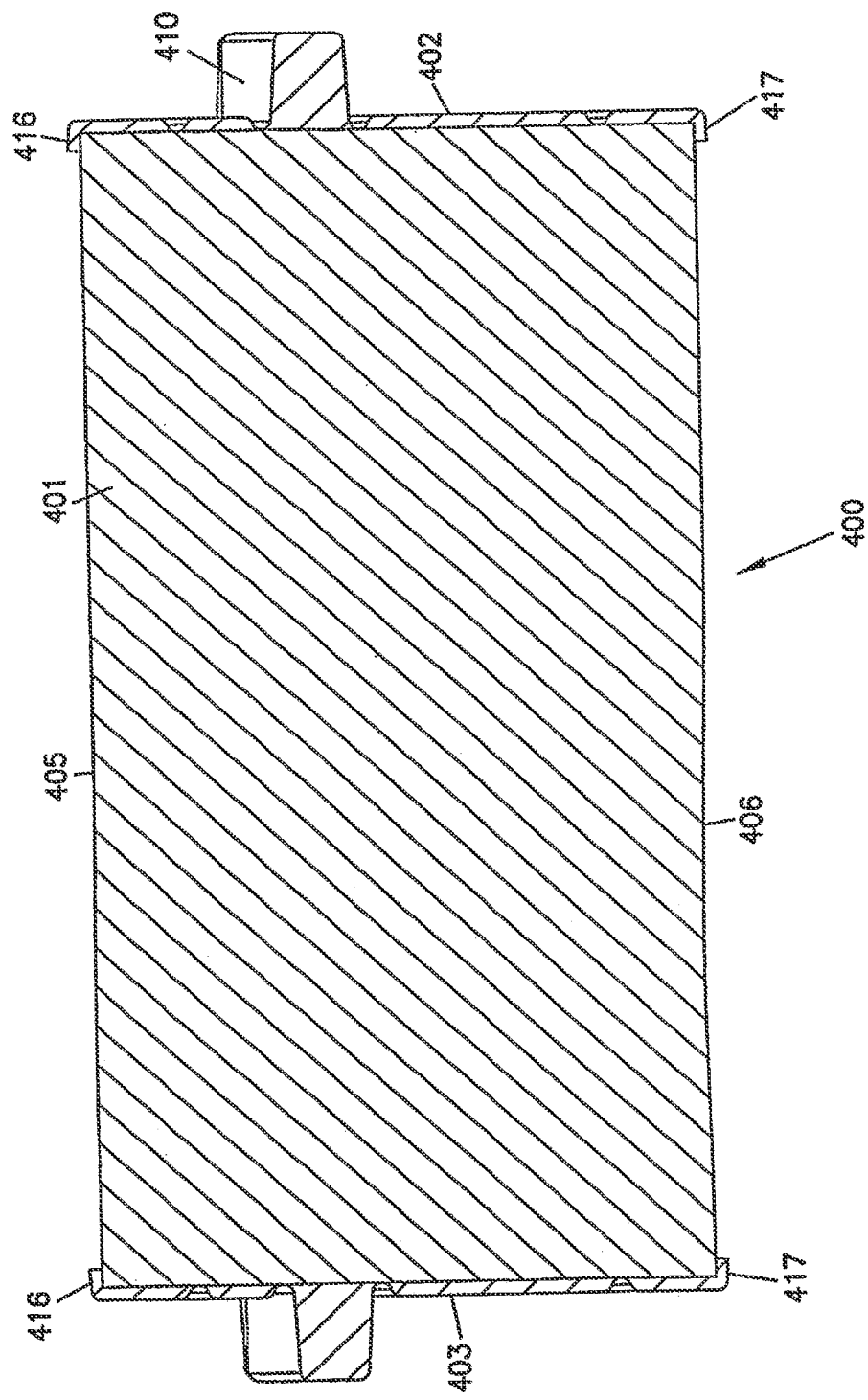
FIG. 20A is a schematic cross-sectional view taken along line 20A-20A, FIG. 20.
Figure 21:
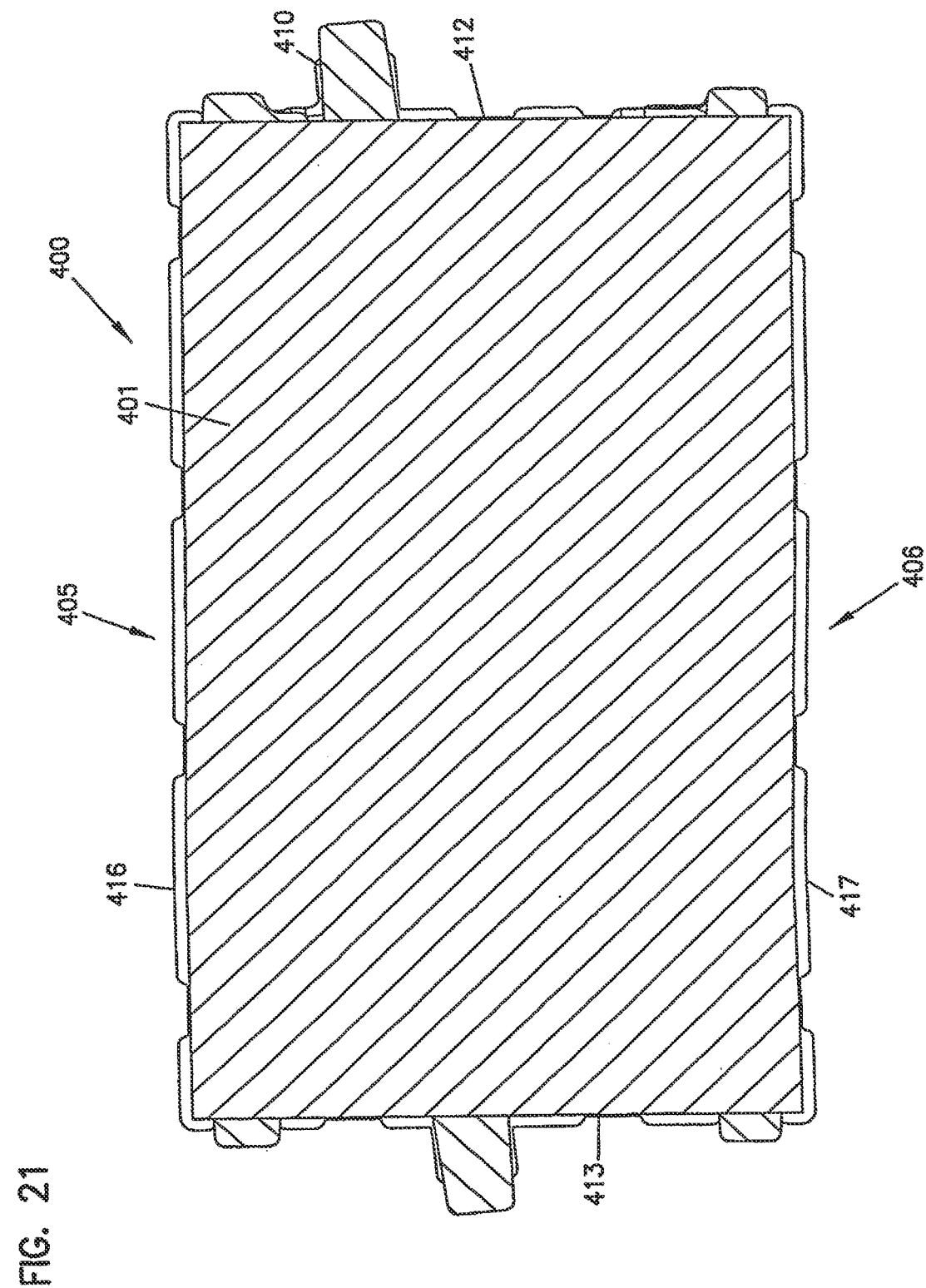
FIG. 21 is a schematic cross-sectional view taken along line 21-21, FIG. 20.

FIG. 20A is a cross-sectional view taken along line 20A-20A, FIG. 20; and FIG. 21 is a cross-sectional view taken along line 21-21, FIG. 20.

FIGS. 15-21, in total, show the various externally viewable features of the cartridge 400. It is noted that FIGS. 15-21 are schematic, and that specific media features are not viewable. For example media flutes ends in surfaces 405, 406 and the seals therein are not shown. Also surface detail and exposed surfaces 412, 413 are not shown. As explained above, typically surface 412 would be a surface of a facing sheet, which may be flat or corrugations extending generally in a direction between side panels 402, 403. Surface 413, on the other hand, would typically be an exposed surface of a fluted sheet, thus it would have corrugations extending in a direction between the faces 405, 406.

By comparison of FIGS. 15-21, it can be seen that the particular cartridge 400 depicted includes a housing seal ring 410 that does not extend in a plane parallel to flow surfaces 405, 406.

Referring to FIGS. 15-21, the housing seal ring 410 can be viewed as comprising: a first pair 419 of opposite extensions 420, 421; and a second pair 424 of opposite extensions 425, 426. The first pair 419 is positioned on the side panels 402, 403, although an alternative construction is possible as discussed below. The second pair 424 is positioned on the opposite surfaces 412, 413, respectively although an alternate construction is possible, as discussed below.

Although alternatives are possible, the extensions 420, 421 of the first pair 419 are generally positioned as mirror images of one another and each extends at an angle X to the plane of the media pack inlet and outlet faces 406, 405 respectively. For a typical construction, angle X will be at least 2°, typically at least 3°. The angle X will typically not be larger than 45°. For the example shown the angle X is within the range of about 3°-10°. The specific example shown is about 5°.

In contrast, and although alternatives are possible, each extension 425, 426 of the second pair of extensions 424, extends generally along a line parallel to edges 406a, 405a of the media pack 401.

For the particular cartridge 400 depicted in FIGS. 15-21, and based upon a comparison of these figures, it will be apparent that, although alternatives are possible, for the particular, specific, example shown, the housing seal ring 410 rests in a single plane. As a result, projection of the seal ring 410, beyond media pack surfaces 412, 413, is in a seal plane defined by angle X. Thus, the acute angle of a plane of extension of the seal 410 beyond surfaces 412, 413, see FIG. 19, is generally 90°–X.

Herein, the terms "plane of extension," "seal plane" or variants thereof in reference to a seal or seal section, is generally meant to refer to a plane defined by a line extending outwardly from the media pack 401, along a center of the seal and in the longitudinal direction of the seal, for example as shown in FIG. 19, at 427. It is noted that the seal arrangement 410 is shown in a not completely rectangular cross-section, but rather with a somewhat trapezoidal shape, to provide a draft angle for demolding. This is disregarded with respect to the defined angles.

In general, advantages result from a construction in which the housing ring 410 does not extend simply in a plane parallel to the flow faces 405, 406. These advantages relate to at least two general observations as follows:

1. Desirable accessibility for element and related desirable configuration for housing; and
2. Improvement and control of internal ballooning of media pack 401.

A. Improvement in Accessibility of Filter Cartridge 400.

Attention is now directed to FIG. 13. In FIG. 13 the housing base 307 is shown in side view. A portion 355 of outwardly projecting flange 350 is shown. It can be understood that when the cartridge 400, FIG. 15 is positioned with housing seal ring 410 in engagement with flange 350, a portion indicated at corner 430, FIG. 15 of the cartridge 400 will project outwardly from housing base 407. This will provide a convenient projection for service personnel to grasp and lift cartridge 401 out of housing base 407, once cover 408 has been removed.

B. Inhibition of Ballooning.

In general, air entering the media pack 401 at inlet surface 406 will cause an internal pressure build-up within the media pack 401. This will tend to balloon the media pack 401 outwardly. Such ballooning can begin to separate individual layers of media, within the media pack 401, and cause damage.

The peripheral housing seal gasket or ring 410, generally surrounds the media pack 401 and helps control ballooning in the area where the housing seal ring 410 is located, especially when supported within the housing 302. However, ballooning tends to occur at least in regions upstream (toward the dirty air side) of where the housing seal arrangement is located, in some arrangements. By providing the gasket 410 with extensions that are non-parallel to an end surface, and not adjacent an end surface, such as the first pair of extensions 419, improved support against ballooning is provided.

In more general terms, ballooning is inhibit by a gasket or ring 410 that is not simply in a plane parallel to surfaces 405, 406. Rather it is facilitated by having ring 410 positioned so that one portion of the ring 410 is closer to surface 405 and another portion of the ring 410. This provides for some axial extension of the ring 410 between the faces 405, 406 and greater inhibition to ballooning. In general the greater the angle X, the greater inhibition of ballooning.

From a review of FIGS. 15-21, an additional feature of the cartridge 400 is understandable. In particular, cartridge 400 includes a plurality of non-sealing cushions or bumper features 435. Referring to FIGS. 15, 16 and 17, first pair of extensions 435, comprising extensions 435a and 435b, extend across one of the sides 412. A second pair of extensions 435 comprising extensions 435c and 435d, FIG. 16, extend across a second side, in this instance a side 413. For the particular example shown, the cushions 435a-435d, extend across the sides 412, 413, between moldings 402, 403.

As indicated, cushioning or bumper features 435 are generally non-sealing. They are positioned to provide for ensuring spacing between the media pack 401 and a housing side wall, when cartridge 400 is assembled in air cleaner 300 for use. They can be specifically provided of a size to engage a housing side wall, or a space between them and the side wall can be left. Preferably the cushioning or bumper features 435 are manufactured from a similar material to the panels 402, 403 and the seal arrangement 400.

For the particular example shown, each of the cushioning arrangements or bumper members 435a-435d, extends in a direction generally parallel to edges between the associated side and the flow surfaces 405, 406.

Referring to FIG. 15, for the particular cartridge 400 depicted, housing seal arrangement 410 is positioned spaced between, not adjacent to, either one of sides 405, 406. Alternate arrangements are possible, including ones in which a portion of housing seal arrangement 410 projects outwardly from a side, for example side 412, at a location adjacent an edge between that side (side 412) and one of the flow pieces (405, 406). This can be advantageous, is some systems, depending on the method used for assembling the cartridge 400.

V. Example Methods of Cartridge Manufacture

In this section, molding steps usable to form the cartridge FIGS. 15-21 are generally described. It is known that alternate methods of manufacture can be used, the steps and descriptions merely indicate an example.

Figure 22:
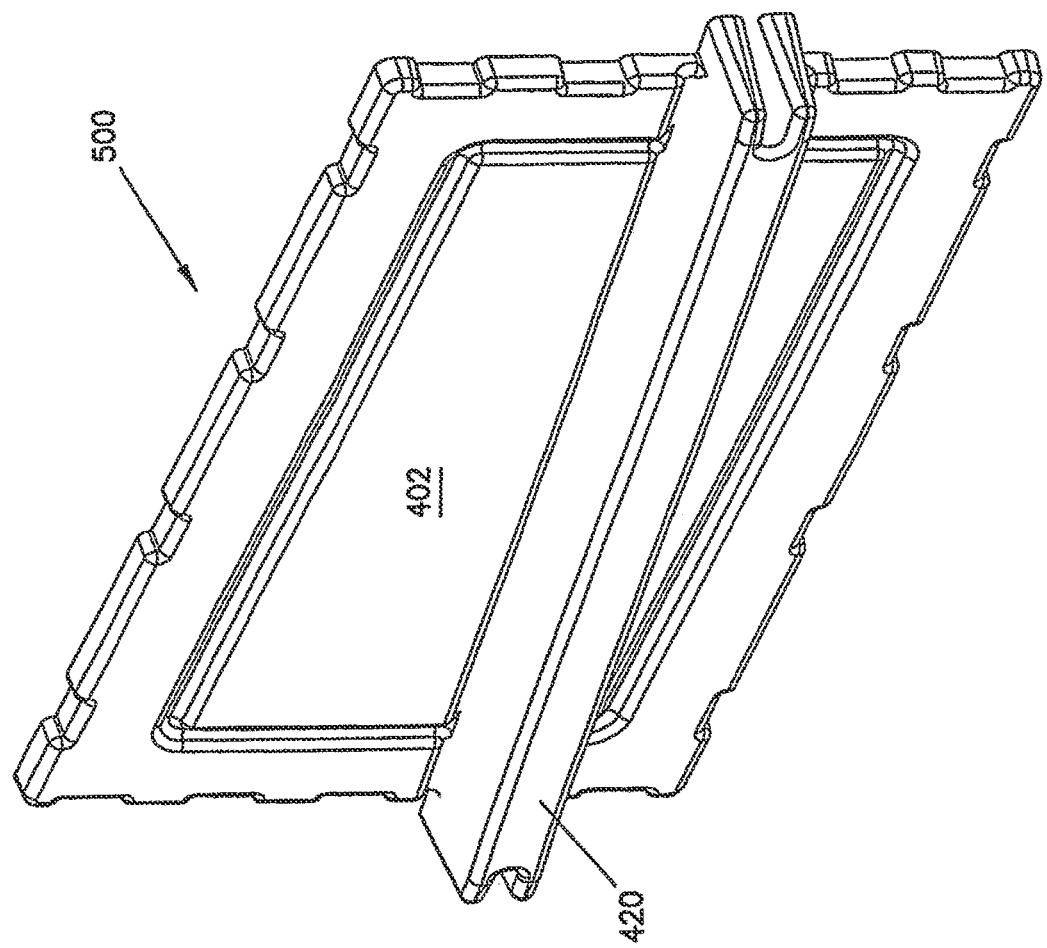
FIG. 22 is a schematic perspective view of a molded side panel component of the cartridge depicted in FIG. 15.

In FIG. 22 a molded construction 500 is shown, which would correspond to panel 402 and seal section or extension 420, FIG. 15. It is noted that in FIG. 22, molded arrangement 500 is shown inverted relative to the view point of FIG. 15. Although alternatives are possible, panel arrangement 402 and seal extension 420 can be molded together, simultaneously, on an appropriate portion of a media pack 401.

Figure 23:
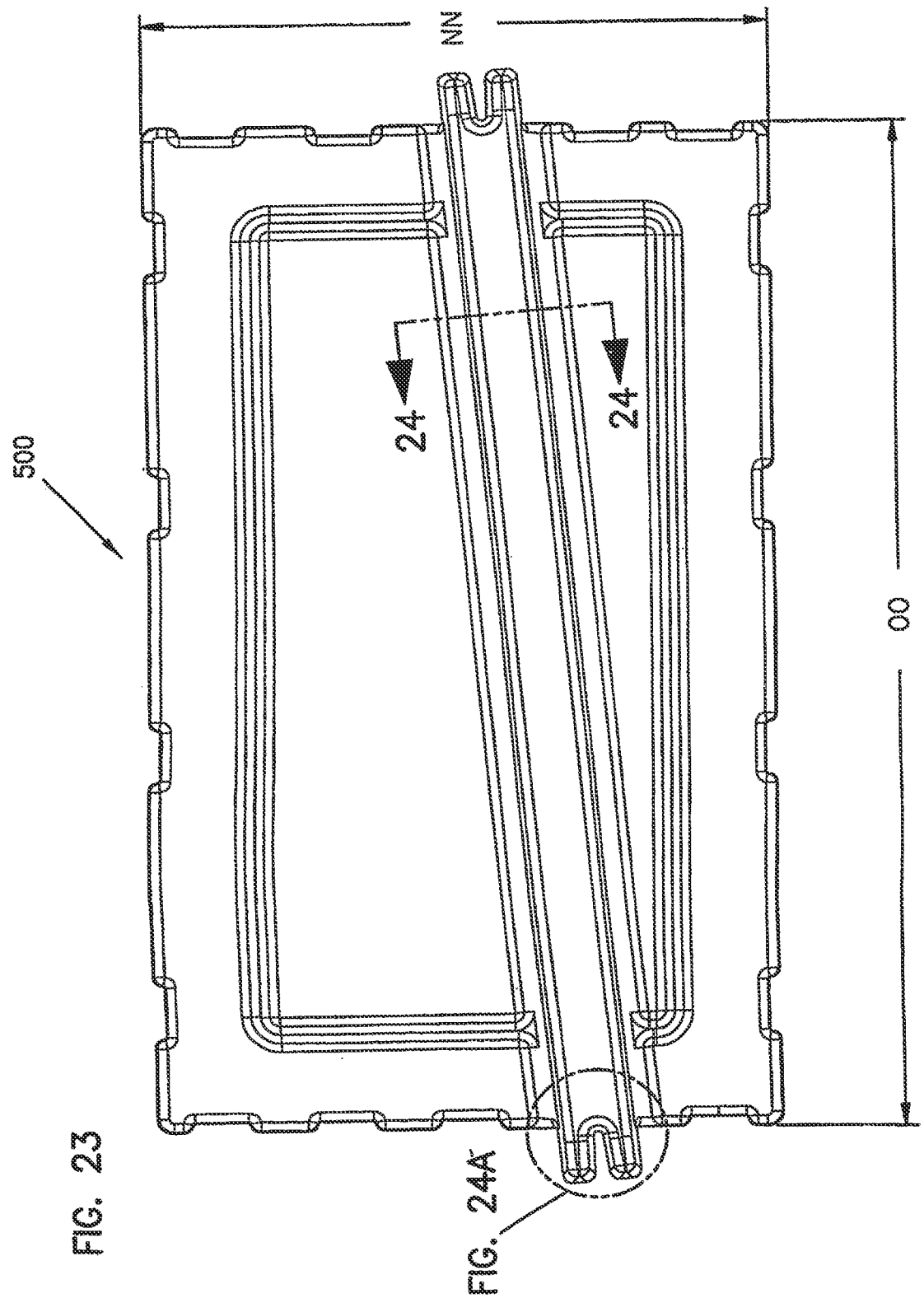
FIG. 23 is a schematic side elevational view of the panel component depicted in FIG. 22.

In FIG. 23, side elevational view of molded panel arrangement 500 is depicted. Example dimensions usable to form a cartridge 400 that itself is usable within assembly 300 as characterized herein are provided as follows: NN=132.1 mm; and OO=235.6 mm. Of course alternative sizes and dimensions are possible, in variations.

Figure 24:
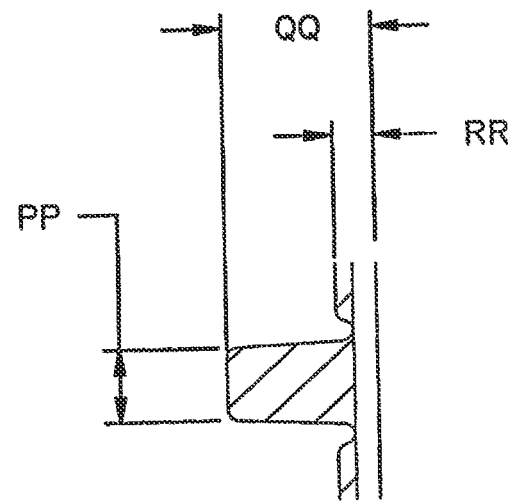
FIG. 24 is a schematic cross-sectional view taken along line 24-24, FIG. 23.

In FIG. 24 a cross-sectional view taken along line 24-24, FIG. 23 is shown. Here example dimensions would be as follows: PP=14.0 mm; QQ=26.0 mm; and RR=7.0 mm.

Figure 24A:
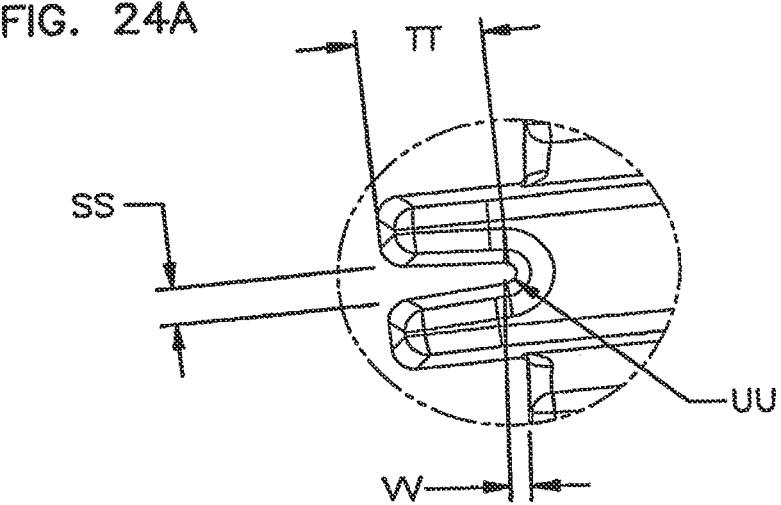
FIG. 24A is a schematic enlarged fragmentary view of a portion of FIG. 23.
Figure 25:
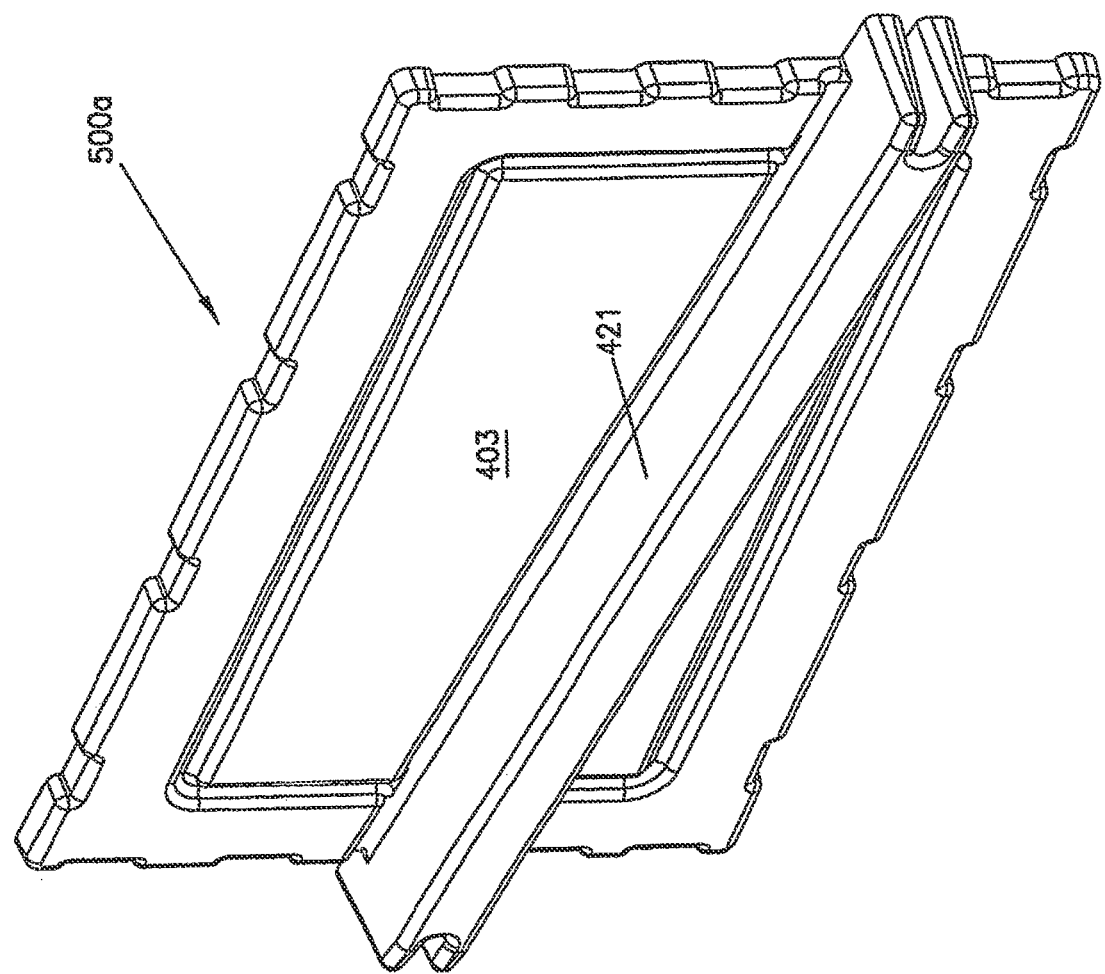
FIG. 25 is a schematic perspective view of a second molded panel component useable in the cartridge of FIG. 15.
Figure 26:
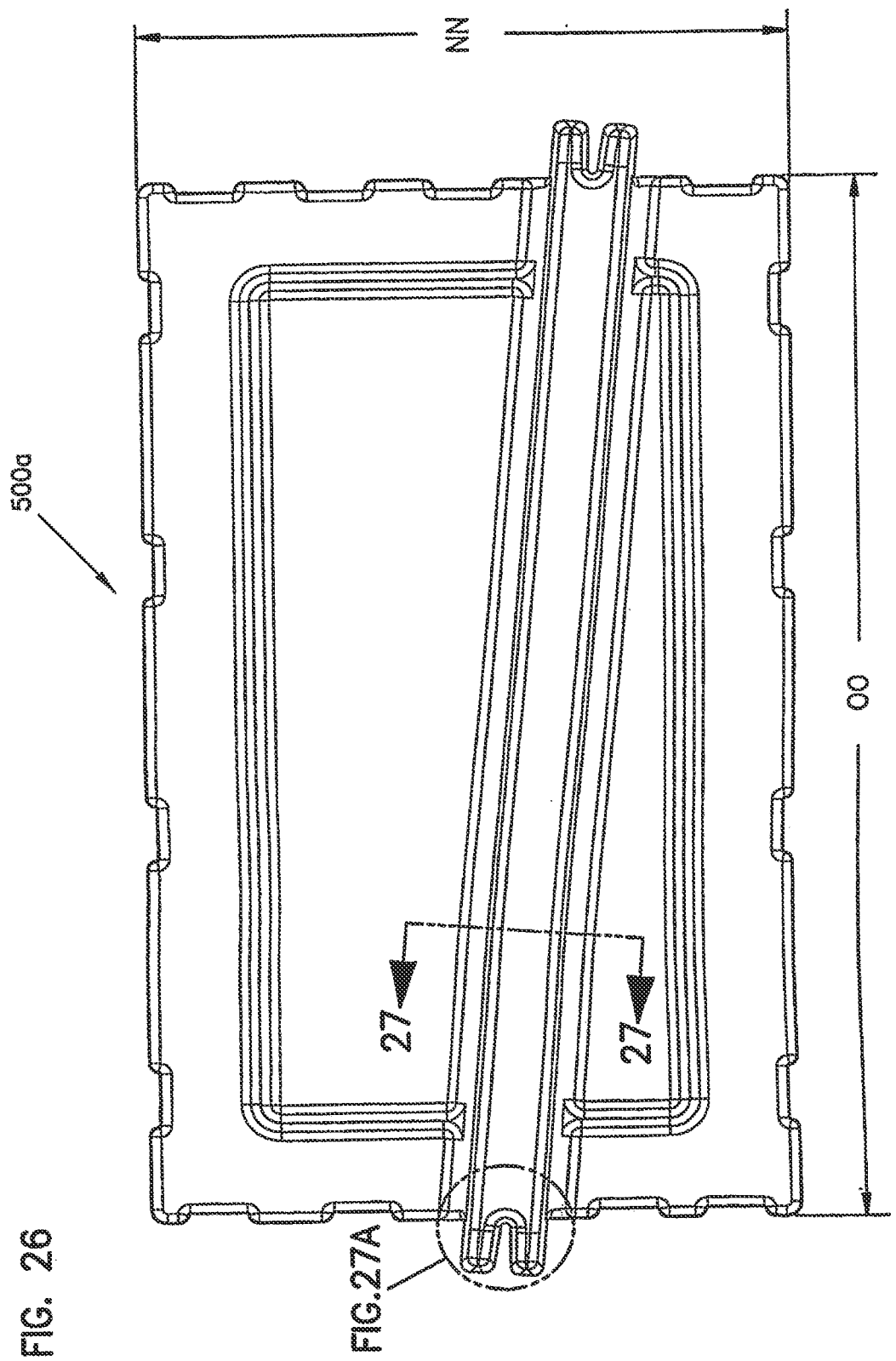
FIG. 26 is a schematic side elevational view of the molded panel component of FIG. 25.
Figure 27:
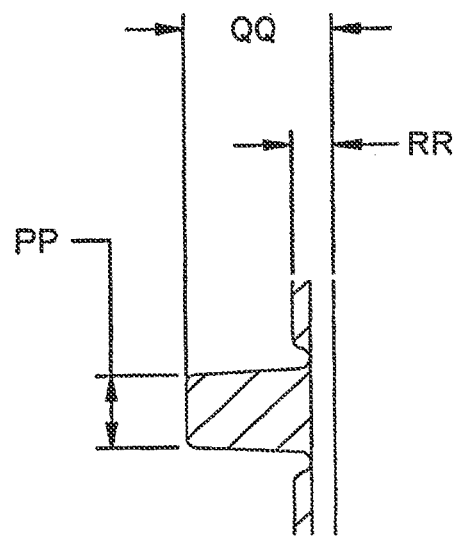
FIG. 27 is a schematic cross-sectional view taken along line 27-27, FIG. 26.
Figure 27A:
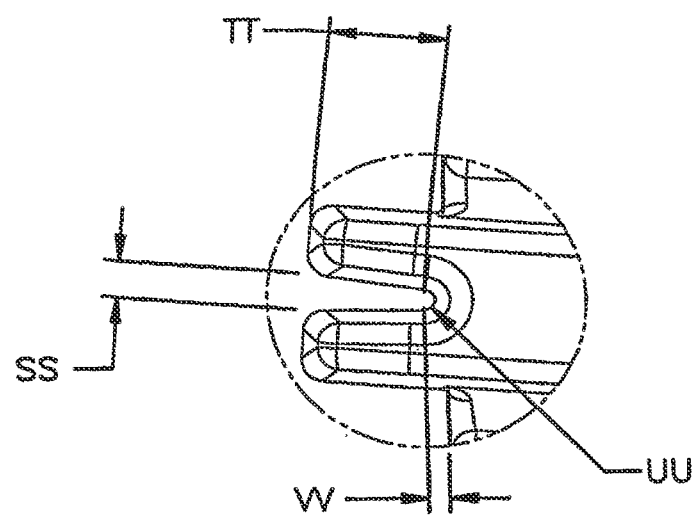
FIG. 27A is a schematic enlarged fragmentary view of a portion of FIG. 26.

In FIG. 24A, an enlarged view of a portion of FIG. 23 is shown. Example dimensions would be as follows: SS=3.5 mm; TT=10.9 mm; UU=1.0 mm R; and VV=1.8 mm. In FIG. 25, molded panel arrangement 500a is depicted. Molded panel arrangement 500a would generally correspond to housing section 420 and side panel 403, FIGS. 15-21. In FIG. 26, molded panel arrangement 500a is shown in plan view. In FIG. 27 a cross-sectional portion of FIG. 26 is shown, in FIG. 27A an enlarged portion of FIG. 26 is shown. The dimensions for NN, OO, PP, QQ, RR, SS, TT, UU and VV, FIGS. 26-27A would generally be characterized as above four panel 500, since due to symmetry, for the example shown, molded arrangement 500a is generally a mirror image of molded panel arrangement 500, for the assembly shown. Alternatives are possible.

Molded panel arrangement 500 can be molded directly to one of the sides of the media pack 401, typically a side comprising ends of single facer strips from which the media pack 401 is formed.

Figure 28:
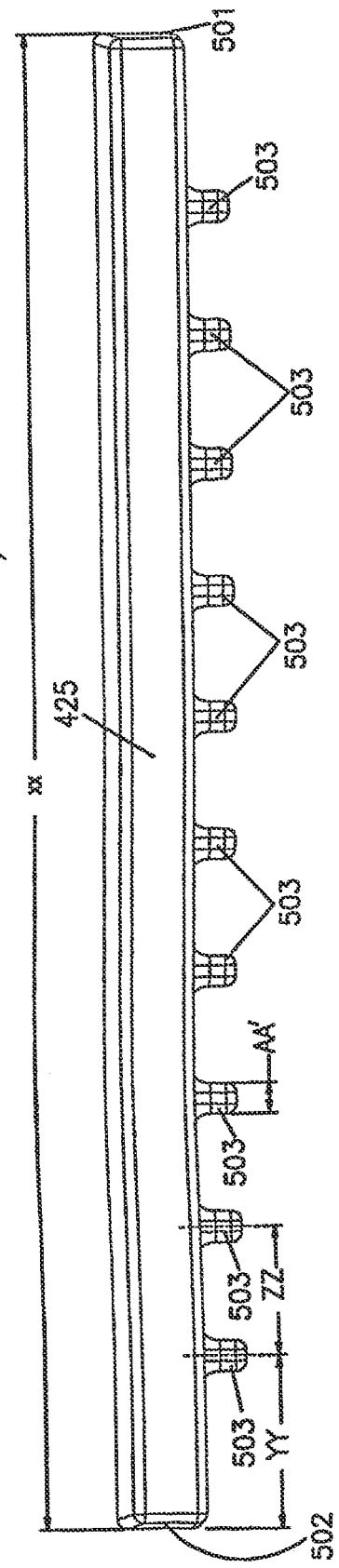
FIG. 28 is a schematic enlarged plan view of a section of housing seal provided in the cartridge of FIG. 15.

In FIG. 28, molded arrangement 500c is depicted, which comprises one of the sections of the housing seal arrangement 410, in this instance section 425 which extends across surface 412, FIG. 15. In FIG. 28 molded arrangement 500c is shown inverted, relative to FIG. 15.

Figure 29:
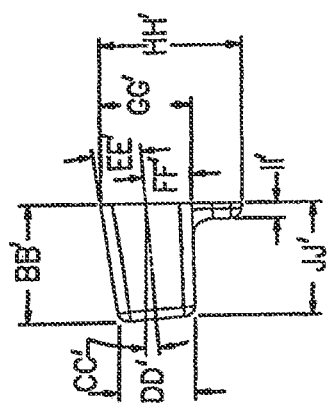
FIG. 29 is a schematic end elevational view of the component depicted in FIG. 28, with example dimension and angle definition indicated.

In FIG. 29, an end elevational view taken toward end 501 is shown.

Useable dimensions would be as follows: XX=309.1 mm; YY=35.7 mm; ZZ=26.4 mm; AA'=6.4 mm; BB'=22.9 mm; CC'=5° (typically at least 2°, usually at least 3°, often 3°-10°, and typically not larger than 45°). Other example dimensions are DD'=13.4 mm; EE'=3°, FF'=3°, GG'=15.9 mm; HE'=24.7 mm; II'=3.0 mm; and JJ'=21.7 mm.

In FIG. 28, attention is directed to urethane rise features 503. When surface 412 is generally flat or nearly flat, urethane rise (expansion) is needed in the mold. The mold can be formed with apertures in a portion thereof, allowing rise to generate features shown at 503, to facilitate manufacture.

It is noted that opposite ends 501, 502 of extension 425 can be molded knit (sealed) with ends in the extensions 420, 421, FIGS. 22-27.

Figure 30:
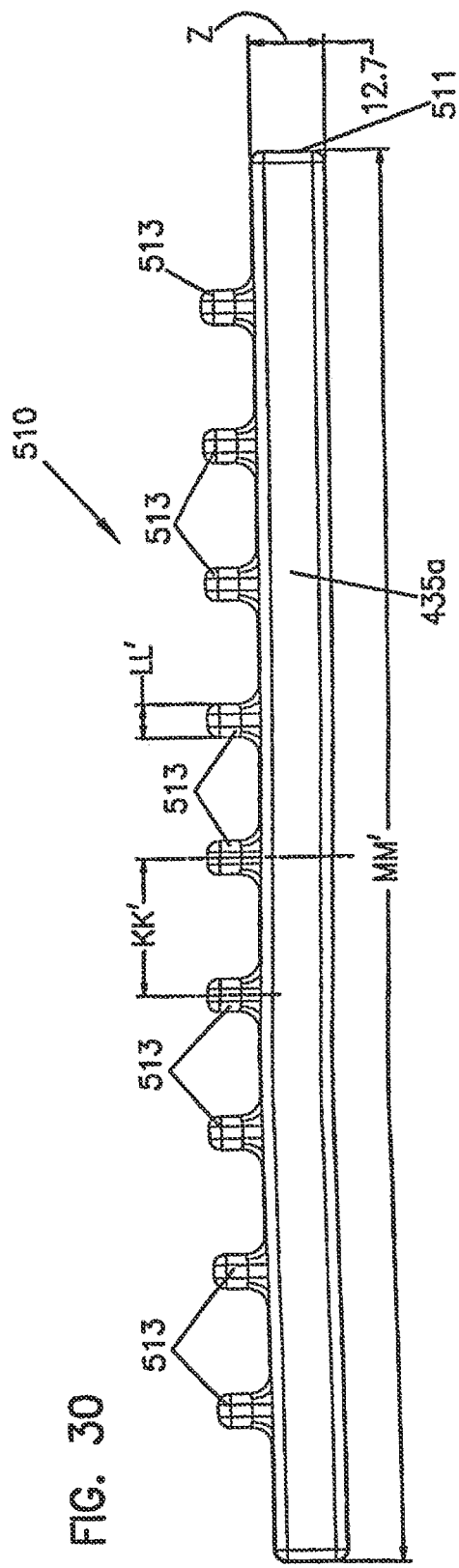
FIG. 30 is a schematic side elevational view of a first bumper component depicted in the cartridge of FIG. 15.

In FIG. 30 molded structure 510 corresponding to cushion or bumper arrangement 435a, FIG. 15 is shown. In FIG. 30 structure 435a is shown inverted, relative to FIG. 15.

In FIG. 30, the following example dimensions are provided: dimension KK', 26.4 mm; dimension LL', 6.4 mm; dimension MM', 270 mm; a height of 12.7 mm is shown at Z in the drawing.

Figure 31:
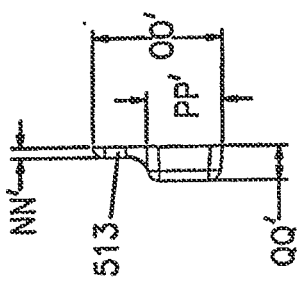
FIG. 31 is a schematic side elevational view of the component depicted in FIG.

FIG. 31 is an end view taken generally toward end 511. Example dimensions would be as follows: dimension NN', 2.0 mm; dimension OO', 21.5 mm; dimension PP', 12.7 mm; and dimension QQ', 6.4 mm.

It is noted that mold arrangement 510 also includes free rise projections 513 resulting from a typical molding operation.

Figure 32:
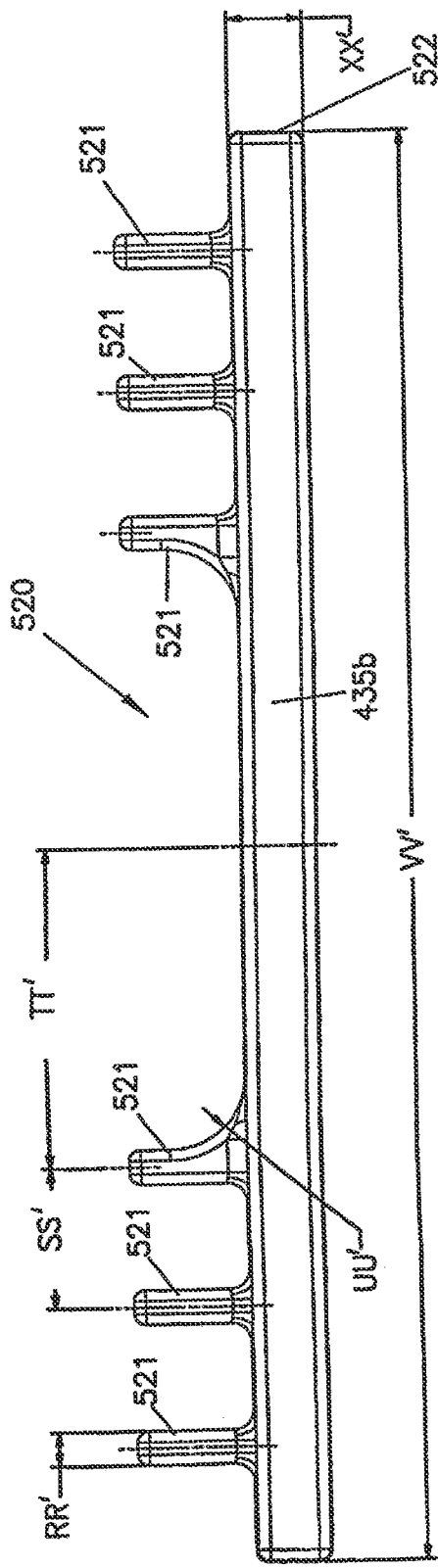
FIG. 32 is a schematic side elevational view of a second bumper component useable in the cartridge of FIG. 15.
Figure 33:
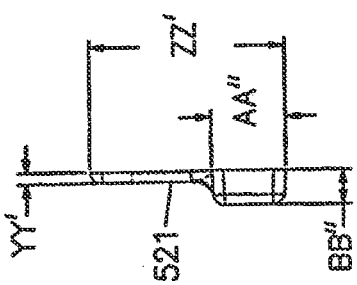
FIG. 33 is a schematic side elevational view of the component depicted in FIG. 32.

In FIGS. 32 and 33, molded arrangement 520 corresponding to cushion or bumper arrangement 435b, FIG. 15, is shown. In FIG. 32, extension 435b is shown in the same orientation as in FIG. 15. It includes free rise projections 521. For the example arrangement as shown in FIGS. 32 and 33, dimensions would be as follows: RR'=6.4 mm; SS'=26.4 mm; TT'=60.2 mm; UU'=13.0 mm R; VV'=270 mm; XX'=12.7 mm; YY'=2.0 mm; ZZ'=32.7 mm; AA"=12.7 mm; and BB"=6.4 mm. FIG. 33 is taken toward end 522.

Figure 34:
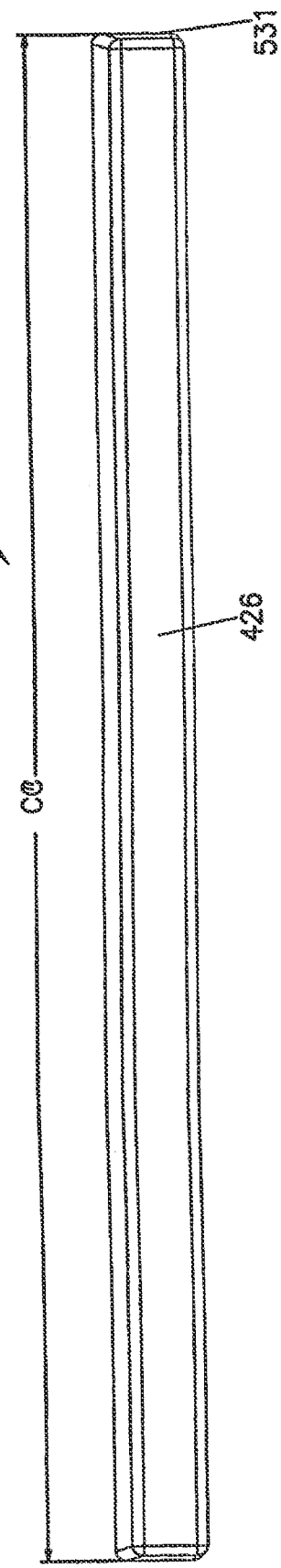
FIG. 34 is a schematic depiction of a housing seal section useable in the cartridge of FIG. 15.
Figure 35:
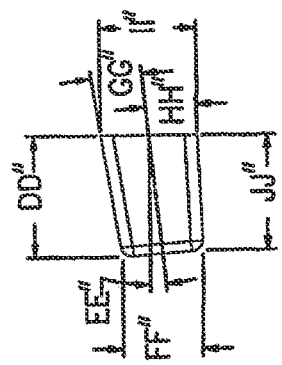
FIG. 35 is a schematic side elevational view of the component depicted in FIG. 34.

In FIGS. 34 and 35 molded arrangement 530 corresponding to housing seal section 426, FIG. 15, is shown. In FIG. 34 it is shown in the same orientation as viewed in FIG. 15. In FIG. 34, end 531 corresponds to end 531, FIG. 15. FIG. 35 is a view taken generally toward end 531.

In FIGS. 34, 35 the dimensions indicated are as follows: CC"=309.1 mm; DD"=22.9 mm; EE"=5° (typically at least 2°, usually at least 3°, often 3°-10°, typically not more than 45°). Still referring to FIG. 35, other dimensions are as follows: DD"=22.9 mm; GG"=3°, HH"=3°, II"=15.9 mm; and JJ"=21.7 mm.

Molded extension 530 would typically be molded directly to the media pack. Since for the cartridge of 400 depicted in FIG. 15, the surface 413 to which molded arrangement 530 would be secured is a fluted surface, the flutes will provide for the free rise (expansion) needed during molding.

In FIG. 36, molded arrangement 540 is shown. Molded arrangement 540 would correspond to bumpers 435 extending across surface 413. In this instance bumpers 435c and 435d would correspond in molded arrangement 540. The two bumpers are the same. Again since they extend across a fluted surface 413, free rise (expansion) projections are not specifically provided.

FIG. 37 is a view generally taken toward end 541 of molded arrangement 540.

In FIGS. 36 and 37, example dimensions are indicated as follows: LL"=270.7 mm; KK"=13.4 mm; and MM"=6.4 mm.

Of course variations from the dimensions described above can be used.

In a general molding operation, molded arrangements 500 and 500a would be provided on the media pack. The other molded arrangements would be provided on sides 412, 413 as shown. They can be provided each in a single molding operation or in a plurality of molding operations, as preferred.

Of course alternate embodiments are possible, which would lead to alternate methods of manufacture if desired. The example shown, is merely indicated to be an example of a usable approach.

It is noted that the particular housing seal arrangement 410 shown and described, is segmented into the four segments described, one extending across each face. Alternate arrangements are possible.

VI. A General Characterization of the Filter Cartridges and Methods

In general terms, according to the present disclosure an air filter cartridge is provided. The air filter cartridge comprises a filter media pack including a stacked construction of individual strips of filter media each comprising a fluted sheet secured to a facing sheet to define inlet and outlet flow channels extending between first and second opposite flow faces. The fluted sheet can be either flat or corrugated perpendicularly to the extension of flutes in the fluted sheet. In general terms, the filter media pack is closed to passage of air therethrough, from the first flow face to the opposite second flow face, without filtering passage of the air through the media.

The typical filter media pack disclosed has a blocked, stacked, configuration with four sides extending between the first and second flow faces. As a result of the blocked, stacked, configuration, the angle of engagement between any two adjacent media pack surfaces, is 90° or nearly 90°.

In general terms the filter cartridge also includes a peripheral, perimeter, housing seal arrangement extending around the four sides of the media pack. The peripheral, perimeter, housing seal arrangement has a first section extending across a first one of the four sides along a path not continuously parallel to an edge between the first side and the second flow face. By "not continuously parallel" in this context, it is meant that the complete extension of the first section of the housing seal arrangement across the side is not completely parallel to the edge. Typically the entire first section of the housing seal arrangement is not parallel to the defined edge, as shown in FIG. 15.

In general terms, the first section of the housing seal arrangement has a first portion and second portion, the first portion being closer to the second flow face and the second portion. For the example shown in FIG. 15, this would correspond to ends of either seal section 420 or seal section 421.

It is noted that for the particular arrangement shown in FIG. 15, the first section of the housing seal arrangement extends across a molded panel arrangement. However in a more broad general sense, there is no specific requirement of this.

In general terms, there is provided a second housing seal section on a side opposite the first housing seal section. Typically the second housing seal section be a mirror image to the first housing seal section, shown in FIGS. 15-21, although this is not required.

In general terms, the first section of the peripheral, perimeter, housing seal arrangement, when straight, will generally extend across a first one of the four sides at a seal plane having a first angle $X_1$ to the edge between the first side and the second flow face, with the first angle $X_1$ being at least 2°, typically at least 3°, usually 3°-10°, and typically not more than 45°. An example provided is about 5°.

Of course for the example shown in FIG. 15, the angle $X_1$ would correspond to the angle X shown. The opposite extension 421 would extend at an angle $X_2$, which, when extension 421 is a mirror image of extension 420, would also correspond to angle X.

In general terms also according to the present disclosure, the housing seal arrangement includes a third section extending across a third side of the media pack between the first and second sides. The third side of the media pack would generally extend between the first and second flow faces.

Of course the housing seal arrangement shown also includes a fourth section extending across a fourth side of the media pack, the fourth side of the media pack being a side position opposite to the third side.

For the particular housing seal arrangement shown, the housing seal arrangement sections are shown individually made, knitted or sealed together. Alternate assembly is possible, for example in which the housing seal arrangement comprises a single, integrally molded, structure.

For the example shown, the third and fourth sections of the peripheral, perimeter housing seal arrangement generally extend with a seal plane: extending parallel to edges of the media pack corresponding to the juncture between the sides on which each of the third and fourth sections are positioned, and the flow faces; and, extending at an angle of less than 90°, to the associated sides. An example of this is shown in FIGS. 15-21. Of course alternatives are possible.

More specifically, for the particular arrangement shown, the seal arrangement defines a central seal plane. As a result the first and second sections of the peripheral, perimeter, housing seal arrangement as defined above, would extend, as shown in the cross-sectional figures depicted, with a central seal plane extending generally orthogonal to the associated sides of the media pack. On the other hand the third and fourth sections of the peripheral, perimeter, housing seal arrangement are shown extending at an acute angle of less than 90° outwardly from associated sides, typically no more than 88° (90°−2°).

Herein in this context reference is meant to seal extension disregarding draft angles on the seal, with the reference being to a plane bisecting each seal extension as it projects outwardly from the media pack.

An example shown, a non-seal cushion or bumper arrangements extending across selected sides of the media pack are shown. For the example depicted in FIGS. 15-21, two cushion or bumper extensions are positioned in extension across a pair of opposite sides 412, 413 which extend between the sides on which the molded panels 402, 403 are provided. In more general terms, the cushions arrangements extend across sides of the media pack 401 which comprise exposed media. Example of specific arrangements are shown and described.

For the examples described, the opposite panels which cover ends of the single facer strips, are molded-in-place panels.

Examples of molded housing seal arrangements and methods for making them are described.

In general terms according to the present disclosure an air cleaner assembly is provided which includes a housing having a base and service cover. The base is described as having a first outwardly directed seal support flange; and the service cover is defined as having a second outwardly directed seal support flange. An air filter cartridge in general terms described above, is positioned in the air cleaner assembly with the housing seal arrangement positioned and sealed between the seal support flange on the base and the seal support flange of the service cover.

An example support flange arrangement is described in which the first support flange includes a first seal edge (blunt knife blade) projection that is directed into the housing seal arrangement during sealing; and the second seal support flange includes a second seal edge (blunt knife blade) projection which extends into the housing seal arrangement, during sealing. A preferred arrangement in which the seal edge projection of the downstream side of the housing (in the example shown the base), is positioned radially outwardly from the media pack further than the seal edge projection positioned on the downstream side of the housing (in the example shown the housing cover).

For the particular air cleaner assembly shown, the housing base includes a dirty air inlet arrangement, the service cover includes a clean air outlet arrangement, and the air flow is generally directed upwardly through an internally received filter cartridge.

VII. A Second Example of an Air Cleaner Assembly Utilizing Principles as Described Herein, FIGS. 38-55.

In the air cleaner arrangement and features of FIGS. 38-55, many of the general principles described hereinabove are applied in a particular example, in some instances with additional features. In FIGS. 38-42 features of an example air cleaner assembly are shown. In FIGS. 43-55, features of a removable and replaceable (serviceable) filter cartridge for utilization in the air cleaner of FIGS. 38-42, are depicted.

Figure 38:
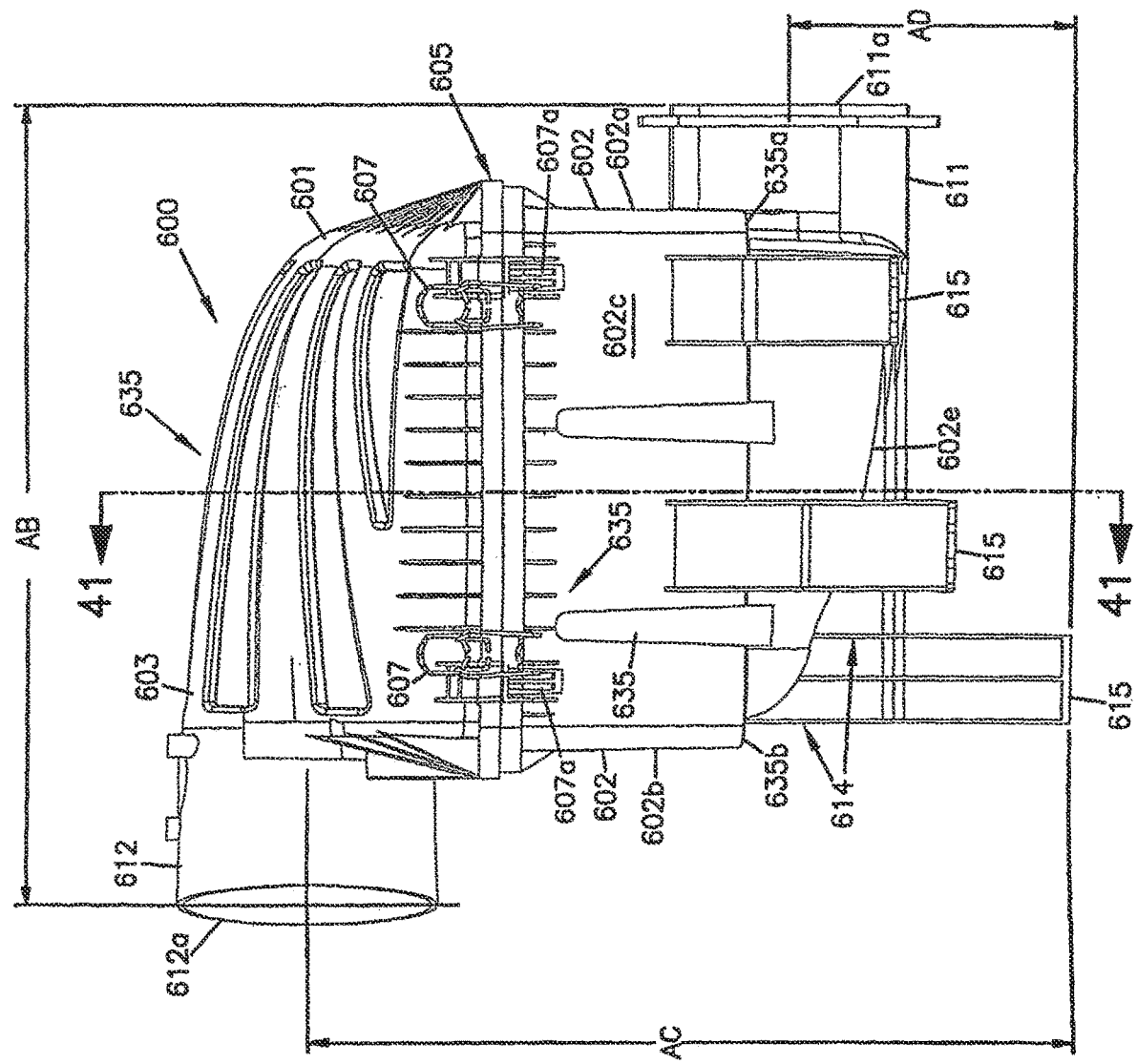
FIG. 38 is a schematic side elevational view in an alternate air cleaner assembly to the one depicted in FIG. 11, incorporating principles according to the present disclosure.

In FIG. 38, at reference numeral 600, an air cleaner arrangement including features according to the present disclosure is provided. The air cleaner arrangement 600 comprises a housing 601 including a first, in this instance inlet or base section 602 and a second, in this instance outlet or cover, section 603. The inlet section 602 and outlet section 603 are secured to one another along a housing separation region 605. For the sample shown, outlet section 603 is positioned on inlet or base section 602 as a cover.

Releasable clamps 607 are provided for removably securing the sections 602, 603 to one another along the separation region 605. The drawings are schematic with respect to the clamps 607, and they are shown positioned approximately where they would be used in the final arrangement. In some instances the clamps 607 may be mounted on mounts such as shown at 607*a*, indicating that each could be positioned shifted slightly laterally from its depicted position, in the actual product.

Still referring to FIG. 38, at 611 an inlet arrangement, in this instance an inlet tube 611*a* is positioned for air flow inlet into an interior of housing 601. The inlet tube 611*a*, in this example, is integral with a remainder of housing section 602.

At 612 an outlet arrangement, in this instance an outlet tube 612*a*, is depicted, providing for air flow in the interior of housing 601. In the example shown, outlet tube 612*a* is integral with outlet section 603.

Normal filtering air flow, then is: (a) into inlet tube 611*a*; (b) into housing section 602; (c) through an internally received filter cartridge discussed below; and (d) with the filtered air then flowing into section 603 and exiting therefrom through outlet tube 612*a*. For the example shown, the air is directed under the filter cartridge, upwardly through the filter cartridge, for filtering, and then out of the housing 601.

A variety of materials can be utilized for housing 601. Typically, sections 602 and 603 are molded from a plastic material, although alternatives are possible. The latches 607 are typically wire.

In FIGS. 38-41, the housing base or inlet section 602 includes: a first wall 602*a*, having inlet section 611 therein; opposite wall 602*b*, having outlet tube 612 (of cover 603) thereabove; a first side wall 602*c*; and, an opposite second side wall 602*d*. Further, the base section includes a bottom 602*e*. The bottom 602*e* is contoured and configured, to facilitate air flow into a media pack contained within the housing 601.

Still referring to FIG. 38, housing section 602 is provided with a mounting or mounting post arrangement 614 including mounting pads 615 thereon. The particular number and arrangement of mounting pads 615 would typically be customized for a mounting location in a particular vehicle or equipment, such as on an engine block or frame component. The pads 615 provide for support of the air cleaner 600 in a desired orientation for operation. For the example shown in FIG. 38, the typical orientation for operation would be as shown, with the outlet section 603 positioned above the inlet section 602.

In FIG. 38, example dimensions are provided as follows: AB=436.8 mm; AC=375 mm; and AD=140 mm. These dimensions are examples, and a variety of alternate sized arrangements can be used. The dimensions described for FIGS. 38-55 are usable, for example, as an air cleaner for a vehicle such as a light duty pick-up, twin turbo, having a rated air flow therethrough on the order of about 800 cfm.

Figure 39:
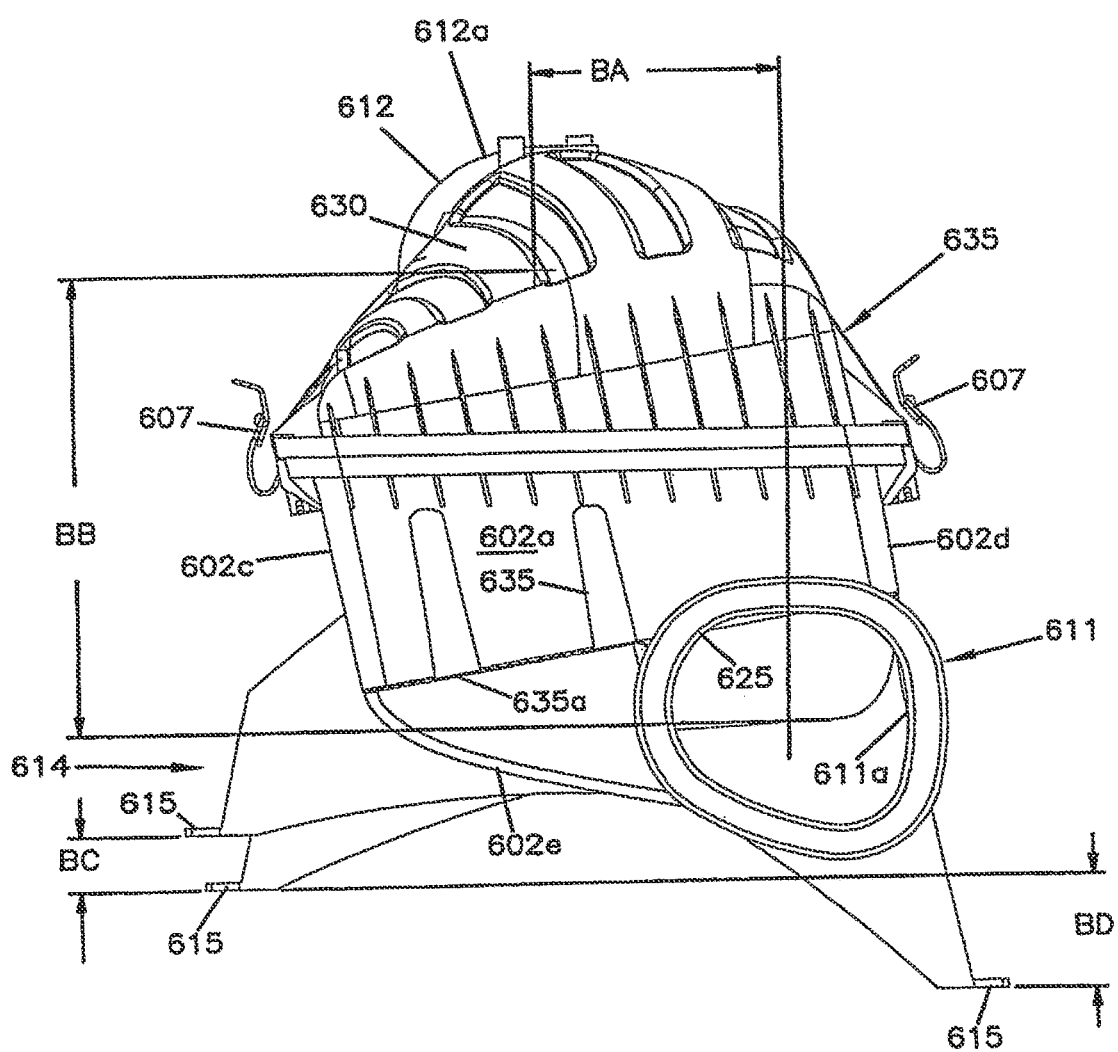
FIG. 39 is an inlet end view of the air cleaner depicted in FIG. 38.

Attention is now directed to FIG. 39 in which an end elevational view (toward end 602*a*) is depicted, the view being toward inlet arrangement 611. Referring to FIG. 39, and looking into inlet tube 611*a*, a portion of a removable and replaceable filter cartridge 625 is viewable. Such a filter cartridge 625 is sometimes referred to as a "service part", since after a period of use in air cleaner 600, cover, outlet, section 603 would be separated from section 602, the filter cartridge 625 would be removed and the air cleaner 600 would be serviced, typically by installation of a new cartridge 625.

Also referring to FIG. 39, region 630 of housing section 603 is viewable with a curved, shape helping to direct (funnel) air flow from the filter cartridge 625 toward outlet tube 612. Such a curved arrangement for changing the direction of air flow and directing it toward an outlet tube 612, will be characterized herein, in general terms, as an outlet air scoop or outlet air funnel configuration. Similarly, bottom 602*e* of inlet section 602 has an inlet air scoop or inlet air funnel configuration.

Dimensions indicated in FIG. 39, for the example shown, are as follows: BA=115.5 mm; BB=235.9 mm; BC=28.8 mm; and BD=58 mm.

Figure 40:
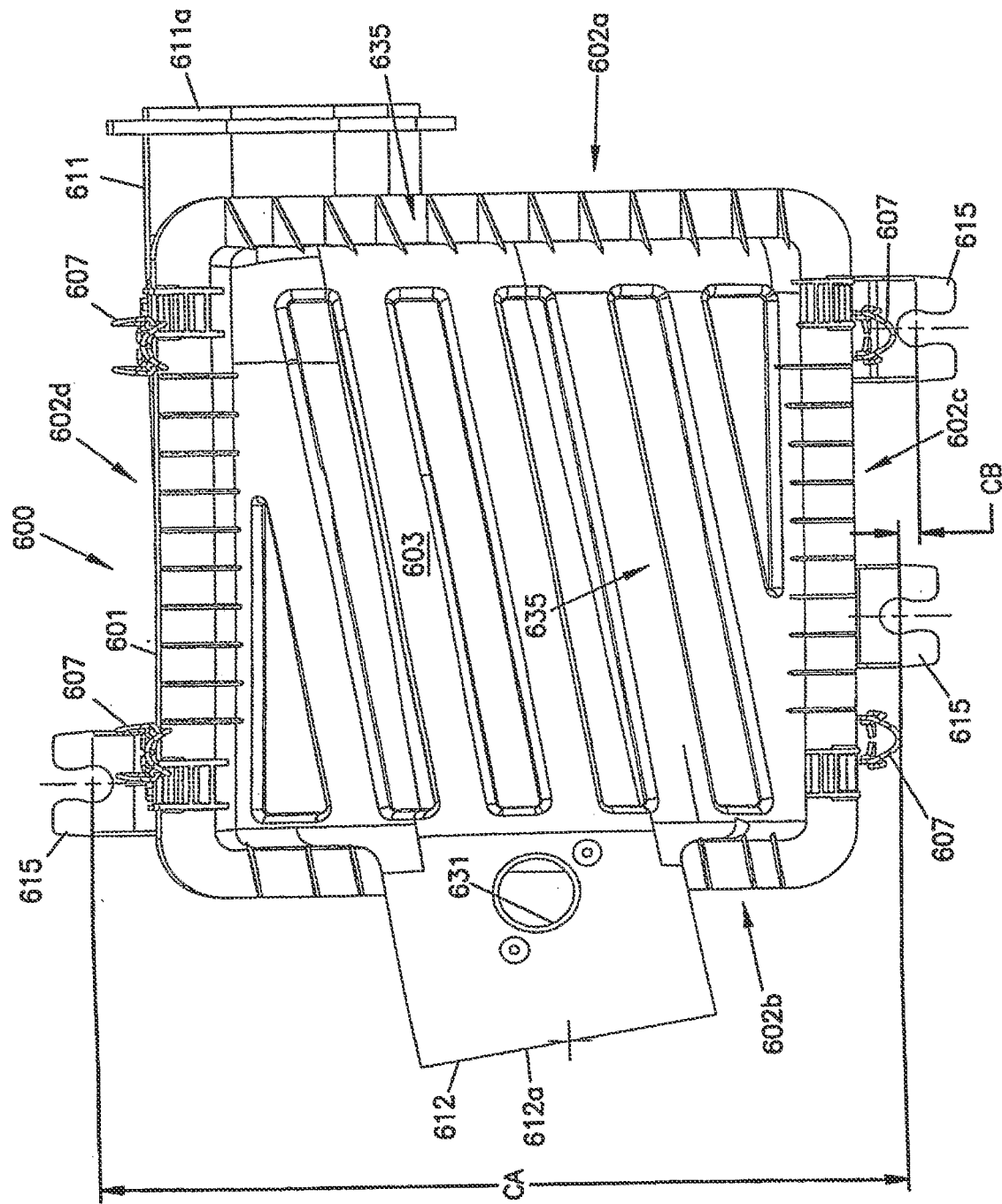
FIG. 40 is a top plan view of the air cleaner depicted in FIGS. 38 and 39.

Attention is now directed to FIG. 40, a top plan view of air cleaner 600. Referring to FIG. 40, it can be seen that for the example air cleaner 600 provided, four clamps 607 are used to secure housing section 603 in place, although alternatives are possible. Still referring to FIG. 40, at 631 a mounting arrangement in outlet 612 is provided, for mounting equipment such as a pressure indicator within assembly 600. Also, in some instances, a mass air flow sensor (MAFS) can be positioned either in outlet arrangement 612 or in duct work downstream.

In FIGS. 38-40, various ribbed structures 635 are depicted in the housing 601. The ribbed structures provide for such functions as decorative appearance and strengthening housing components involved. In FIG. 38 at 635*a* and 635*b*, a shelf arrangement comprising opposite shelves in base or inlet section 602 is provided by contours in base 602. These will be used to support the internal filter cartridge 625, as discussed below.

In FIG. 40, indicated dimensions for the example described are as follows: CA=338.5 mm; and, CB=9 mm.

Figure 41:
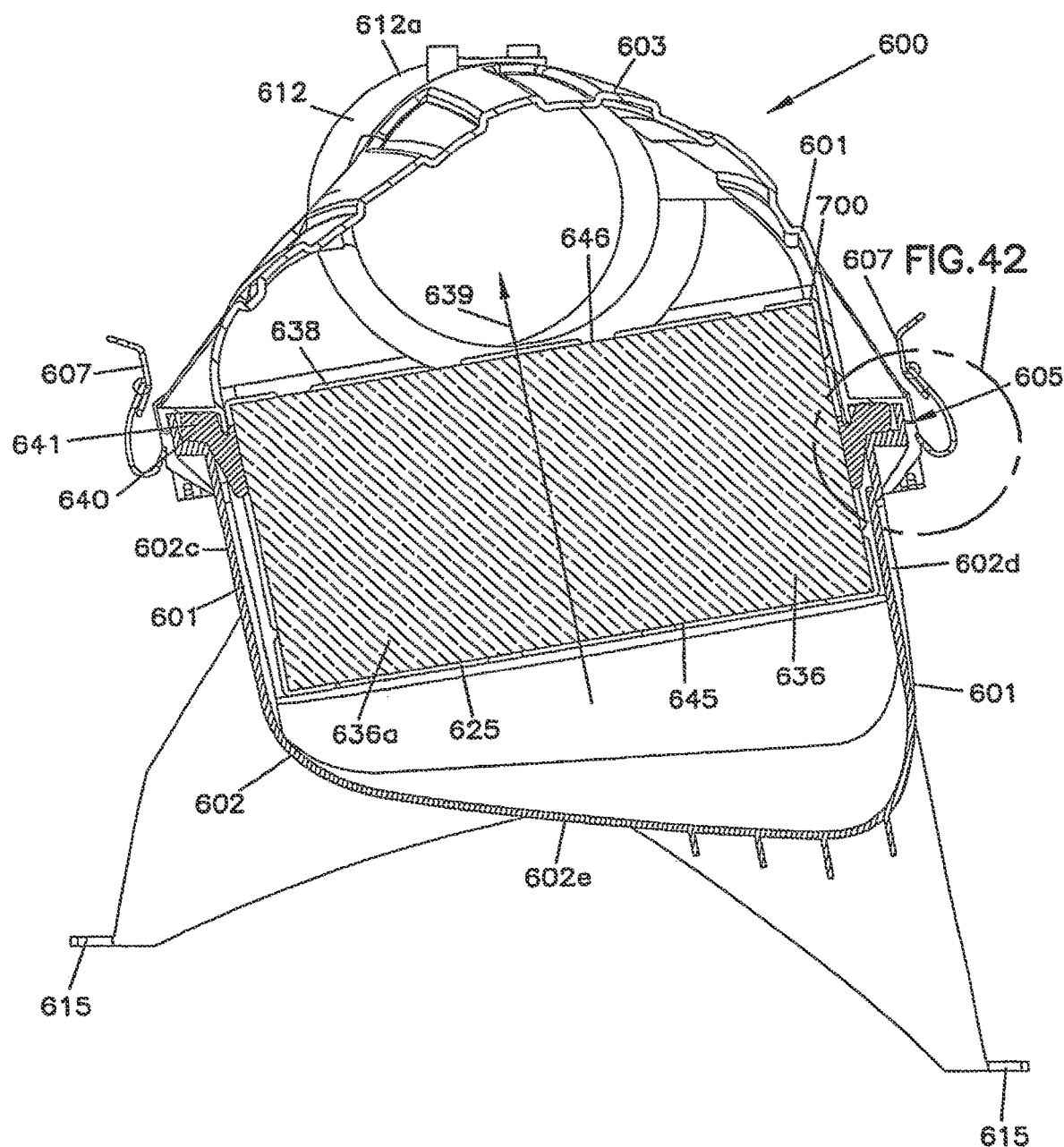
FIG. 41 is a cross-sectional view taken along line 41-41, FIG. 38.

Attention is now directed to FIG. 41, a cross-sectional view of air cleaner 600 taken along line 41-41, FIG. 38. Referring to FIG. 41, filter cartridge 625 is seen positioned within interior 601*a* of housing 601. The filter cartridge 625 comprises a media pack arrangement 636 and housing seal arrangement 640. The media pack arrangement 636 generally comprises a media pack 636*a* having opposite side panels 637, 638 of which only panel 638 is partially viewable in FIG. 41. The media pack arrangement 636 is discussed in greater detail below.

The housing seal arrangement 640 is a peripheral, perimeter seal arrangement and includes a pinch seal flange 641 extending (and projecting outwardly) around the media pack arrangement 636. The seal flange 641 is configured to be positioned between flange arrangements at the housing separation region 605, for formation of an axial pinch seal. The term "axial" in this context, is meant to refer to a seal that operates with a compression or pinch in a direction generally in line with the direction of air flow, see arrow 639, through media pack arrangement 636, as opposed to the direction toward or away from media pack 636.

For the example shown, the housing seal arrangement 40 is a molded-in-place housing seal arrangement, meaning it is molded directly to the media pack arrangement 636. Further, the housing seal arrangement 640, for the example shown, is molded from a single polymeric material, such as a polyurethane material, for example polyurethane foam. That is, the housing seal arrangement 640 includes no preformed rigid structures embedded therein, in the preferred example depicted. Such a molded-in-place housing seal arrangement will sometimes be described as consisting essentially of the polymeric material from which it is molded.

Still referring to FIG. 41, the media pack 636*a* includes a first, lower, in this instance inlet, face 645, and, a second, opposite, in this instance outlet face 646. The direction of air flow during filtering is generally from inlet face 645 to outlet face 646, as shown by arrow 639.

The filter cartridge 625 is discussed in further detail below, in connection with FIGS. 43-55. However before turning to those figures, attention is directed to FIG. 42, an enlarged fragmentary view of a portion of FIG. 41, and providing for an understanding of housing seal arrangement 640 in greater detail. It is noted that FIG. 42 is schematic.

Figure 42:
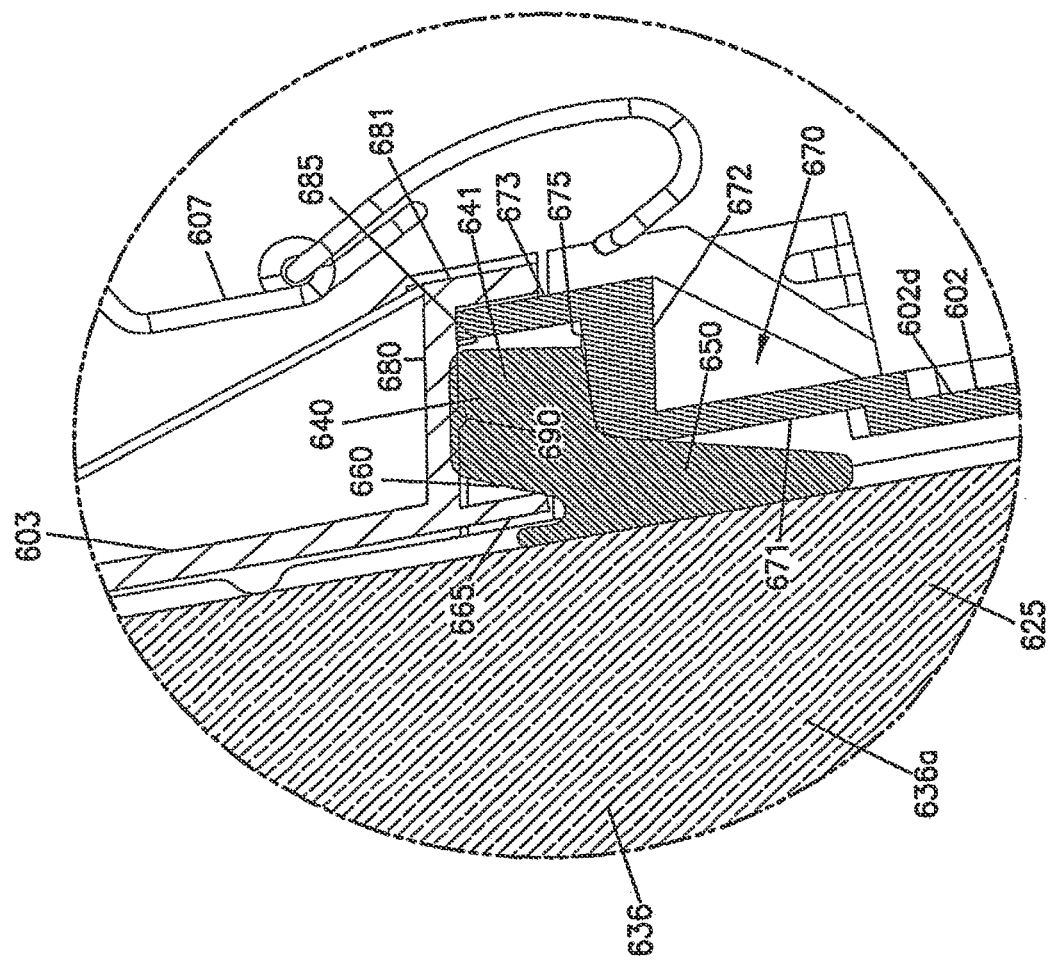
FIG. 42 is an enlarged fragmentary view of a portion of FIG. 41.

Referring to FIG. 42 housing seal arrangement 640 is depicted mounted on media pack arrangement 636. The housing seal arrangement 640 would typically be directly mounted on the media pack 636*a*, in extension across those sides which do not include a side piece 637, 638. By the term "directly" it is meant that the housing seal arrangement 636 is secured in contact with the media of the media pack along those sides to which it is directly mounted. That is, there is no preformed structural member between the housing seal arrangement and the media, along two sides, in a typical preferred instruction. When extending across side pieces 637, 638, the housing seal arrangement 640 would generally be secured directly to the side pieces 637, 638, with the side pieces 637, 638 being secured to the media pack 636*a*.

Referring to FIG. 42, the housing seal arrangement 640 comprises pinch seal flange 641 and base 650. The two are typically molded integral with one another; housing seal arrangement 640 typically being molded from a single polymeric material such as a foamed polyurethane. Pinch seal flange 641 is positioned on base 650 in a form defining trough 660 between a portion of the pinch flange 641 and the media pack arrangement 636 (and media pack 636*a*).

The trough 660 is sized and positioned as a receiving trough to receive, extending therein, a projection flange 665 on housing cover section 603. That is, during installation, in a typical example, a flange 665 on a housing section, in this instance section 603, projects into trough 660 to a location between a portion of the pinch flange 641 and the media pack arrangement 636. Projection of flange 665 into trough 660, between pinch flange 641 and the media pack arrangement 636 provides for a variety of effects including: facilitating centering of filter cartridge 636 in place, during installation; and helping to ensure that a proper cartridge 625 is used and is properly oriented in the housing 601.

Although alternatives are possible, the trough 660 is typically at least 4 mm deep at its deepest extension, usually at least 5 mm deep, and for the example shown 6-12 mm deep. The maximum depth of extension is a matter of choice, for the application involved, but typically will not exceed 14 mm.

Still referring to FIG. 42, housing section 602 is provided with flange arrangement 670 thereon comprising: receiver section 671, sized and shaped to accommodate base 650; radially outwardly directed flange section 672; and, axially directed outer rim projection or section 673. The outer rim projection 673 extends toward cover section 603. Outer rim projection section 673 and outwardly directed flange 672 together form a two-sided pocket 675 for receipt therein of seal flange 641, during installation.

Housing section 603 includes: radially, outwardly directed flange 680; and axially directed outer rim projection 681 positioned on flange 680. The rim projection 681 extends toward base 602. The flange 680 and rim projection 681 together form a two-sided pocket 685 for fitting over seal flange 641, during installation. The pocket 685 is sized such that when clamping of clamp 607 occurs, projection 673 will engage (bottom out) against flange 680, at a level of appropriate compression for pinch flange 641. In FIG. 42, a typical amount of compression is indicated by overlap between pinch flange 641 and housing flange 680.

Still referring to FIG. 42, it is noted that flange 680 includes a central, axial, seal projection, edge or bead 690 thereon, positioned to project axially into seal flange 641, during sealing, to facilitate formation of a seal. The seal bead 680 generally projects, relative to an adjacent portion of flange 680, sufficiently to press into the seal material 641 a distance corresponding to 2%, typically at least 3% and usually at least 4% of the maximum thickness of region 641, when not compressed.

Typically and preferably both bead 690 and projection 665 extend completely around media pack arrangement 626, during installation.

Still referring to FIG. 42, it is noted that the pinched flange 641 is generally sized to be compressed at least 2%, typically at least 3% and usually at least 4% in overall thickness from its uncompressed position, during sealing and compression. This latter description is meant to refer to the portions of the seal lip 641 not engaged by the bead 690.

Figure 43:
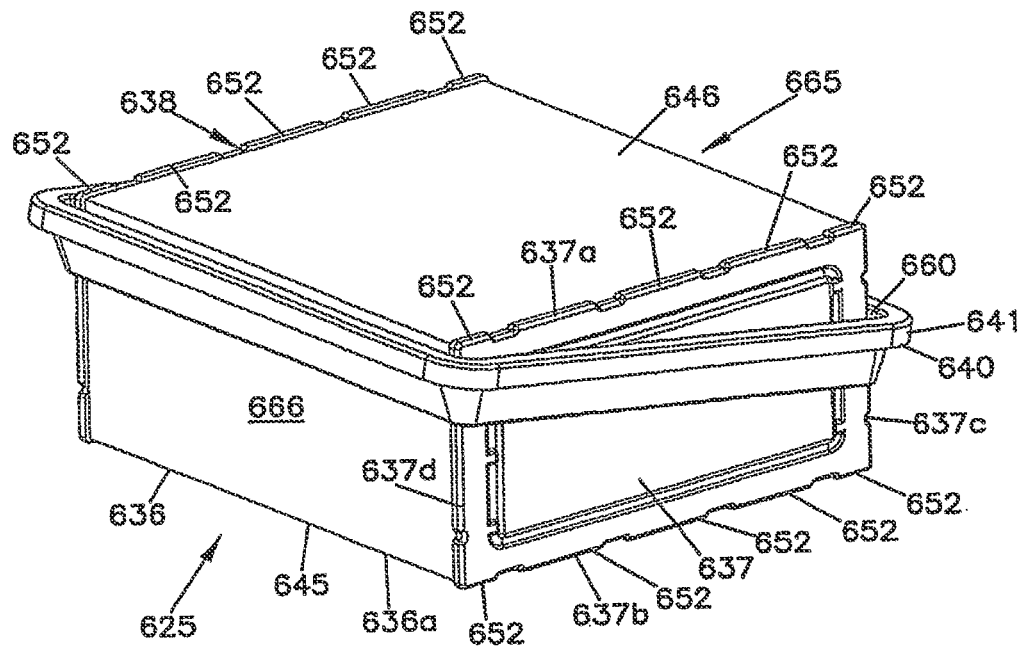
FIG. 43 is a schematic top perspective view of a filter cartridge useable in the air cleaner of FIGS. 38-42.

Referring now to FIG. 43, reference number 625 indicates the removable and replaceable, i.e., serviceable, filter cartridge installable within air cleaner 600, generally in accord with FIGS. 41 and 42. As previously indicated, filter cartridge 625 comprises media pack arrangement 636 and housing seal arrangement 640. The media pack arrangement 636 comprises media pack 636a and two opposite side panels 637, 638. The typical media pack 636a would comprise a stack of strips of corrugated media secured to facing media appropriately to form opposite inlet and outlet faces 645, 646 respectively. As a result of flute seal arrangements within the media pack 636, a plurality of inlet flutes would extend between the faces 645, 646 and a plurality of outlet flutes would extend between the faces 645, 646 with: the inlet flutes open adjacent the inlet face 645 and closed adjacent the outlet face 646; and, with the outlet flutes open adjacent the outlet face 646 and closed adjacent the inlet face 645. The media pack 636a would generally be closed to direction of unfiltered air between faces 645, 646. Thus, in order for air that is passed into inlet face 645 to pass outwardly from outlet face 646, (on opposite side of seal arrangement 640) the air must flow through a portion of the media. This is typical z-filter configuration as discussed above.

The housing seal arrangement 640 as previously discussed, comprises pinch flange 641 and base 650. Trough 660 is positioned between a portion of pinch flange 641 and the media pack arrangement 636.

Figure 44:
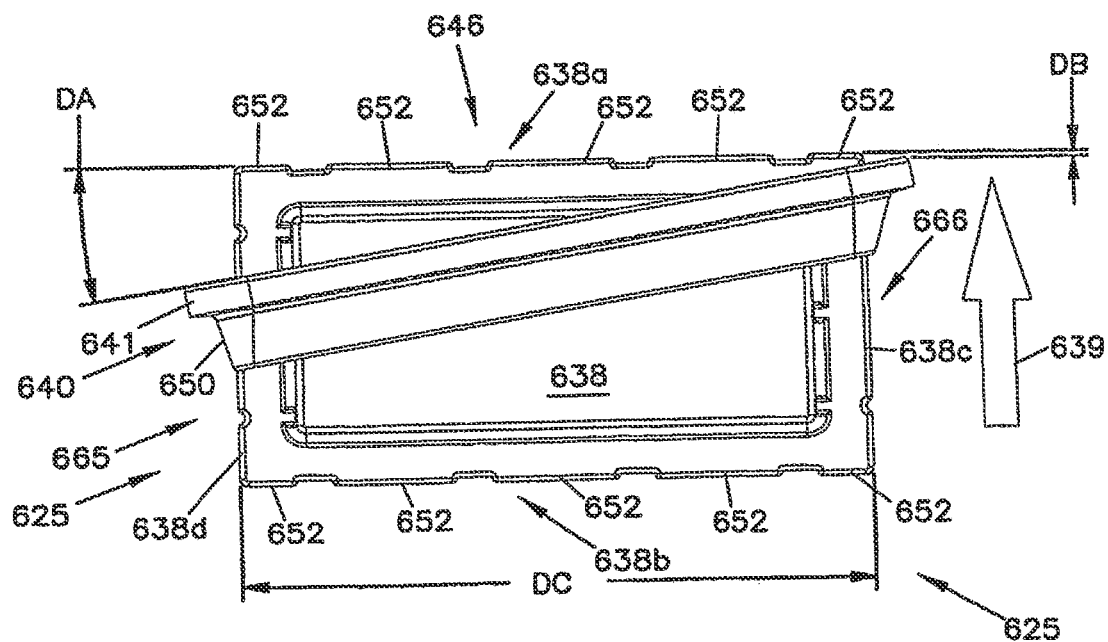
FIG. 44 is a side elevational view of the filter cartridge depicted in FIG. 43.

In FIG. 44, a side elevational view of the cartridge 625 is provided, the view being toward side panel 638. Referring to FIG. 44, it can be seen that the example pinch seal 641 is planar and a plane of pinch seal 641 extends at an angle DA relative to a plane of outlet face 646, that is greater than 0°. The angle DA, (as previously discussed for angle X, FIG. 1a), is generally at least 2°, typically at least 3°, typically not larger than 80°, usually not more than 45°, and as an example, 3°-10°, inclusive. For the example shown, the angle DA is 10°. It is typically within the range of 5°-15°. (Some of the techniques described herein can be applied with a pinch seal 641 that is non-planar.)

From the above, it will be understood that for the example shown the pinch seal 641 generally defines a plane, which extends at an angle greater than 0°, typically greater than 2°, etc., relative to the opposite flow faces 645, 646 of the media pack 636a. Alternate arrangements are possible, for example wherein portions of the seal arrangement are in different planes.

Still referring to FIG. 44, it is noted that side panel 638 includes an upper edge 638a, a lower edge 638b and opposite side edges 638c and 638d. Edge 638a is formed with a projection arrangement 652, in this instance spaced bumpers, that project axially beyond media pack face 646, in the example shown, by a distance DB of at least 0.5 mm, usually at least 1 mm. Typically the amount of extension DB would be at least 1.5 mm, for example 1.5-3.5 mm. For the example shown, the dimension DB is 2.3 mm. The dimension DB allows sections 652 to operate as bumpers.

Similarly, the bottom of edge 638b includes a projection arrangement 652, in this instance spaced bumpers. The projection arrangement 652 in side edge 638b, extend beyond surface 645 a distance analogous to DB, i.e., at least 0.5 mm, usually at least 1 mm, typically at least 1.5 mm, and usually 1.5 mm-3.5 mm, for example 2.3 mm.

In a typical arrangement, the opposite panel 637, FIG. 43, is identical to panel 638, but mounted as a mirror image. Thus, it too has top and bottom edges 637a, 637b, FIG. 43, and side edges 637c, 637d with: top and bottom edges 637a, 637b including spaced bumpers 652 extending axially beyond media pack faces 646, 645. When installed, one or more of edges 637a, 637b, 638a, and 638b can engage a shelf arrangement to support cartridge 625. For example referring to FIG. 38, edge 637b would rest on shelf 635a, and edge 638b would rest on shelf 635b. This provides for a support of cartridge 625 within interior 601a of housing 601, so that the cartridge 625 is not suspended by the pinch seal 641. This will stabilize the cartridge 625 when installed, against damage from vibration and shock, during use.

Referring to FIG. 44, dimension DC would be 235 mm, for the example shown.

Figure 45:
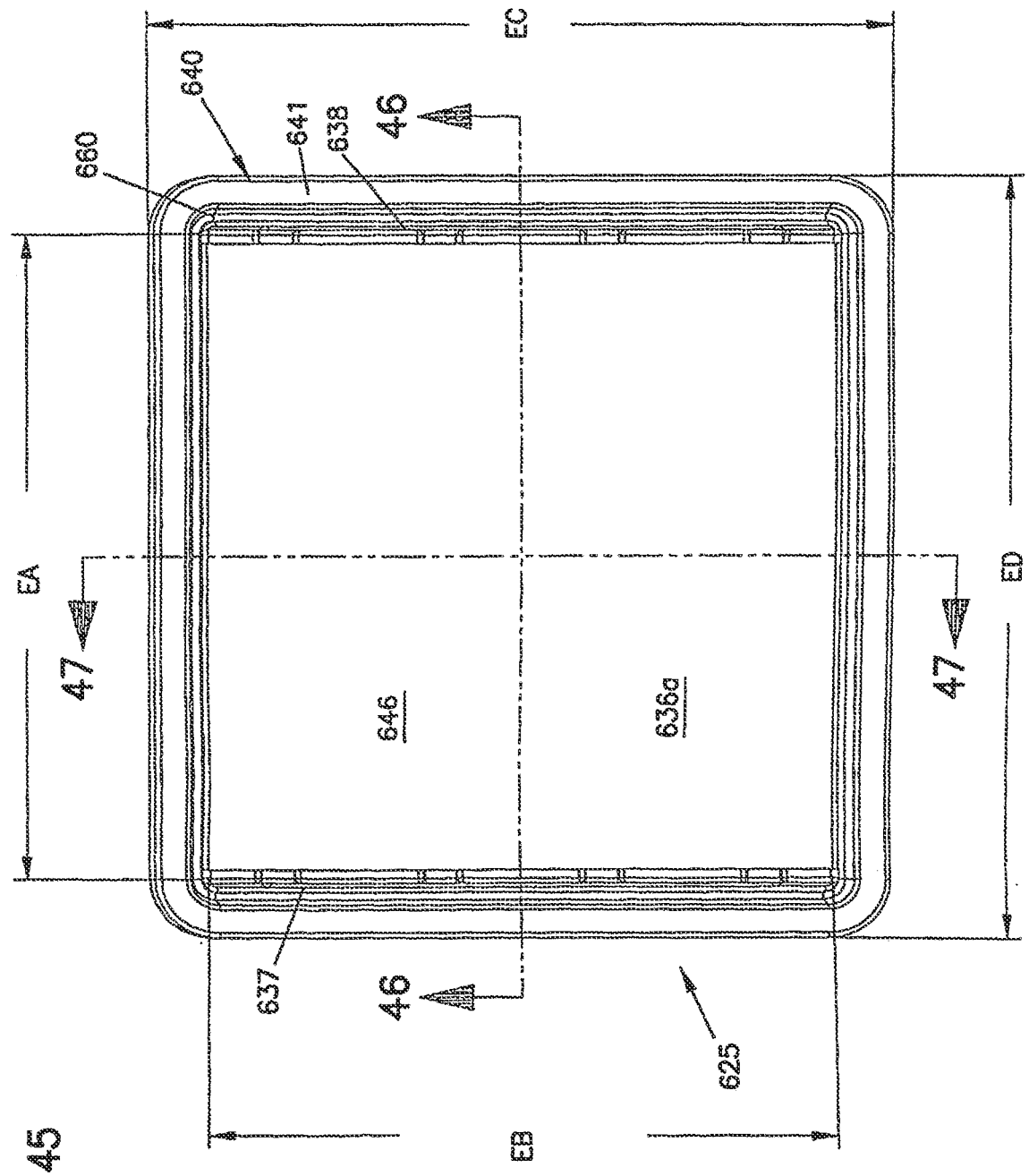
FIG. 45 is a top plan view of the filter cartridge depicted in FIGS. 43 and 44.

Attention is now directed to FIG. 45, which a top plan view of cartridge 625 is depicted, toward outlet face 646. In FIG. 40 the indicated dimensions, for the example described in this section is as follows: EA=265.2 mm; EB=230.4 mm; EC=272.7 mm; and ED=312.3 mm.

Figure 46:
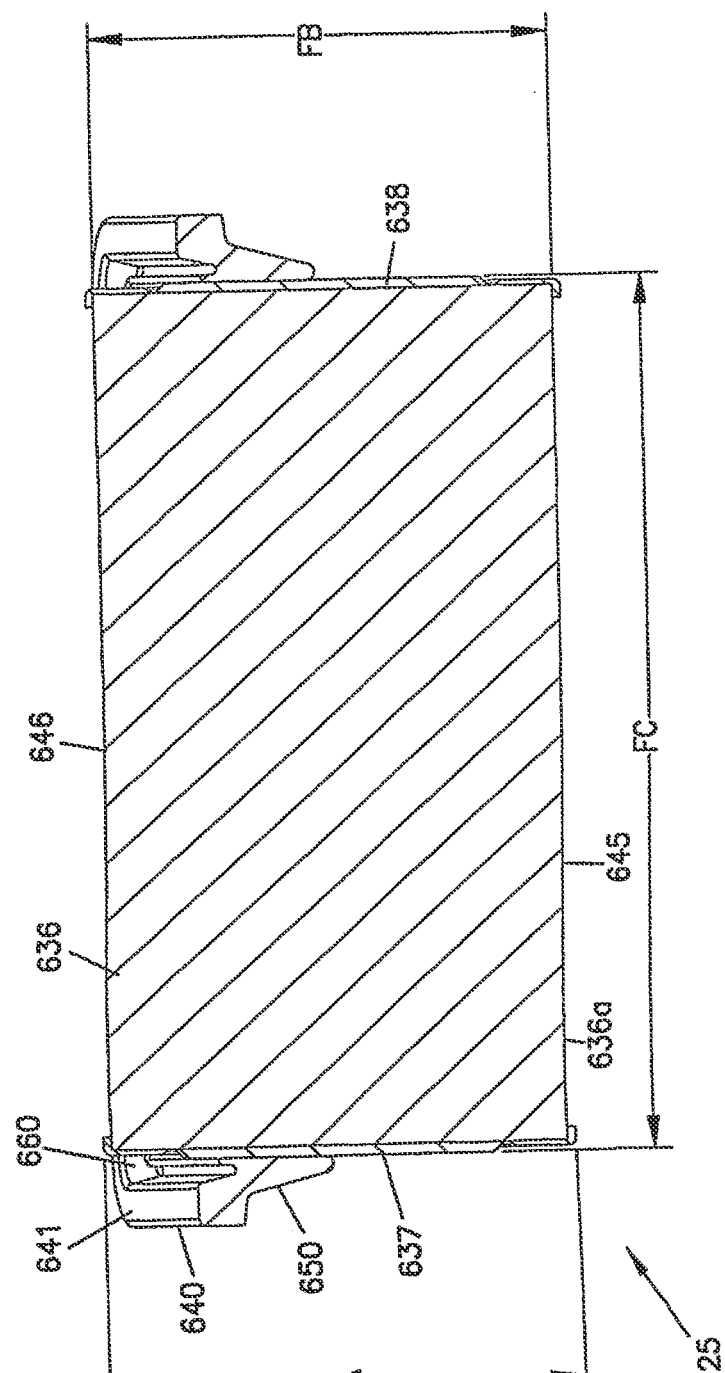
FIG. 46 is a cross-sectional view taken along line 46-46, FIG. 45.

Attention is now directed to FIG. 46, a cross sectional view of cartridge 625 taken along line 46-46, FIG. 45. In FIG. 46 the example dimensions indicated are as follows: FA=131.6 mm; FB=127 mm; and FC=271.2 mm.

From the dimension FB of 127 mm, it will be understood that the techniques described herein are particularly well suited for media packs that are relatively thick in extension between the opposite flow faces 645, 646. Although the techniques can be applied in alternate configurations, they are particularly well adapted for media packs with the dimension between the opposite flow faces 645, 646 of at least 50 mm, and typically 90 mm or more.

Figure 47:
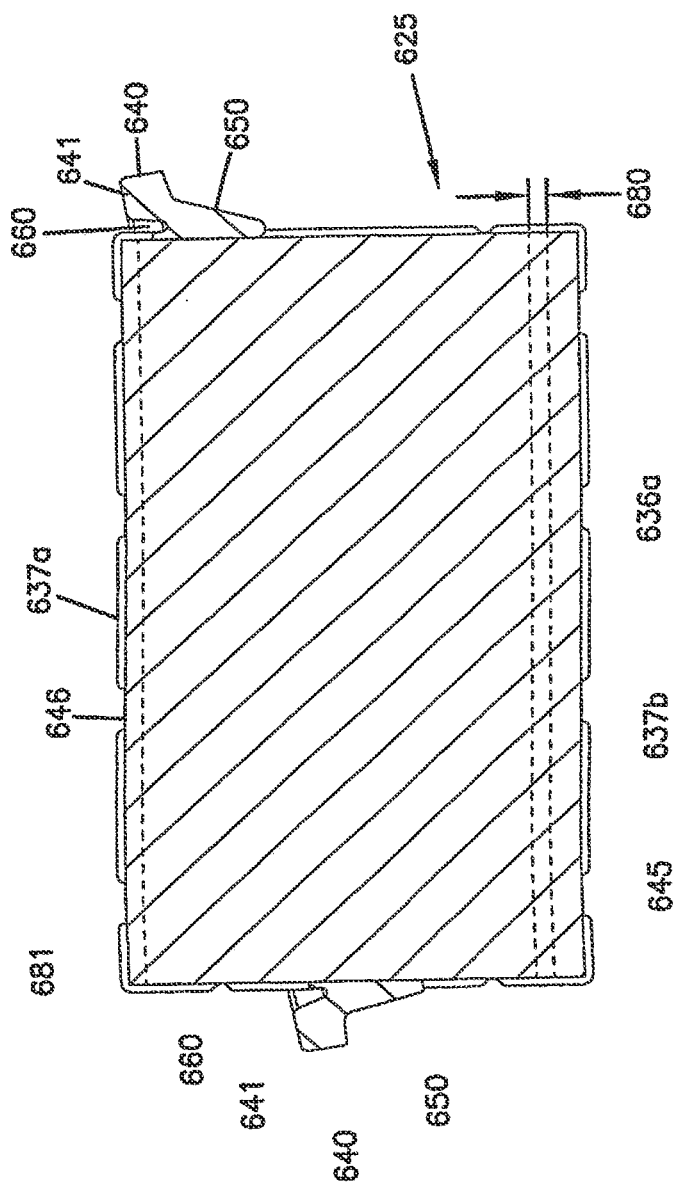
FIG. 47 is a cross-sectional view taken along line 47-47, FIG. 45.

Attention is now directed to FIG. 47, a cross sectional view of cartridge 625 taken generally along line 47-47, FIG. 47. Referring to FIG. 47, the dotted line location at 680 indicates the location of the stacking beads that seal closed the outlet flutes at a region adjacent to inlet face 645. The dotted line 681 indicates the single facer bead location sealing the inlet flutes closed adjacent to outlet face 646.

The two dotted lines for the stacking beads, in 680, indicate that the stacking bead is recessed from face 645, but it can still be characterized as adjacent thereto. The single dotted line 681 for the single facer bead location, indicates that the single facer bead abuts the outlet face 646, as it would when constructed in the manner described hereinabove in which the single facer bead is cut in half during a manufacturing process, leaving it flush with the face of the resulting media pack.

Figure 48:
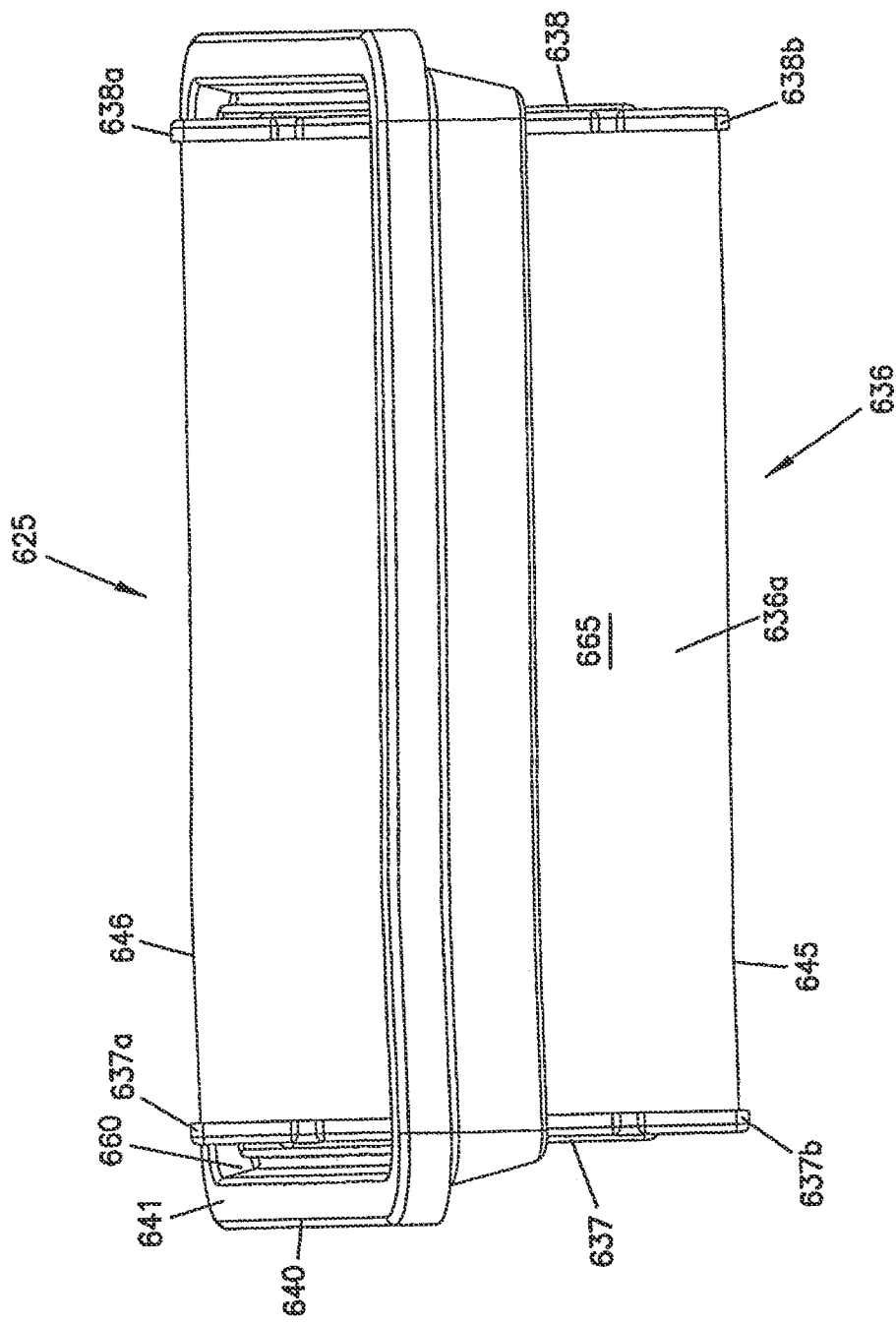
FIG. 48 is an end view of the filter cartridge depicted in FIGS. 43 and 44.
Figure 49:
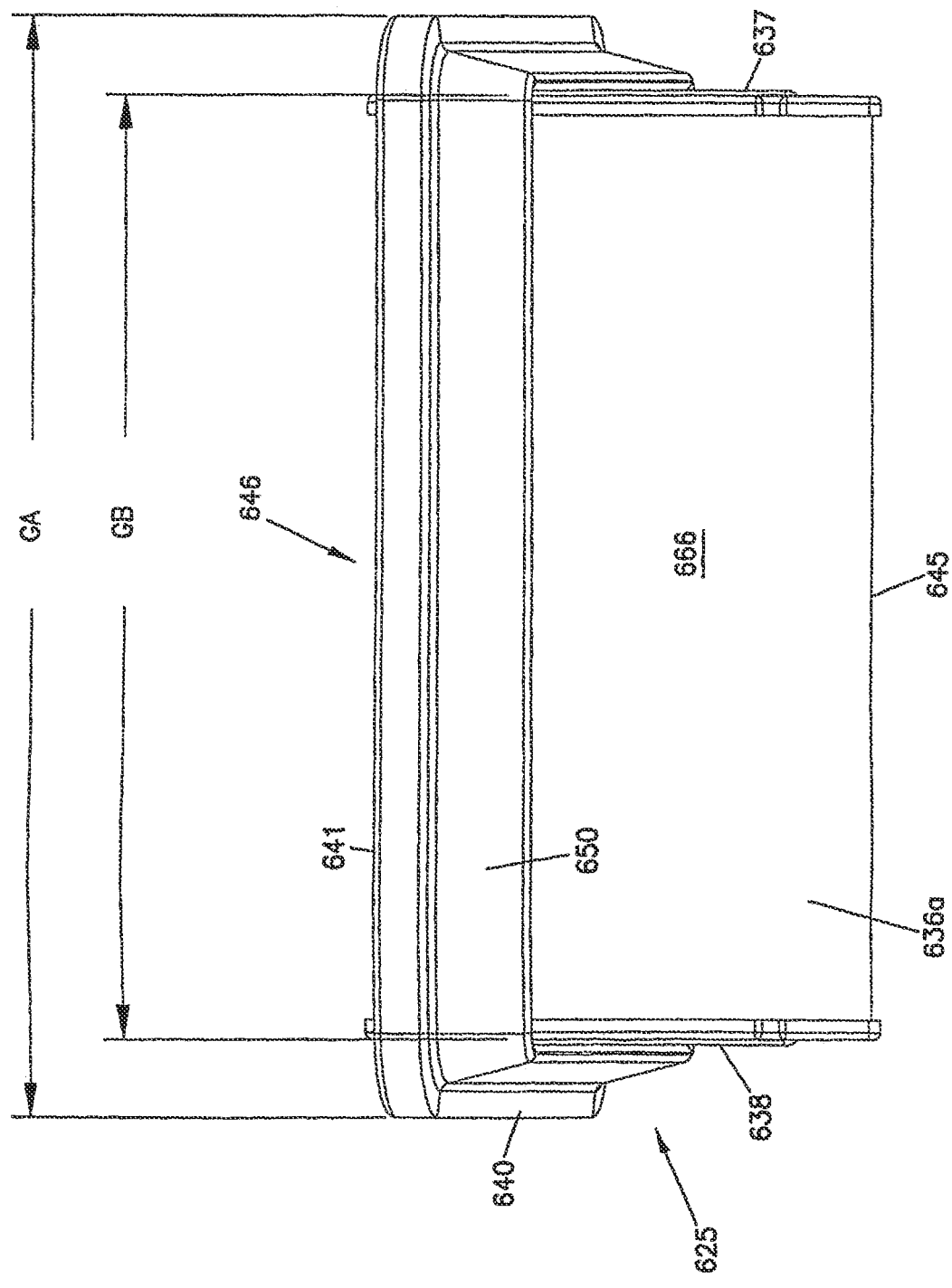
FIG. 49 is a second end view, opposite FIG. 48, of the filter cartridge depicted in FIGS. 43 and 44.

Attention is now directed to FIG. 48, a plan view of cartridge of FIG. 5 generally directed toward side 665, FIG. 43. FIG. 49 is an opposite plan view to FIG. 48, the view generally being directed toward side 666, FIG. 44.

For the example shown, surfaces 665, 666 are not covered by any molded panel arrangement or side piece, except at edges, but rather comprise exposed surfaces of single facer material, either fluted or facing sheet, with seal arrangement 640 extending thereacross. In some arrangements, if desired, protective materials can be placed over surfaces 665, 666 if desired. In addition, or alternatively, molded side panels or bumpers can be provided along faces 665, 666. However, it is anticipated in a typical example, surfaces 665, 666 will generally be left as exposed media or single face surfaces, for convenience.

In FIG. 49, the example dimensions are as follows: GA=312.3 mm; and GB=268.2 mm.

Figure 50:
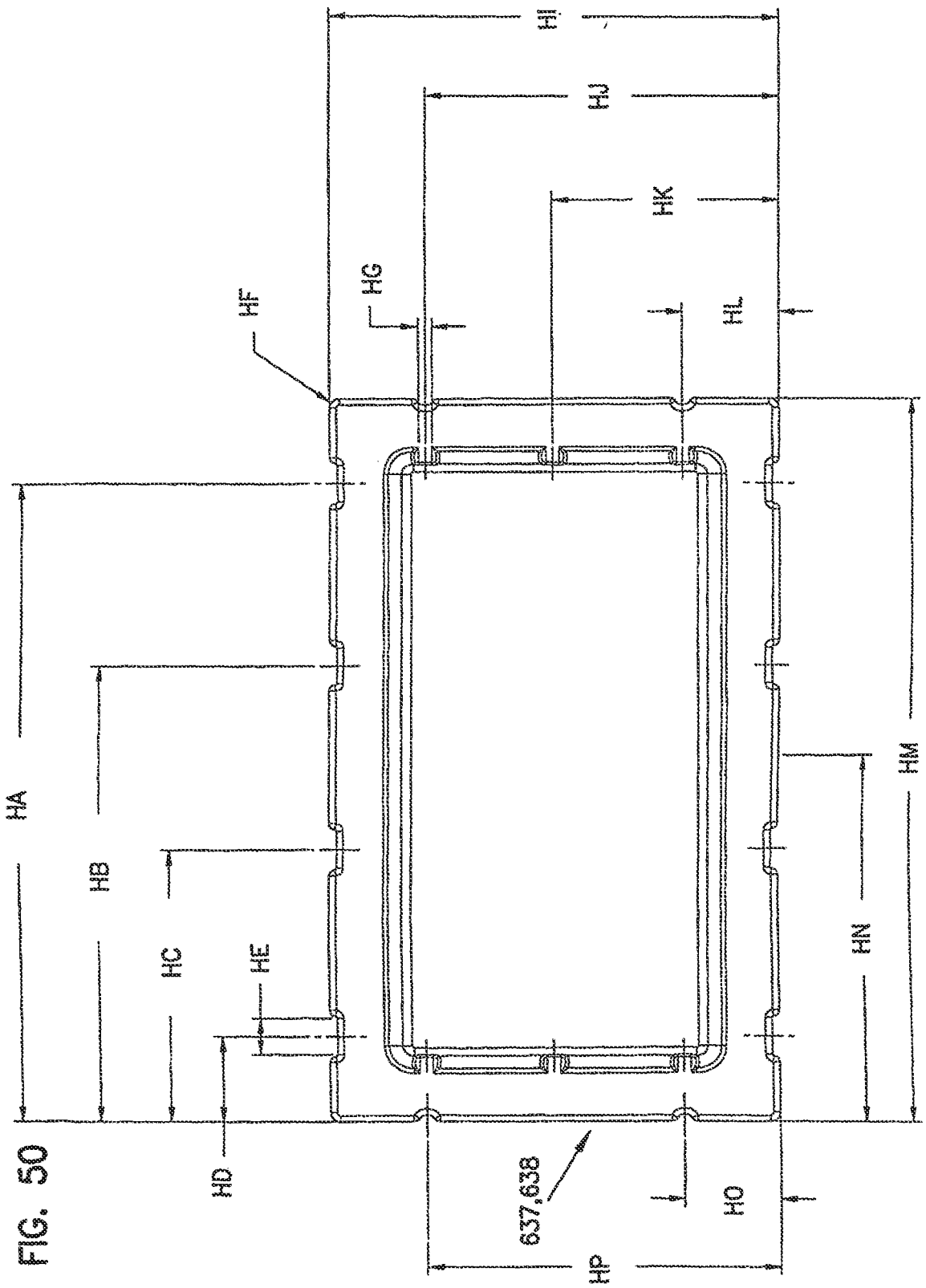
FIG. 50 is a schematic side elevational view of a molded side panel member of the filter cartridge depicted in FIGS. 43 and 44.

Attention is now directed to FIG. 50. FIG. 50 is generally a side plan view of the side panels 637, 638. The panels 637, 638 would generally be identical, and positioned as mirror images on the media pack 637a. In FIG. 50, the example dimensions are as follows: HA=207.5 mm; HB=147.5 mm; HC=87.5 mm; HD=27.5 mm; HE=11.7 mm; HF=3.0 mm radius; HG=3.9 mm; HI=131.6 mm; HJ=103.6 mm; HK=65.8 mm; HL=28 mm; HM=235 mm; HN=117.5 mm; HO=28 mm; and HP=103.6 mm. Other dimensions can be obtained based upon the symmetry and scale of the drawing, FIG. 50.

Normally, the media panels 637, 638, would be molded directly onto the media pack 636a, in a two step molding operation: a first step to form one of the panels 637, 638 and a second step to form the opposite panel 638, 637.

Typically the material from which the side panel 637, 638 are formed, is a foamed polyurethane, as discussed below.

Figure 51:
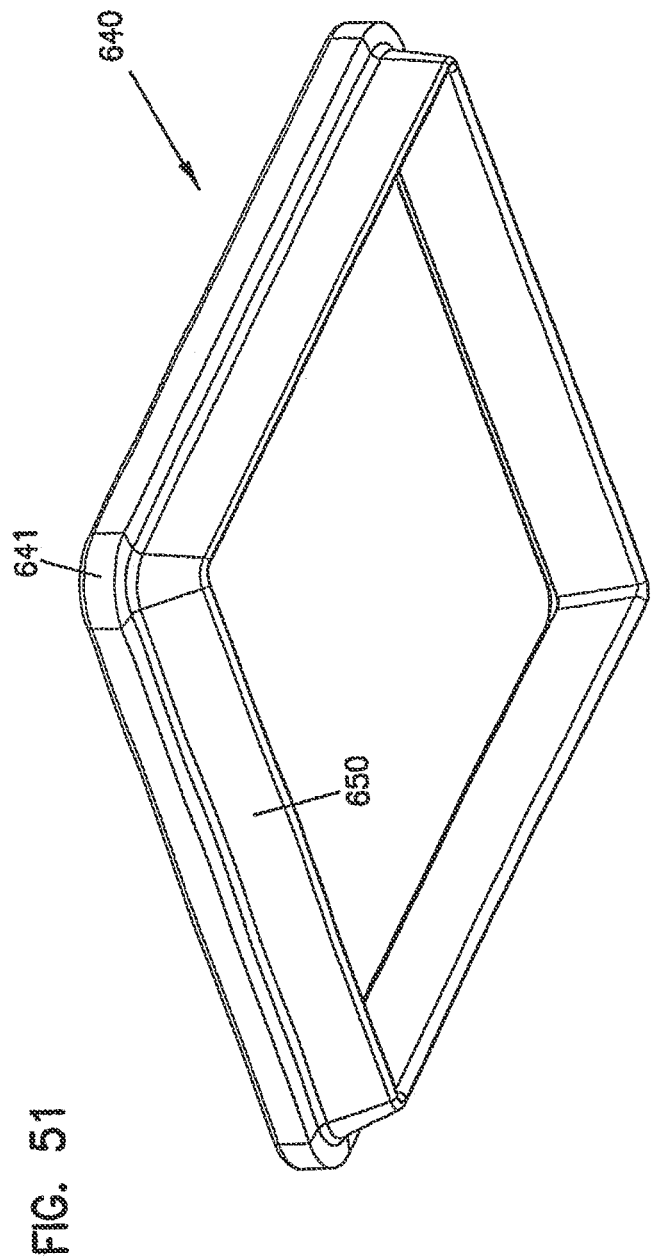
FIG. 51 is a schematic perspective view of a molded seal member useable in the filter cartridge of FIGS. 43 and 44.

In FIGS. 51-55, the housing seal arrangement 640, and features thereof, are shown. The housing seal arrangement 640, of course, would typically form molded directly to the media pack arrangement 636, in extension around the media pack arrangement 636a and side panels 637, 638. In FIG. 51, the housing seal arrangement 640 is depicted schematically, without the media pack 636, secured thereto.

Figure 52:
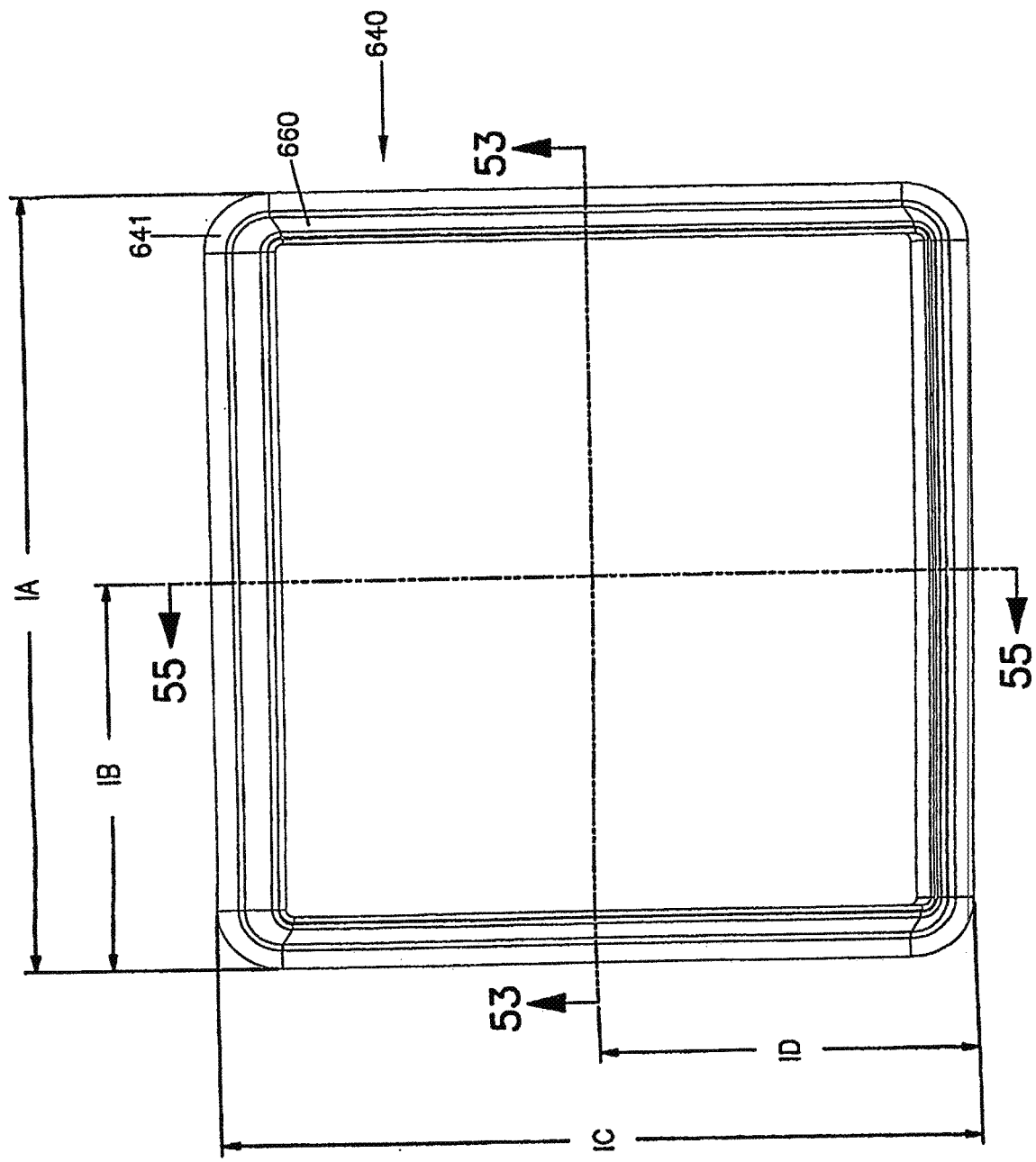
FIG. 52 is a top plan view of the seal member of FIG. 51.

In FIG. 52, a top plan view of the housing seal arrangement 640 is depicted. Dimensions in the example of FIG. 52 are as follows: IA=312.3 mm; D3=156.2 mm; IC=275.1 mm; and ID=137.5 mm.

Figure 53:
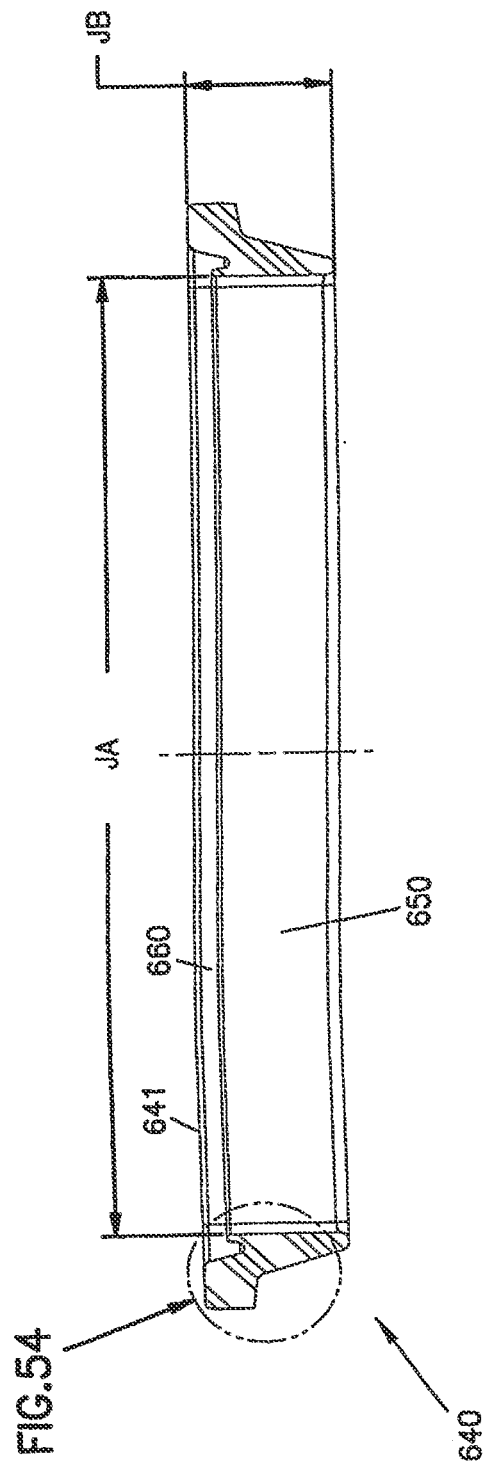
FIG. 53 is a cross-sectional view taken along line 53-53, FIG. 52.
Figure 54:
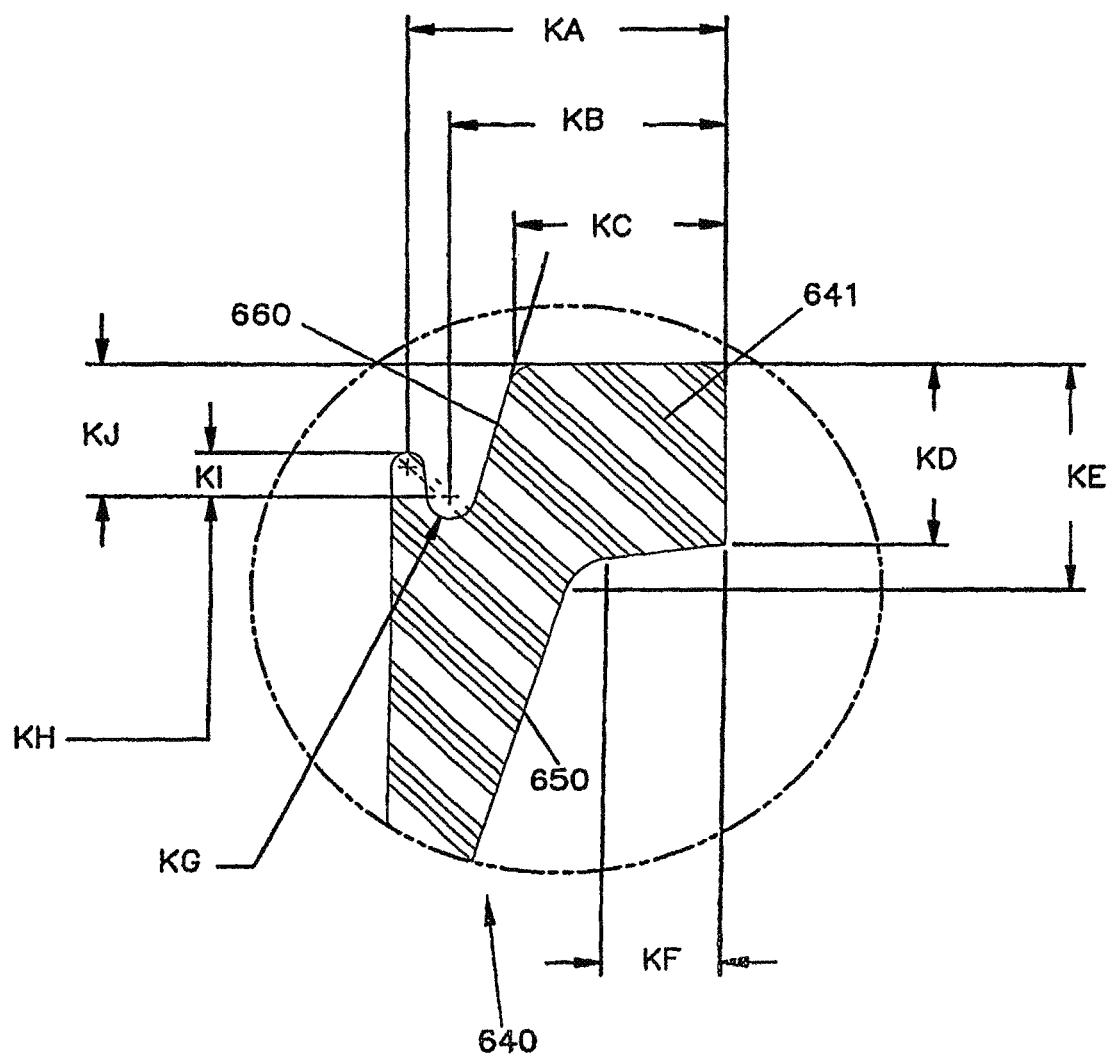
FIG. 54 is an enlarged fragmentary view of a portion of FIG. 53.

In FIG. 53, a cross sectional view taken along line 53-53, FIG. 52, is shown. In FIG. 54 the dimensions indicated are as follows: JA=271.2 mm; and JB=37.1 mm.

In FIG. 54, an enlarged fragmentary view of a portion of FIG. 53. The dimensions indicated in FIG. 54 are as follows: KA=19.6 mm; KB=16.8 mm; KC=12.9 mm; KD=12.3 mm; KE=15.4 mm; KF=7.3 mm; KG=1.5 mm radius; KH=3.0 mm; KI=3 mm; and KJ=9 mm.

Figure 55:
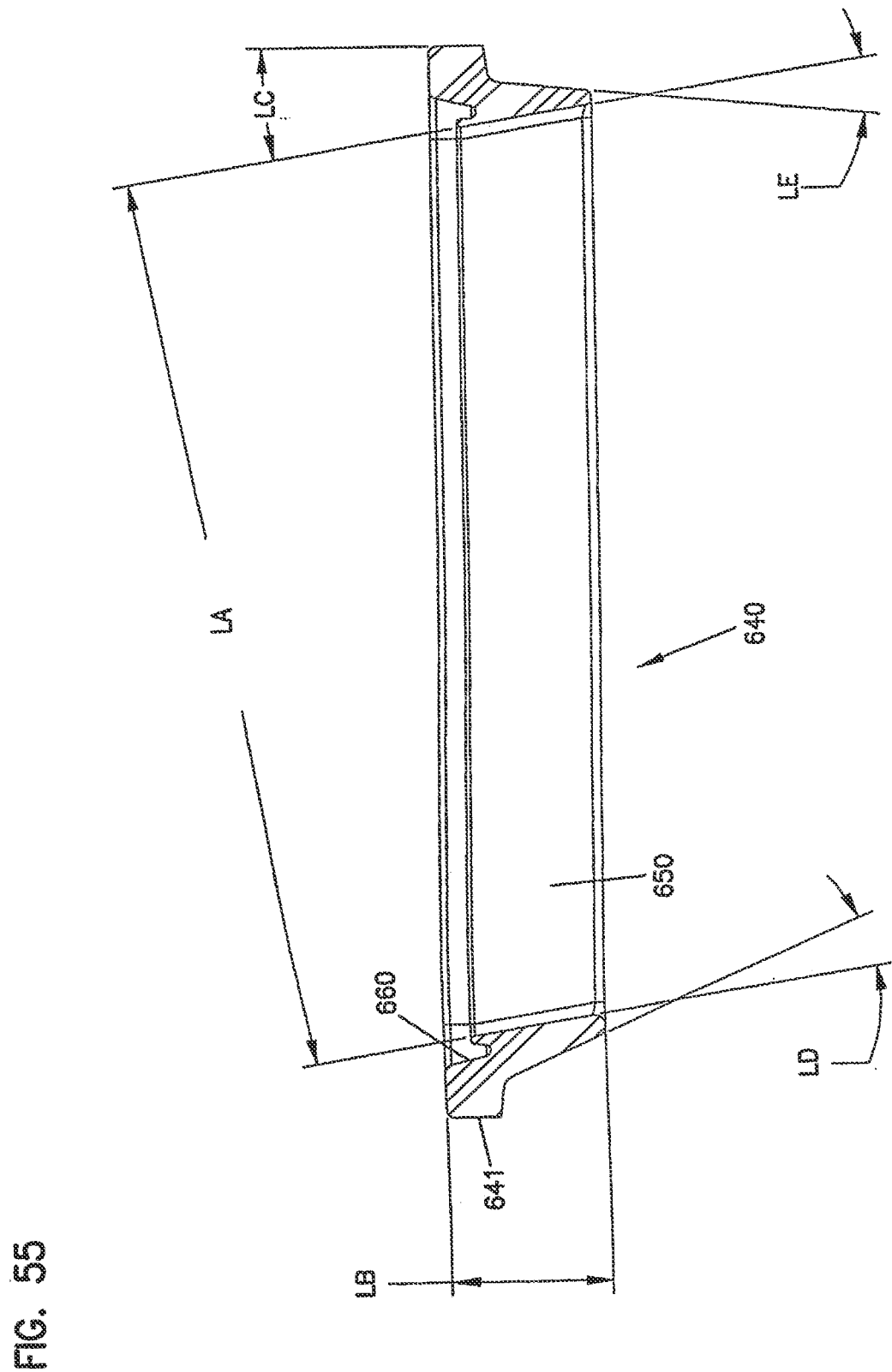
FIG. 55 is a cross-sectional view taken along line 55-55, FIG. 52.

In FIG. 55 a cross sectional view taken along line 55-55, FIG. 52, is shown. Referring to FIG. 55 the dimensions indicated are as follows: LA=230.4 mm; LB=37.1 mm; LC=10°; LD=16°; and LE=16°.

The housing seal arrangement 640 (and the side moldings 637, 638) can be provided from a variety of polymeric materials. When separately molded, it is not required that the panels 637, 638 and housing seal arrangement 640 all be the same, although typically they will be. An example material useable for both the seal and the side moldings described herein is polyurethane. An example polyurethane characterized is a foamed polyurethane which will increase in volume during use. Preferred ones increase by at least 40% in volume, to fill the mold cavities (typically at least 80% in volume) and having an as-molded density of no greater than 30 lbs/cu·ft (0.48 g/cc), typically no greater than 22 lbs/cu·ft. (0.35 g/cc) and usually with in the range of 10 lbs/cu·ft (0.16 g/cc) to 22 lbs/cu·ft (0.35 g/cc); and, a hardness (Shore A) of a test sample typically of not greater than 30, preferably not greater than 25 and typically within the range of 10 to 22. Of course polyurethanes outside of this range can be used, but the characterized ones are advantageous for manufacturing and handling.

Referring to FIGS. 39 and 41, it is noted that the cartridge 625 (with the housing seal arrangement 640 extending with a pinched seal arrangement 641 at an angle of greater than 0°, for example at least 2°, typically 5-15° inclusive, in the example shown 10°, relative to face 646 of the media pack 636a), is positioned within interior 601 of housing 601 such that the faces 645, 646 of the media pack 636a are slanted across a direction between the inlet arrangement 611 and the outlet arrangement 612. That is, the media pack 636a is not tilted toward the outlet arrangement 612a, nor is it slanted away from the outlet arrangement 612a, rather it is slanted in a direction generally across a direction corresponding to a direction between walls 602a, 602b of section 602. Alternatively stated, the slant of faces 645, 646 is between sides 602c, 602d of section 602.

In still an alternate statement of the same concept to the previous paragraph, when positioned in the housing 601, the cartridge 625 is positioned with one of the molded side panels 637, and a section of the seal arrangement 640 extending thereacross, directed toward the side wall 602a, in which the inlet arrangement 611 is positioned; and, with an opposite molded side panel 638, and a section of the housing seal arrangement 640 extending thereacross, facing toward the opposite side wall 602b of the housing seal. The sections of the housing peripheral seal arrangement 640 which extend across these portions of the media pack arrangements, are angled relative to the outlet face 646, and opposite edges of the outlet face 646, by angle DA, FIG. 44.

It is noted that the filter cartridge 625, FIG. 41, is typically positioned within the housing interior 601, such that at least 5%, typically at least 10% and usually at least 15% of the volume of pack 636a is positioned in the housing cover section 603, typically with an apex 700, FIG. 41, projecting furthest upwardly into cover section 603. A ridge corresponding to the apex 700 would generally extend in a direction between side walls 602a, 602b, FIG. 38, but above the highest reach of those side walls 602a, 602b.

Alternate arrangements, in which the media pack 636a is tipped toward or away from the outlet tube 612a are possible. An example is described in U.S. provisional application 60/651,838 already incorporated herein by reference and to which a claim of priority was made.

It is noted that although alternatives are contemplated, the particular example filter cartridge as described herein include housing seal arrangements that are molded-in-place. By this term "molded-in-place", it is meant that the housing seal arrangement is molded directly onto the media arrangement. Thus, the housing seal arrangement 640 is molded directly to, and in contact with the exposed media sides 665, 666 of the media pack and then sides with side panels 637, 638 thereon. Alternatives are contemplated and discussed, but the example shown utilize these features.

Further, although alternatives are contemplated, for the specific examples described here in the molded-in-place housing seal arrangement comprises a single molded polymeric material, and includes no preformed, rigid, structure embedded therein. Thus, the example housing seal arrangement as described, can be characterized as consisting essentially of molded polymeric material, and in particular molded polyurethane material (typically molded polyurethane foam). An advantage to this is that no adhesive is needed to secure the media pack to the housing seal arrangement.

For the first example filter cartridge described in FIG. 15, the molded-in-place housing seal arrangement is constructed in four segments, from four moldings. In the second described example of FIG. 43, the molded-in-place housing seal arrangement is molded as a single integral unit, in one molding operation.

In the example of FIG. 43, the housing seal arrangement is described as having a base and a pinch seal lip. The two are molded integral with one another, meaning they are molded from a polymeric material in a single mold, with the two portions integral with one another as a result of the molding. They are not separately formed components.

What is claimed is:

1. An air filter cartridge comprising:
(a) a filter media pack comprising filter media and having an air inlet flow face and an air outlet flow face opposite the air inlet flow face, and a central flow axis through the air inlet flow face and the air outlet flow face;
 (i) the filter media pack having a rectangular cross-sectional shape in a direction perpendicular to the central flow axis; and
 (ii) the filter media pack comprising four sides, including a first pair of first and second opposite sides and a second pair of first and second opposite sides, extending between the air inlet flow face and the air outlet flow face;
(b) first and second side pieces positioned on the first pair of first and second opposite sides of the filter media pack, respectively, wherein:
 (i) the first and second side pieces each comprise a surface spaced from the air outlet flow face of the filter media pack in a direction away from the air inlet flow face of the filter media pack; and
 (ii) the first and second side pieces being configured to seal the first pair of first and second opposite sides of the filter media pack against air flow through the first pair of first and second opposite sides of the filter media pack along the central flow axis; and
(c) a housing seal arrangement for sealing the air filter cartridge to an air cleaner housing, in use, wherein:
 (i) the housing seal arrangement comprises a seal member that forms a pinch seal between housing pieces, in use; and
 (ii) the seal member extends across the first and second side pieces so that the seal member extending across the first and second side pieces is arranged in a plane that is non-parallel to a plane perpendicular to the central flow axis.

2. An air filter cartridge according to claim 1 wherein:
(a) the filter media pack comprises alternating fluted media and facing media.

3. An air filter cartridge according to claim 2 wherein:
(a) the alternating fluted media and facing media are secured to each other at one end of the first flow face and the second flow faces.

4. An air filter cartridge according to claim 2 wherein:
(a) the alternating fluted media and facing media comprises a stack of alternating strips of a fluted media sheet secured to a facing media sheet.

5. An air filter cartridge according to claim 1 wherein:
(a) the housing seal arrangement further comprises a receiving trough positioned inwardly from the seal member that forms a pinch seal.

6. An air filter cartridge according to claim 1 wherein:
(a) the surfaces of the first and second side pieces include portions located beyond the air outlet flow face of the filter media pack are constructed to not engage an air cleaner housing, in use.

7. An air filter cartridge according to claim 1 wherein:
(a) the seal member extends across the first pair of first and second sides of the filter media pack and across the second pair of the first and second sides of the filter media pack.

8. An air filter cartridge according to claim 7 wherein:
(a) the seal member extends at an angle of at least 2 degrees to the surfaces of the first and second side pieces located beyond the air outlet flow face of the filter media pack.

9. An air filter cartridge according to claim 7 wherein:
(a) the seal member extends at an angle of at least 2 degrees to 45 degrees to the surfaces of the first and second side pieces located beyond the air outlet flow face of the filter media pack.

10. An air filter cartridge according to claim 1 wherein:
(a) a portion of the seal member extends parallel to the air inlet flow face of the filter media pack.

11. An air filter cartridge according to claim 1 wherein:
(a) a portion of the seal member extends at an angle of at least 2 degrees to a plane perpendicular to the central flow axis.

12. An air filter cartridge according to claim 1 wherein:
(a) the surfaces of the first and second side pieces located beyond the outlet flow face of the filter media pack comprise a plurality of bumps.

13. An air filter cartridge according to claim 1 wherein:
(a) the surfaces of the first and second side pieces located beyond the outlet flow face of the filter media pack comprise a plurality of recesses.

14. An air filter cartridge according to claim 1 further comprising:
(a) a protective material located over the second pair of first and second sides of the filter media pack.

15. An air filter cartridge according to claim 14 wherein:
(a) the protective material is secured in place against the filter media pack by molding the first and second side pieces to the first pair of opposite sides of the filter media pack.

16. An air filter cartridge according to claim 14 wherein:
(a) the protective material comprises cardboard or plastic.

17. An air filter cartridge according to claim 1 wherein:
(a) at least 30% of the second pair of first and second opposite sides of the filter media pack is uncovered.

18. An air filter cartridge according to claim 1 wherein:
(a) at least 40% of the second pair of first and second opposite sides of the filter media pack is uncovered.

19. An air filter cartridge according to claim 1 wherein:
(a) the first and second side pieces have an as-molded density of no greater than about 30 lbs./ft.$^3$.

20. An air filter cartridge according to claim 1 wherein:
(a) the first and second side pieces have a hardness, Shore A, of no greater than about 30.

21. An air filter cartridge according to claim 1 wherein:
(a) the first and second side pieces are molded in place on the first pair of first and second opposite sides of the filter media pack.

22. An air filter cartridge according to claim 1 wherein:
(a) the first and second side pieces comprise preforms attached to the media pack by a potting material.

23. An air filter cartridge according to claim 1 wherein:
(a) the surfaces of the first and second side pieces spaced from the air outlet flow face of the filter media pack are spaced at least 0.5 mm from the air outlet flow face of the filter media pack.

24. An air filter cartridge according to claim 1 wherein:
(a) the surfaces of the first and second side pieces spaced from the air outlet flow face of the filter media pack are spaced at least 1 mm from the air outlet flow face of the filter media pack.

25. An air filter cartridge according to claim 1 wherein:
(a) the surfaces of the first and second side pieces spaced from the air outlet flow face of the filter media pack are spaced 1.5 mm to 3.5 mm from the air outlet flow face of the filter media pack.

26. An air filter cartridge comprising:
(a) a filter media pack comprising filter media and having an air inlet flow face and an air outlet flow face opposite the air inlet flow face, and a central flow axis through the air inlet flow face and the air outlet flow face;
   (i) the filter media pack having a rectangular cross-sectional shape in a direction perpendicular to the central flow axis; and
   (ii) the filter media pack comprising four sides, including a first pair of first and second opposite sides and a second pair of first and second opposite sides, extending between the air inlet flow face and the air outlet flow face;
(b) first and second side pieces positioned on the first pair of first and second opposite sides of the filter media pack, respectively, wherein:
   (i) the first and second side pieces each comprise a surface spaced from the air outlet flow face of the filter media pack in a direction away from the air inlet flow face of the filter media pack, and arranged to support the filter cartridge when the filter cartridge is installed in an air cleaner housing;
   (ii) the first and second side pieces being configured to seal the first pair of first and second opposite sides of the filter media pack against air flow through the first pair of first and second opposite sides of the filter media pack; and
(c) a housing seal arrangement for sealing the air filter cartridge to an air cleaner housing, in use, wherein:
   (i) the housing seal arrangement comprises a seal member that forms a pinch seal between housing pieces, in use; and
   (ii) the seal member extends across the filter media pack first pair of first and second opposite sides and across the filter media pack second pair of first and second sides.

\* \* \* \* \*